US012705109B2

(12) United States Patent
Lee et al.

(10) Patent No.: US 12,705,109 B2
(45) Date of Patent: Aug. 11, 2026

(54) CURATION OF CUSTOM WORKFLOWS USING MULTIPLE CAMERAS, WITH AI TO PROVIDE AWARENESS OF SITUATIONS

(71) Applicant: Scenera, Inc., Palo Alto, CA (US)

(72) Inventors: David D. Lee, Palo Alto, CA (US); Andrew Augustine Wajs, Haarlem (NL)

(73) Assignee: Scenera, Inc., Palo Alto, CA (US)

( * ) Notice: Subject to any disclaimer, the term of this patent is extended or adjusted under 35 U.S.C. 154(b) by 466 days.

(21) Appl. No.: 18/203,535

(22) Filed: May 30, 2023

(65) Prior Publication Data

US 2023/0305903 A1 Sep. 28, 2023

Related U.S. Application Data

(63) Continuation-in-part of application No. 17/341,794, filed on Jun. 8, 2021, now Pat. No. 11,663,049, which (Continued)

(51) Int. Cl.

*G06F 9/54* (2006.01)
*G06F 9/50* (2006.01)

(Continued)

(52) U.S. Cl.

CPC ............ *G06F 9/5072* (2013.01); *G06F 9/542* (2013.01); *G06F 18/251* (2023.01);

(Continued)

(58) Field of Classification Search

CPC ...... G06F 9/5072; G06F 9/542; G06F 18/251; G06F 18/285; G06F 9/5038; G06N 20/00;

(Continued)

(56) References Cited

U.S. PATENT DOCUMENTS

| | | | | |
|---|---|---|---|---|
| 6,654,047 B2 * | 11/2003 | Iizaka | .................... | G06Q 30/02 348/E7.086 |
| 10,055,853 B1 * | 8/2018 | Fisher | .................... | H04N 23/90 |

(Continued)

OTHER PUBLICATIONS

Girdhar, R. et al., "Video Action Transformer Network," Proceedings of the IEEE/CVF Conference on Computer Vision and Pattern Recognition (CVPR), Jun. 2019, pp. 244-253.

(Continued)

*Primary Examiner* — Aaron W Carter
(74) *Attorney, Agent, or Firm* — Fenwick & West LLP

(57) ABSTRACT

A multi-layer technology stack includes a sensor layer including image sensors, a device layer, and a cloud layer, with interfaces between the layers. A method to curate different custom workflows for multiple applications include the following. Requirements for custom sets of data packages for the applications is received. The custom set of data packages include sensor data packages (e.g., SceneData) and contextual metadata packages that contextualize the sensor data packages (e.g., SceneMarks). Based on the received requirements and capabilities of components in the technology stack, the custom workflow for that application is deployed. This includes a selection, configuration and linking of components from the technology stack. The custom workflow is implemented in the components of the technology stack by transmitting workflow control packages directly and/or indirectly via the interfaces to the different layers.

20 Claims, 60 Drawing Sheets
(59 of 60 Drawing Sheet(s) Filed in Color)

Related U.S. Application Data is a continuation of application No. 17/084,417, filed on Oct. 29, 2020, now Pat. No. 11,068,742.

(60) Provisional application No. 63/020,521, filed on May 5, 2020, provisional application No. 62/928,199, filed on Oct. 30, 2019, provisional application No. 62/928,165, filed on Oct. 30, 2019.

(51) Int. Cl.

| | |
|---|---|
| ***G06F 18/20*** | (2023.01) |
| ***G06F 18/25*** | (2023.01) |
| ***G06N 20/00*** | (2019.01) |
| ***G06V 10/44*** | (2022.01) |
| ***G06V 10/764*** | (2022.01) |
| ***G06V 10/82*** | (2022.01) |
| ***G06V 10/94*** | (2022.01) |
| ***G06V 20/52*** | (2022.01) |
| ***H04N 23/80*** | (2023.01) |
| ***H04N 23/90*** | (2023.01) |
| *G06V 40/16* | (2022.01) |

(52) U.S. Cl.

CPC ........... *G06F 18/285* (2023.01); *G06N 20/00* (2019.01); *G06V 10/454* (2022.01); *G06V 10/764* (2022.01); *G06V 10/82* (2022.01); *G06V 10/94* (2022.01); *G06V 20/52* (2022.01); *H04N 23/80* (2023.01); *H04N 23/90* (2023.01); *G06V 40/161* (2022.01); *G06V 2201/10* (2022.01)

(58) Field of Classification Search

CPC .... G06N 3/045; G06N 3/0475; G06N 3/0464; G06N 3/08; G06V 10/454; G06V 10/764; G06V 10/82; G06V 10/94; G06V 20/52; G06V 40/161; G06V 2201/10; H04N 23/80; H04N 23/90

See application file for complete search history.

(56) References Cited

U.S. PATENT DOCUMENTS

| | | | | |
|---|---|---|---|---|
| 10,412,291 | B2 | 9/2019 | Lee et al. | |
| 10,509,459 | B2 | 12/2019 | Lee et al. | |
| 10,693,843 | B2 | 6/2020 | Lee et al. | |
| 11,068,742 | B2 * | 7/2021 | Lee | G06F 9/542 |
| 11,068,991 | B2 * | 7/2021 | Przechocki | H04L 67/12 |
| 11,188,758 | B2 | 11/2021 | Lee et al. | |
| 11,328,513 | B1 * | 5/2022 | Osherovich | G06V 40/168 |
| 11,600,070 | B2 | 3/2023 | Elgamal et al. | |
| 11,663,049 | B2 | 5/2023 | Lee et al. | |
| 11,961,303 | B1 | 4/2024 | Osherovich et al. | |
| 12,272,137 | B2 * | 4/2025 | Xu | G06V 10/806 |
| 12,400,442 | B2 * | 8/2025 | Bates | G06V 20/40 |
| 2005/0120330 | A1 | 6/2005 | Ghai et al. | |
| 2008/0028363 | A1 | 1/2008 | Mathew | |
| 2010/0185973 | A1 | 7/2010 | Ali et al. | |
| 2010/0207762 | A1 | 8/2010 | Lee et al. | |
| 2011/0173328 | A1 | 7/2011 | Park et al. | |
| 2012/0026335 | A1 * | 2/2012 | Brown | G06T 7/292 382/103 |
| 2013/0055201 | A1 | 2/2013 | No et al. | |
| 2013/0124807 | A1 | 5/2013 | Nielsen et al. | |
| 2014/0201707 | A1 | 7/2014 | Schroeder | |
| 2014/0350997 | A1 | 11/2014 | Holm et al. | |
| 2014/0362223 | A1 * | 12/2014 | LaCroix | H04N 7/183 348/150 |
| 2015/0012396 | A1 * | 1/2015 | Puerini | G06Q 10/0875 705/28 |
| 2015/0127485 | A1 * | 5/2015 | Kakizawa | G06Q 30/0613 705/26.41 |
| 2016/0004390 | A1 | 1/2016 | Laska et al. | |
| 2016/0034809 | A1 | 2/2016 | Trenholm et al. | |
| 2017/0006135 | A1 | 1/2017 | Siebel et al. | |
| 2017/0063886 | A1 * | 3/2017 | Muddu | G06N 5/04 |
| 2017/0316586 | A1 | 11/2017 | Ricci | |
| 2017/0336858 | A1 | 11/2017 | Lee et al. | |
| 2017/0337425 | A1 * | 11/2017 | Lee | G06V 20/52 |
| 2017/0339329 | A1 * | 11/2017 | Lee | H04N 23/54 |
| 2018/0018508 | A1 | 1/2018 | Tusch | |
| 2018/0068172 | A1 * | 3/2018 | Despiegel | H04W 12/08 |
| 2018/0069838 | A1 * | 3/2018 | Lee | G06F 21/6245 |
| 2018/0096209 | A1 * | 4/2018 | Matsuda | G06V 40/103 |
| 2018/0348092 | A1 | 12/2018 | Suresh et al. | |
| 2019/0043201 | A1 | 2/2019 | Strong et al. | |
| 2019/0095716 | A1 * | 3/2019 | Shrestha | G06N 20/20 |
| 2019/0147251 | A1 * | 5/2019 | Numata | H04N 7/18 348/152 |
| 2019/0207866 | A1 | 7/2019 | Pathak et al. | |
| 2019/0258864 | A1 | 8/2019 | Lee et al. | |
| 2019/0354773 | A1 * | 11/2019 | Leizerovich | G08B 25/016 |
| 2019/0354774 | A1 * | 11/2019 | Leizerovich | G06V 20/62 |
| 2019/0354775 | A1 * | 11/2019 | Leizerovich | G06T 7/246 |
| 2019/0354776 | A1 * | 11/2019 | Ribeiro | G08B 13/19695 |
| 2019/0356885 | A1 * | 11/2019 | Ribeiro | G06T 7/248 |
| 2020/0053116 | A1 | 2/2020 | Soroush et al. | |
| 2020/0117897 | A1 * | 4/2020 | Froloff | G06V 20/188 |
| 2020/0293803 | A1 | 9/2020 | Wajs et al. | |
| 2020/0342324 | A1 | 10/2020 | Sivaraman et al. | |
| 2020/0372381 | A1 * | 11/2020 | Trim | G06N 5/043 |
| 2021/0042638 | A1 | 2/2021 | Novotny | |
| 2021/0133456 | A1 * | 5/2021 | Lee | G06F 18/21 |
| 2021/0133492 | A1 | 5/2021 | Lee et al. | |
| 2021/0295094 | A1 | 9/2021 | Lee et al. | |
| 2021/0306560 | A1 | 9/2021 | Lee et al. | |
| 2021/0397848 | A1 | 12/2021 | Lee et al. | |
| 2022/0114477 | A1 * | 4/2022 | Kou | G06N 5/04 |
| 2022/0122015 | A1 * | 4/2022 | Bandopadhyay | G06Q 10/0635 |
| 2022/0277193 | A1 | 9/2022 | Wekel et al. | |
| 2023/0267775 | A1 * | 8/2023 | Dhoot | G06V 20/56 701/29.1 |
| 2023/0305903 | A1 * | 9/2023 | Lee | H04N 23/90 |
| 2023/0325255 | A1 * | 10/2023 | Lee | G06F 9/542 |
| 2025/0209328 | A1 * | 6/2025 | Zhuang | G06N 10/40 |
| 2025/0308219 | A1 | 10/2025 | Smith et al. | |
| 2026/0044711 | A1 * | 2/2026 | Hoshina | G06N 3/045 |

OTHER PUBLICATIONS

Horev, R., "Bert Explained: State of the art language model for NLP," Nov. 10, 2018, 8 pages, [Online] [Retrieved on Jan. 21, 2021] Retrieved from the Internet <URL: https://towardsdatascience.com/bert-explained-state-of-the-art-language-m- odel-for-nlp-18b21a9b6270>.

Kong, Y. et al., "Human Action Recognition and Prediction: A Survey," arXiv.1806.11230, Jul. 2, 2018, pp. 1-20.

Loginova, K., "Attention in NLP," Jun. 22, 2018, 16 pages, [Online] [Retrieved on Jan. 20, 2021] Retrieved from the Internet <URL: https://medium.com/@edloginova/aftention-in-nlp-734c6fa9d983>.

Olah, C. et al., "Attention and Augmented Recurrent Neural Networks," Sep. 8, 2016, 19 pages, [Online] [Retrieved on Jan. 21, 2021] Retrieved from the Internet <URL: https://distill.pub/2016/augmented-rnns/>.

Olah, C., "Understanding LSTM Networks," Aug. 27, 2015, 8 pages, [Online] [Retrieved on Jan. 20, 2021] Retrieved from the Internet <URL: https://colah.github.io/posts/2015-08-Understanding-LSTMs/>.

PCT International Search Report and Written Opinion, PCT Application No. PCT/US20/58193, dated Feb. 2, 2021, 14 pages.

PCT International Search Report and Written Opinion, PCT Application No. PCT/US20/58198, dated Feb. 2, 2021, 12 pages.

Piergiovanni, A., et al., "Tiny Video Networks," arXiv:1910.06961, Oct. 15, 2019, pp. 1-10.

Rivera-Soto, R.A. et al., "Sequence to Sequence Models for Generating Video Captions," Stanford University, Jul. 2, 2017, pp. 1-7.

Rosset, C., "Turing-NLG: A 17-billion-parameter language model by Microsoft," Feb. 13, 2020, 11 pages, [Online] [Retrieved on Jan.

(56) References Cited

OTHER PUBLICATIONS 21, 2021] Retrieved from the Internet <URL: https://www.microsoft.com/en-us/research/blog/turing-nlg-a-17-billion-par- ameter-language-model-by-microsoft/>.
Security World Market, "Androvideo's AI camera for security & safety," Nov. 14, 2019, 6 pages, [Online] [Retrieved on Jan. 21, 2021] Retrieved from the Internet <URL: https://www.securityworldmarket.com/int/News/Product-News/androvideos-ai-- camera-ideal-for-property-security--safety>.
Sharma, A.K., "Predicting Human Behaviour Activity using Deep Leaming (LSTM)," May 26, 2018, 12 pages, [Online] [Retrieved on Jan. 21, 2021] Retrieved from the Internet <URL: https://medium.com/@chataks93/predicting-human-behaviour-activity-using-d- eep-learning-lstm-lff9030b82e7>.
Sun, C. et al., "VideoBERT: A Joint Model for Video and Language Representation Learning," arXiv:1904.01766, Sep. 11, 2019, pp. 1-13.
United States Office Action, U.S. Appl. No. 17/084,429, dated Feb. 4, 2021, 16 pages.
Vincent, J., "This Japanese AI security camera shows the future of surveillance will be automated," Jun. 26, 2018, four pages, [Online] [Retrieved on Jan. 21, 2021] Retrieved from the Internet <URL: https://www.theverge.com/2018/6/26/17479068/ai-guardman-security-camera-s- hoplifter-japan-automated-surveillance>.
United States Office Action, U.S. Appl. No. 17/345,648, dated Jan. 28, 2026, 16 pages.
United States Office Action, U.S. Appl. No. 18/203,539, dated Oct. 1, 2025, 32 pages.

* cited by examiner nice

API Gateway

NICE Cloud API

SceneMark DB

Output

Filtered SceneMarks

SceneMark Processing

TubeMap

Output

SceneMarks (links to SceneData)

AI & CV

SceneData Processing

Output

SceneData (NICE Standardized Format)

SceneData Server

Bridge

RAW

Legacy IPCAM

Entry Level NICE IPCAM

Mid Level NICE IPCAM

Super-charged NICE IPCAM nice CAM

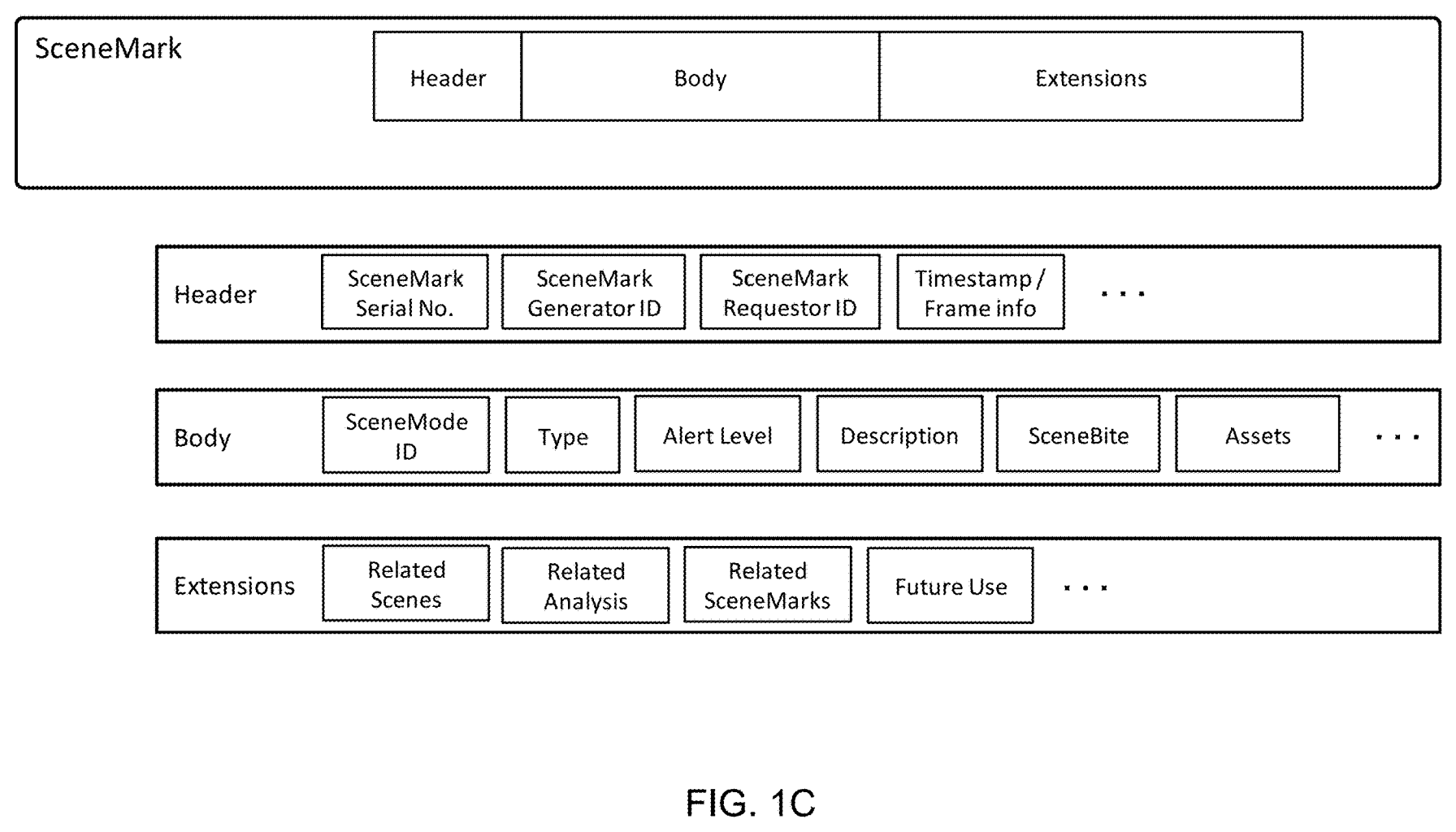

SceneMark

Header
Body
Extensions

Header
SceneMark Serial No.
SceneMark Generator ID
SceneMark Requestor ID
Timestamp / Frame info
. . .

Body
SceneMode ID
Type
Alert Level
Description
SceneBite
Assets
. . .

Extensions
Related Scenes
Related Analysis
Related SceneMarks
Future Use
. . .

FIG. 1C

Raw Video Frames

Smart Phones
with Camera App

RTSP/RTMP Cameras

NICE Cameras

FIG. 2A

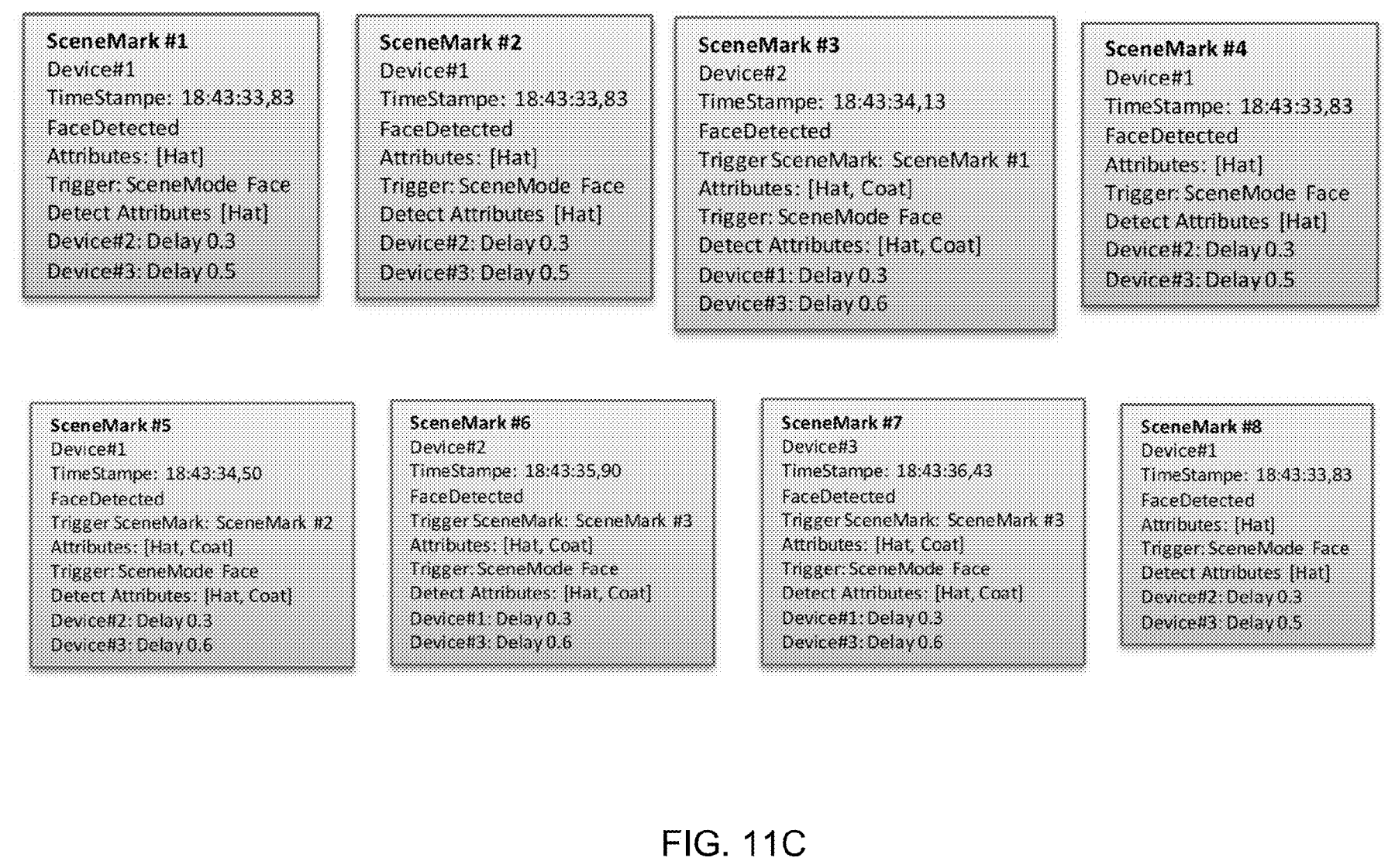

SceneMark #1
Device#1
TimeStampe: 18:43:33,83
FaceDetected
Attributes: [Hat]
Trigger: SceneMode Face
Detect Attributes [Hat]
Device#2: Delay 0.3
Device#3: Delay 0.5

SceneMark #2
Device#1
TimeStampe: 18:43:33,83
FaceDetected
Attributes: [Hat]
Trigger: SceneMode Face
Detect Attributes [Hat]
Device#2: Delay 0.3
Device#3: Delay 0.5

SceneMark #3
Device#2
TimeStampe: 18:43:34,13
FaceDetected
Trigger SceneMark: SceneMark #1
Attributes: [Hat, Coat]
Trigger: SceneMode Face
Detect Attributes: [Hat, Coat]
Device#1: Delay 0.3
Device#3: Delay 0.6

SceneMark #4
Device#1
TimeStampe: 18:43:33,83
FaceDetected
Attributes: [Hat]
Trigger: SceneMode Face
Detect Attributes [Hat]
Device#2: Delay 0.3
Device#3: Delay 0.5

SceneMark #5
Device#1
TimeStampe: 18:43:34,50
FaceDetected
Trigger SceneMark: SceneMark #2
Attributes: [Hat, Coat]
Trigger: SceneMode Face
Detect Attributes: [Hat, Coat]
Device#2: Delay 0.3
Device#3: Delay 0.6

SceneMark #6
Device#2
TimeStampe: 18:43:35,90
FaceDetected
Trigger SceneMark: SceneMark #3
Attributes: [Hat, Coat]
Trigger: SceneMode Face
Detect Attributes: [Hat, Coat]
Device#1: Delay 0.3
Device#3: Delay 0.6

SceneMark #7
Device#3
TimeStampe: 18:43:36,43
FaceDetected
Trigger SceneMark: SceneMark #3
Attributes: [Hat, Coat]
Trigger: SceneMode Face
Detect Attributes: [Hat, Coat]
Device#1: Delay 0.3
Device#3: Delay 0.6

SceneMark #8
Device#1
TimeStampe: 18:43:33,83
FaceDetected
Attributes: [Hat]
Trigger: SceneMode Face
Detect Attributes [Hat]
Device#2: Delay 0.3
Device#3: Delay 0.5

FIG. 11C

Where is Waldo?

CURATION OF CUSTOM WORKFLOWS USING MULTIPLE CAMERAS, WITH AI TO PROVIDE AWARENESS OF SITUATIONS

CROSS-REFERENCE TO RELATED APPLICATION(S)

This application is a continuation-in-part of U.S. patent application Ser. No. 17/341,794, "Curation of Custom Workflows using Multiple Cameras," filed Jun. 8, 2021; which is a continuation of U.S. patent application Ser. No. 17/084,417, "Curation of Custom Workflows using Multiple Cameras," filed Oct. 29, 2020; which claims priority under 35 U.S.C. § 119(e) to U.S. Provisional Patent Application Ser. No. (a) 62/928,199, "Scenera Multi-Camera Curation," filed Oct. 30, 2019; (b) 62/928,165, "Network of Intelligent Camera Ecosystem," filed Oct. 30, 2019; and (c) 63/020,521, "NICE Tracking Sequence of Events," filed May 5, 2020. The subject matter of all of the foregoing is incorporated herein by reference in their entirety.

BACKGROUND

1. Technical Field

This disclosure relates generally to obtaining, analyzing and presenting information from sensors, including cameras.

2. Description of Related Art

Millions of cameras and other sensor devices are deployed today. There generally is no mechanism to enable computing to easily interact in a meaningful way with content captured by cameras. This results in most data from cameras not being processed in real time and, at best, captured images are used for forensic purposes after an event has been known to have occurred. As a result, a large amount of data storage is wasted to store video that in the end analysis is not interesting. In addition, human monitoring is usually required to make sense of captured videos. There is limited machine assistance available to interpret or detect relevant data in images.

Another problem today is that the processing of information is highly application specific. Applications such as advanced driver assisted systems and security based on facial recognition require custom built software which reads in raw images from cameras and then processes the raw images in a specific way for the target application. The application developers typically must create application-specific software to process the raw video frames to extract the desired information. In addition to the low-level camera interfaces, if application developers want to use more sophisticated processing or analysis capabilities, such as artificial intelligence or machine learning for higher-level image understanding, they will also have to understand and create interfaces for each of these systems. The application-specific software typically is a full stack beginning with low-level interfaces to the sensors and progressing through different levels of analysis to the final desired results. The current situation also makes it difficult for applications to share or build on the analysis performed by other applications.

As a result, the development of applications that make use of networks of sensors is both slow and limited. For example, surveillance cameras installed in an environment typically are used only for security purposes and in a very limited way. This is in part because the image frames that are captured by such systems are very difficult to extract meaningful data from. Similarly, in an automotive environment where there is a network of cameras mounted on a car, the image data captured from these cameras is processed in a way that is very specific to a feature of the car. For example, a forward-facing camera may be used only for lane assist. There usually is no capability to enable an application to utilize the data or video for other purposes.

Thus, there is a need for more flexibility and ease in accessing and processing data captured by sensors, including images and video captured by cameras.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the disclosure have other advantages and features which will be more readily apparent from the following detailed description and the appended claims, when taken in conjunction with the examples in the accompanying drawings, in which:

FIG. 1C shows an example format for a SceneMark.

FIGS. 2A and 2B show smart workflow for processing video images.

FIGS. 11A-11C show a sequence for structuring SceneMarks.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1A:
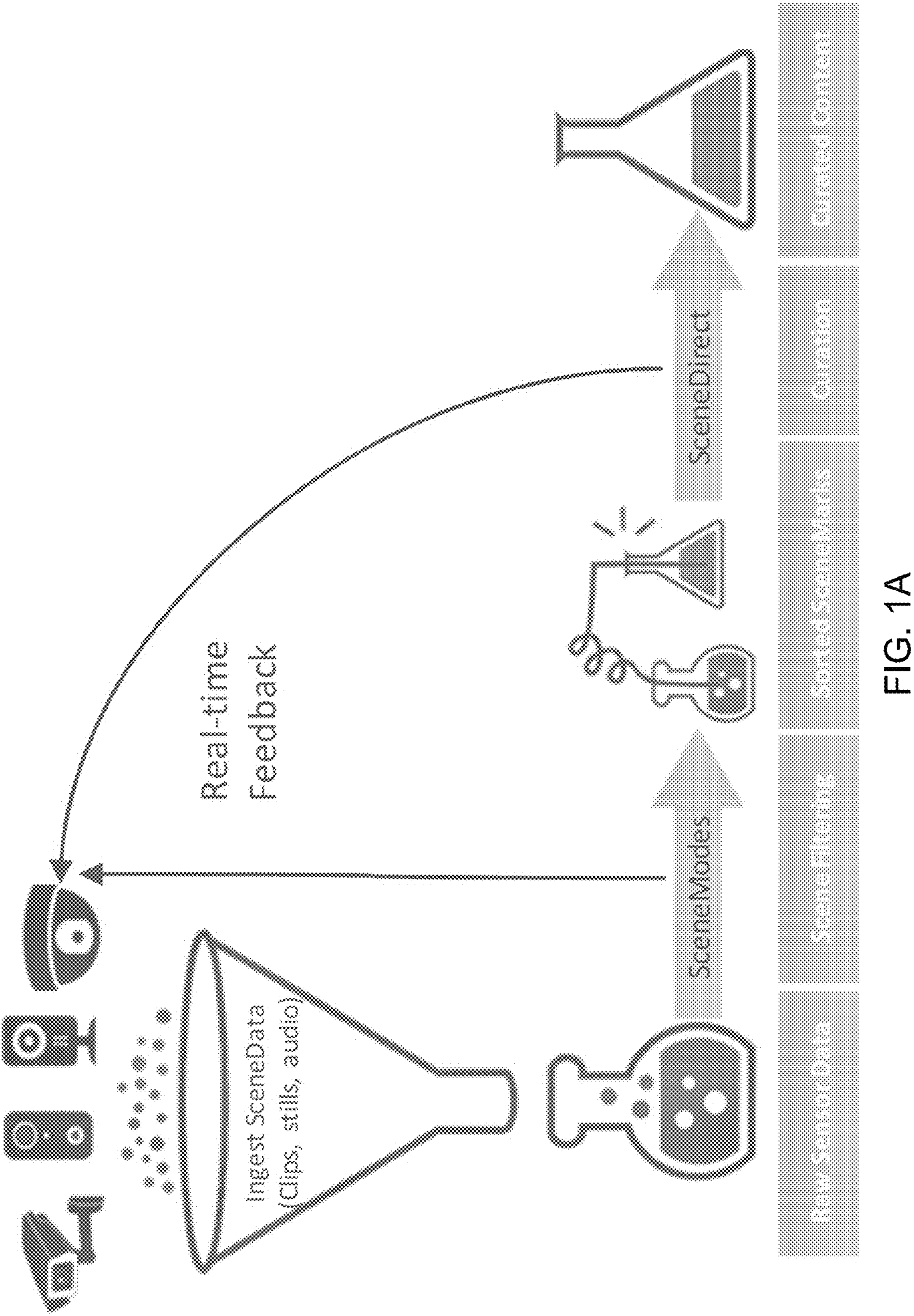
FIG. 1A is an introductory diagram of a custom workflow to generate useful data from raw sensor data, including image data.
Figure 1B:
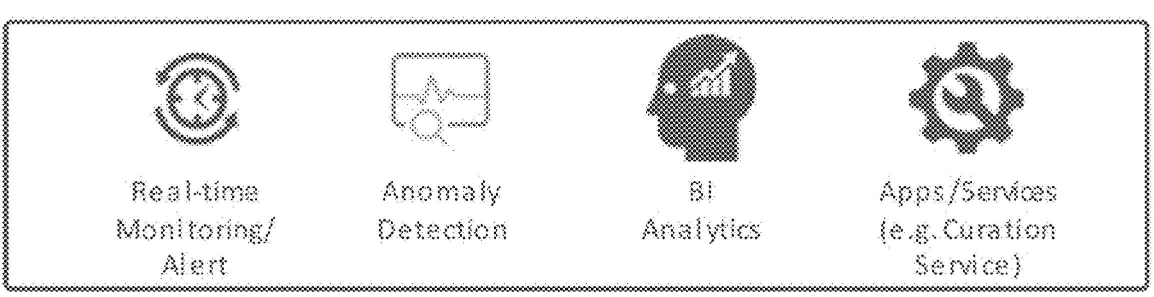
FIG. 1B is another introductory diagram of a custom workflow to generate useful data from raw sensor data, including image data.

FIGS. 1A and 1B are high level introductory diagrams that show a custom workflow to generate useful data from raw sensor data, including image data, and to understand and make sense of that data. In FIG. 1A, in imaging applications, there are lots of different types of data that the cameras and other sensors capture. This raw sensor data, which may be captured 24×7 at video frame rates, typically is not all needed. Applications may need certain data only when certain important events occur. But how does an application know what events to look for or how to detect those events? In FIG. 1A, the custom workflow from raw sensor data to curated content detects the events and higher level understanding of the overall circumstances of the events also provides some feedback to the sensor devices to configure their operation to look for these and related events. For example, one event might be a human appears in the video. If so, the application is notified. To detect this type of event, the sensors can be set into modes which are optimized to detect a human.

The raw sensor data may be filtered and analyzed to produce metadata (such as: human present). Metadata may be packaged in a form referred to as SceneMarks, as described in more detail below. The SceneMarks can be categorized and SceneMarks can come from different sensor data streams and from different types of analysis. The SceneMarks may be sorted and analyzed to provide further contextualization and interpretation for the situation being observed by the sensors. Different SceneMarks from different devices may all relate to one particular event or a sequence of relevant events. This metadata is analyzed to provide higher level understanding of the situational context and then presented in a human-understandable format to the end user. This is the curated content at the end of the workflow.

FIG. 1B shows a custom workflow implemented based on a standard, referred to as the NICE (Network of Intelligent Camera Ecosystem) standard. Image sensors (IPCAM in FIG. 1B) capture raw sensor data. Some image sensors are NICE-compliant. Legacy image sensors may be made NICE-compliant through the use of bridges. The workflow sorts and processes the sensor data and makes it more searchable. It also analyzes the data to identify and understand the circumstances observed, and presents these results to the end users or other applications, which can then analyze the processed data more easily than raw sensor data. In FIG. 1B, there is a lot of sensor data (SceneData) coming from different cameras or other sensors or IoTs, and the system filters and organizes this by scene. If the system finds important scenes (i.e., events), it may generate metadata for those events and mark those events. It may use artificial intelligence (AI), machine learning and computer vision (CV) techniques to do so. The Tube Map in FIG. 1B is a proximity map of sensors, which may also be utilized in the workflow. Knowing the proximity of different sensors will help to build a larger more cohesive understanding of events that were separately observed by different sensors.

In FIG. 1B, the events are marked or annotated by SceneMarks. SceneMarks may be characterized by device and by event. As a result of this custom workflow, the SceneMarks are better organized, indexable, and searchable. These SceneMarks may be stored on the cloud (SceneMark DB in FIG. 1B) and published to allow different applications to look at what is going on. Sample applications shown in FIG. 1B include biometric analytics, anomaly detection or some security and surveillance-type monitoring. The curation service in FIG. 1B is a service to create custom workflows for different applications. The applications themselves may also create custom workflows. The system may present not only processed data but also a summary of the events, including the contextualization and interpretation of actions and conditions in the monitored space.

FIG. 1B refers to the NICE standard. The NICE standard defines standard APIs between different layers of the technology stack, which facilitate a layered approach to image understanding. It also allows the definition of different types of data packages, including SceneData and SceneMarks. SceneData include sensor data, for example video. SceneData can include raw sensor data and/or processed/combined sensor data. SceneMarks include metadata resulting from the analysis of SceneData and/or other SceneMarks. For example, SceneMarks may indicate the presence of various trigger events (e.g., human detected). SceneMarks typically include links or references to the underlying SceneData and may also include thumbnails or other abbreviated versions of the SceneData. More detailed definitions of these data objects are provided in Section X below. If a Scene refers to the overall circumstances being observed, then SceneData includes data that is relevant to that Scene (e.g., video clips and other sensor data) and SceneMarks are labels and attributes of the Scene and corresponding SceneData.

FIG. 1C shows an example format for a SceneMark. In this example, the SceneMark includes a header, a main body and an area for extensions. The header identifies the SceneMark. The body contains the bulk of the "message" of the SceneMark. The header and body together establish the provenance for the SceneMark. In this example, the header includes an ID (or a set of IDs) and a timestamp. The SceneMark may also contain information as to how it has been processed and which processing nodes or steps have processed the SceneMark. This information can be used by a workflow or data pipeline to keep track of the stage of processing of the SceneMark without requiring additional database queries. The ID (serial number in FIG. 1C) uniquely identifies the SceneMark. The Generator ID identifies the source of the SceneMark. The body includes a SceneMode ID, SceneMark Type, SceneMark Alert Level, Short Description, and Assets and SceneBite. The SceneMark Type specifies what kind of SceneMark it is. The SceneMark Alert Level provides guidance regarding how urgently to present the SceneMark. The SceneMark Description preferably is a human-friendly (e.g. brief text) description of the SceneMark. Assets and SceneBite are data such as images and thumbnails. "SceneBite" is analogous to a soundbite for a scene. It is a lightweight representation of the SceneMark, such as a thumbnail image or short audio clip. Assets are the heavier underlying assets (SceneData). Extensions permit the extension of the basic SceneMark data structure. One possible extension is the recording of relations between SceneMarks, as described in further detail below. For further descriptions, see also U.S. patent application Ser. No. 15/487,416, "Scene Marking," which is incorporated by reference herein.

SceneData (from multiple sensors) and corresponding SceneMarks may be organized and packaged into time-stamped packages, referred to as SceneShots which aggregate the relevant data for a Scene. For example, the sensor data from cameras looking at the same environment, including processed versions of that data, and relevant metadata may be packaged into SceneShots. For further descriptions, see also U.S. patent application Ser. No. 15/469,380, "Scene-Based Sensor Networks," which is incorporated by reference herein.

Figure 2A:
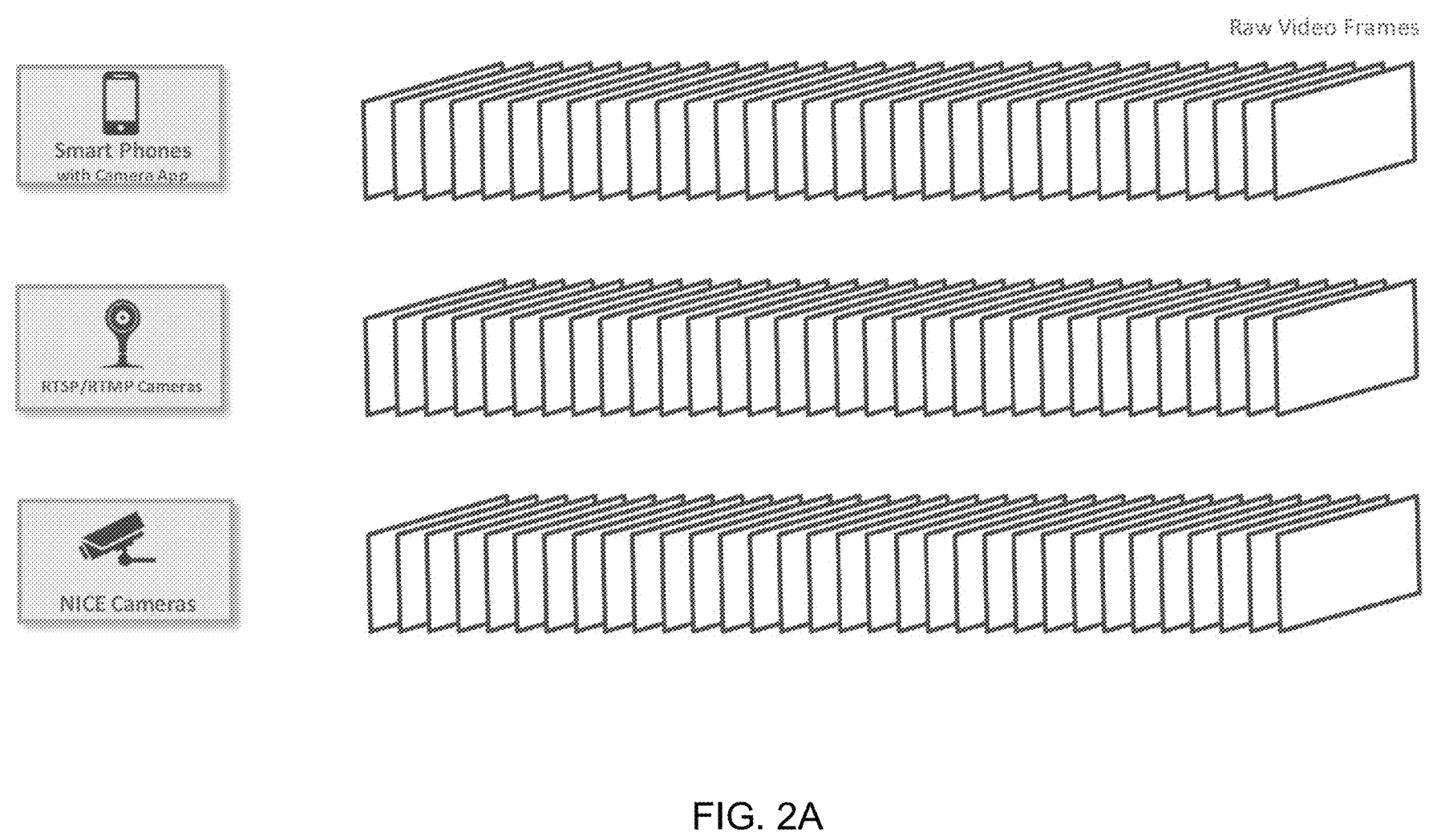
Figure 2B:
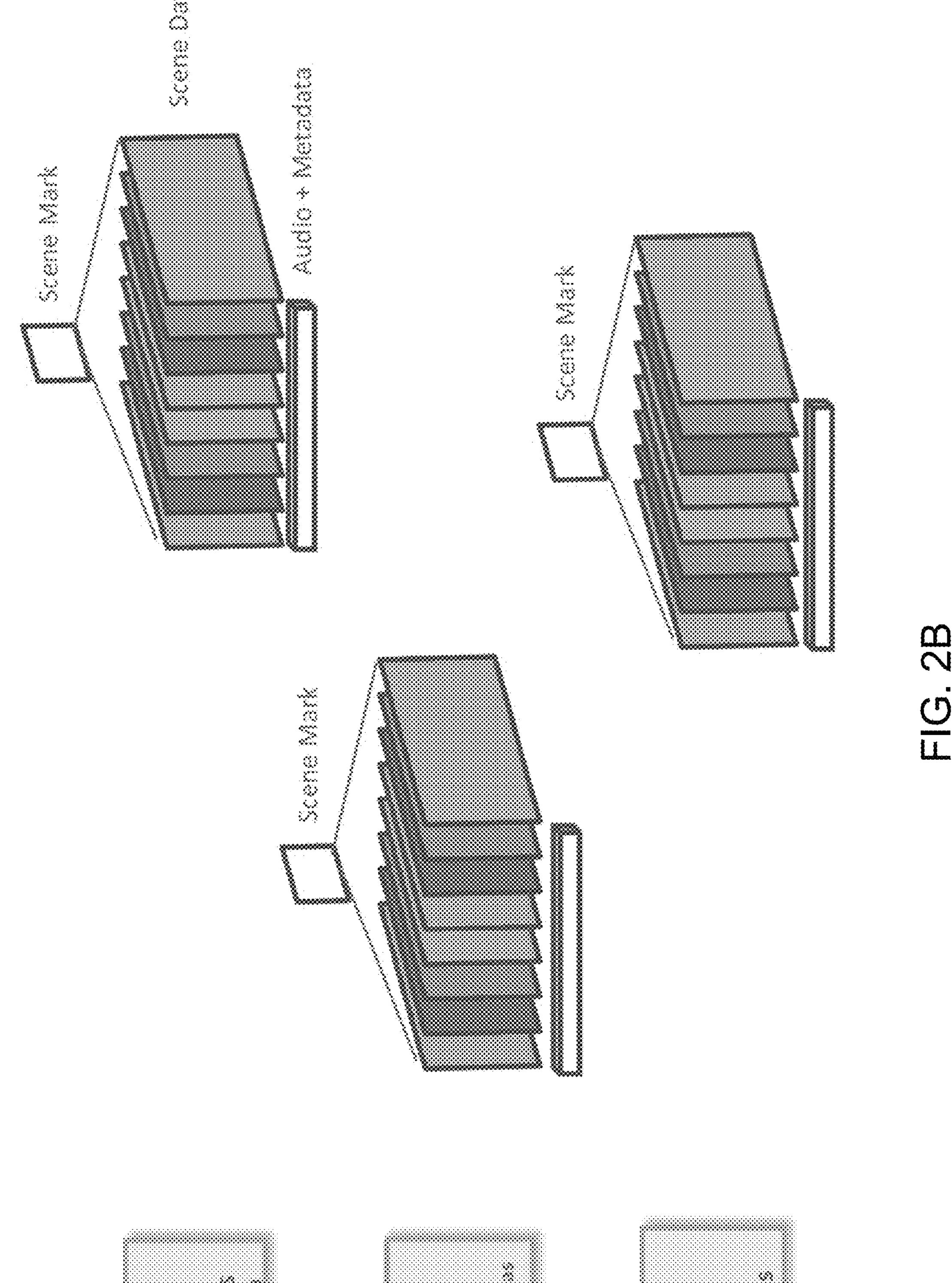

FIGS. 2A and 2B show smart workflow for processing video images. Image sensors that capture video generate a large amount of raw data. Some applications, like home security, may require multiple cameras. Home security can be monitored by different cameras, like doorbell cameras, wall-mounted cameras, or smartphones. Typically, these camera devices generate the raw video frames continuously, as shown in FIG. 2A. However, raw video streams from multiple cameras are difficult to index and search. Not all of this data is needed all of the time. Instead of generating the same unneeded data over and over, smarter workflow allows devices to use different ways to capture the scenes or capture what is going on in the scene, including capturing different types of data, for example different exposures.

So instead of capturing the same unnecessary data over and over 24×7, the workflow may focus on data when a certain event happens, as shown in FIG. 2B. The workflow enriches the data by having different types of capture, which will then be more useful, upon detection of an event such as detection of a human present. For example, if the system tries to detect somebody's face or recognize somebody's face but it is too dark or too bright, the workflow may use different exposures to capture the same scene. In FIG. 2B, the different color frames represent low exposure, mid exposure, high exposure and IR imaging. These are turned on when a relevant event is detected. Then there is a better chance to have a correct recognition or detection. Instead of continuously generating and detecting the same images over and over when nothing is happening, the workflow conditionally captures data. The system stores only important data, not all data. Important events may be marked by SceneMarks and SceneMarks may trigger different types of capture (and storage). SceneMarks can streamline video streams when there is significant event of interest, reducing bandwidth and storage requirement.

Figure 3:
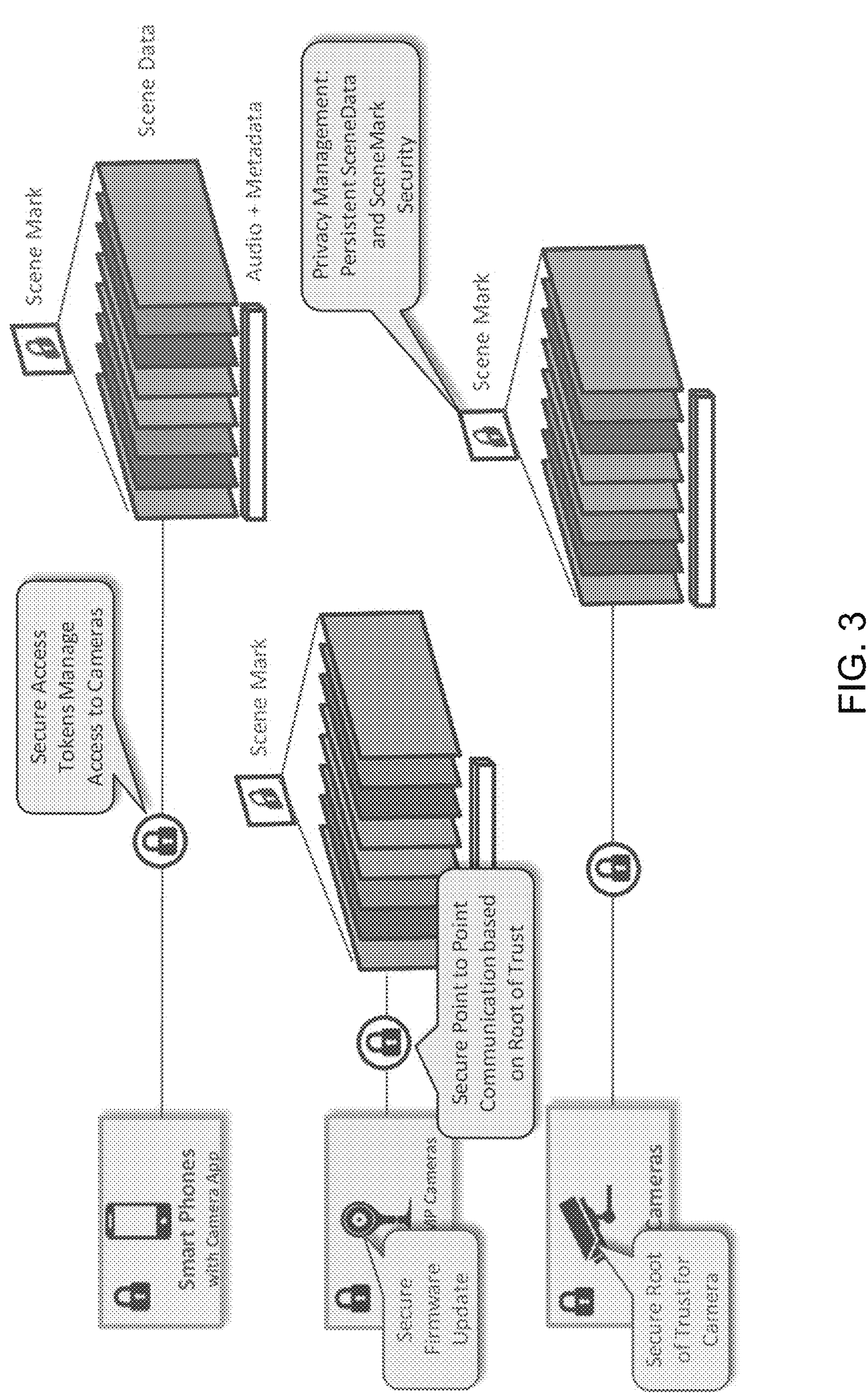
FIG. 3 shows security applied to workflow and data.

FIG. 3 shows security applied to workflow and data, as indicated by the lock symbols. Not all data is available for everybody. Security may be used to ensure that anybody who is trying to capture certain data can access the corresponding devices securely. And then on the secure access or under secure request of getting data, the system generates this data and makes sure this data is encrypted and that device security is not vulnerable to any hack, especially if the data includes personal data. So the system can implement security, privacy and conditional access (e.g., rights of applications to access certain data or components, such as data access for fee). See also U.S. patent application Ser. No. 15/642,311, "Security for Scene-Based Sensor Networks," which is incorporated by reference herein.

Figure 4:
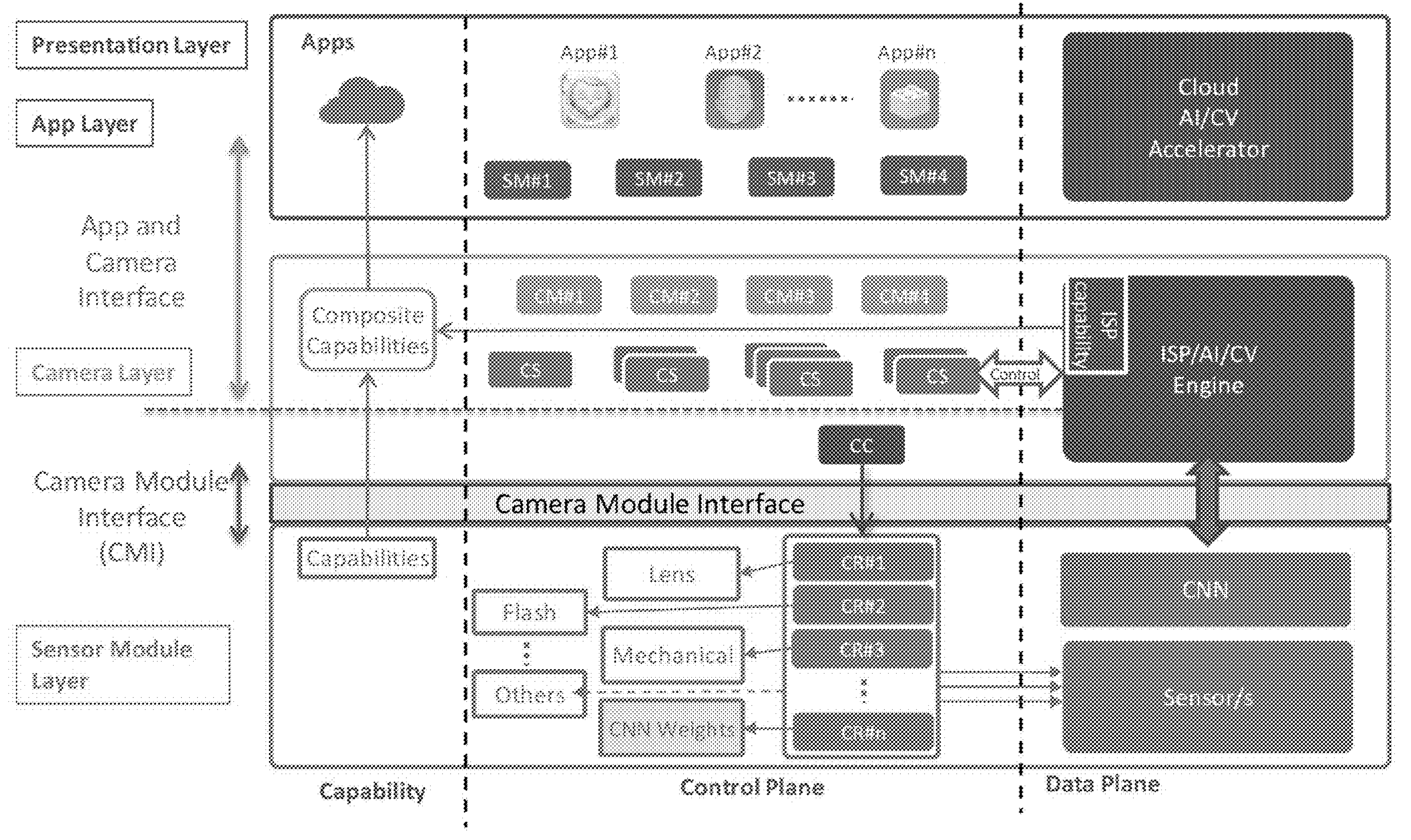
FIG. 4 shows a multi-layer technology stack.

FIG. 4 shows a multi-layer technology stack. From bottom to top, the stack includes a sensor layer (sensor module layer in FIG. 4), a device layer (camera layer in FIG. 4), a cloud layer that contains cloud processing capabilities (part of the app layer in FIG. 4), and an application layer (app layer and presentation layer in FIG. 4). In one approach, the different layers and interfaces between layers are defined by standards. The standard may define how image or other sensor data is captured from sensors and then passed on to the next layer, like a camera module or more processing intensive devices. This device may be a bridge device, which bridges to a sensor that is not standards-compliant, or it may be a processor inside the camera device or IoT device. Sensors are getting more intelligent and may also have some processing power. The encapsulating device also may have powerful processors and probably has some way to communicate to the cloud and application. With different layers and interfaces defined, a custom workflow may be implemented across the different layers from sensors to applications to present the desired contextual data to the end user.

Figure 5:
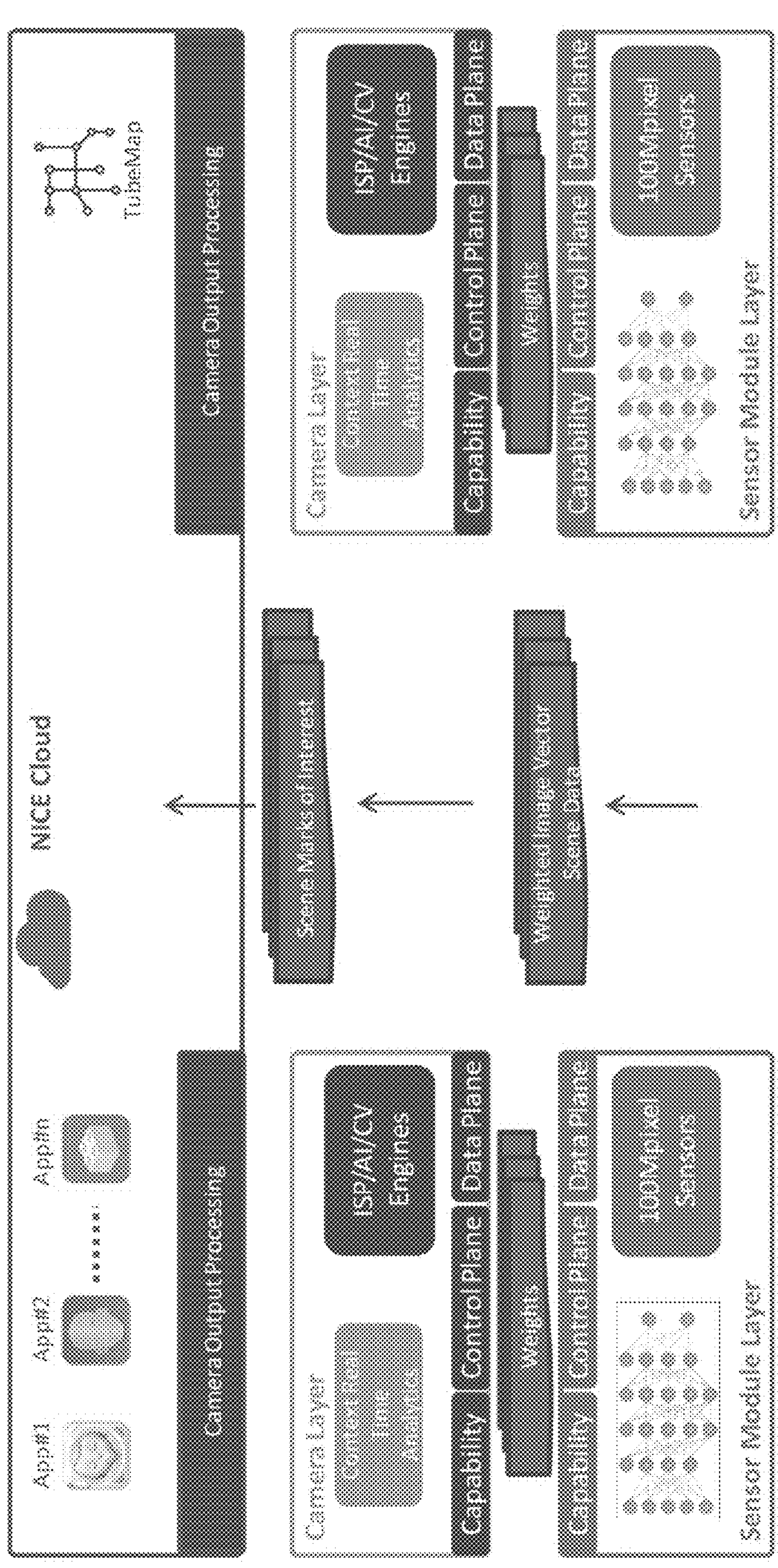
FIG. 5 is another representation of a multi-layer technology stack.

FIG. 5 is another way of showing this layering. There is a sensor module layer on the bottom of the stack, which in this example is a 100-Mpixel sensor. Then there is a camera layer or some other device layer. Then on top of that there is a cloud layer. The left side of FIG. 5 shows a vertical stack for one camera and the right side shows a vertical stack for another camera. Different sensor data can come from multiple cameras, but through this layered approach.

AI and machine learning, such as convolutional neural network (CNN), may be performed by components at any layer. At the sensor layer, the sensor captures images and processes them using CNN to reduce the amount of data passed to the device layer. At the device layer, the sequence of CNN processed images of interests may be processed, also using CNN or other types of AI or CV, generating SceneMarks of interest. At the cloud layer, the SceneMarks of interest from multiple cameras may be analyzed, also using AI, producing the final result desired.

As shown in FIG. 4, the multi-layer stack may also be divided into different planes: capability, control and data. Components on each of the layers have different capabilities to either capture sensor data and/or to process or analyze data. These capabilities may be containerized and referred to as nodes. For example, see U.S. patent application Ser. No. 16/355,705 "Configuring Data Pipelines with Image Understanding", which is incorporated by reference herein in its entirety. Sensor-level nodes may have capabilities to capture sensor data, and the camera or device-level nodes have processing capabilities. Cloud-layer nodes may have a wide variety of powerful capabilities.

The system communicates these capabilities among the different layers. The overall workflow may be deployed by selecting, configuring and linking different nodes at different layers based on their capabilities. A certain device or sensor may be able to capture images using different configurations. It may be able to capture different exposures, at different frame rates, in either color or black/white. Those are sensor capabilities. Knowing what capabilities are available helps the next higher layer to determine how to configure those sensors. The device layer may take those sensor layer capabilities and combine that with its own processing capabilities and then communicate those (composite capabilities in FIG. 4) up to the applications or services running on the cloud. This is the capability plane shown on the left of FIG. 4.

The application or cloud, knowing what kind of capabilities are available, can send control signals to implement the overall workflow. This is the control plane shown in the middle of FIG. 4. This control plane can require a lot of detail if the application is required to directly provide complete control data for every component beginning at the sensor layer all the way through the cloud layer. However, the layering virtualizes this control, so that each layer can deal with a limited number of other layers while abstracting away from the lower layers. For example, the application layer can deal with what kind of event to capture and provide corresponding control data to the device layer. The device layer translates that into control data for the sensor layer. In FIG. 4, the control data from app layer to device layer is packaged into SceneModes, labelled SM #1-4 in FIG. 4. The control data from device layer to sensor layer is packaged into CaptureModes and capture sequences, labelled CM #1-4 and CS in FIG. 4. CC is capture control and CR #N are capture registers in the sensor layer. For further descriptions, see U.S. patent application Ser. No. 15/469,380, "Scene-Based Sensor Networks," which is incorporated by reference herein in its entirety.

In this way, the application can specify the overall workflow by defining the relevant mode (e.g., SceneMode or type of Scene) in which it wants to capture data. Within that mode, the camera or other devices then define the corresponding modes (CaptureModes) for the sensors. For example, assume the task is to recognize a person's face. For this, the workflow may want to capture multiple shots of the face at different exposures and different angles. So the SceneMode may be face detection mode or object detection mode. That SceneMode is communicated to the camera device layer and the device layer then defines the relevant types of CaptureModes. The CaptureMode is translated to the sensor layer and then the sensor can determine the right types of data capture sequences. This is a benefit of having these virtualized layers and having control somewhat virtualized between layers.

These capabilities and controls are translated from top layer to bottom sensor layer. Data can be transferred in the reverse direction from sensor to device, and device to cloud. In doing that, the sensor generates the raw sensor data. The devices can then process that data with more powerful processors and with more AI and computer vision (CV) algorithms applied. It can select what is important, what is relevant, and then make this data more indexable or searchable and present that data to the cloud. The cloud can then use more powerful processing with access to more resources to further analyze the data. In this example, the sensor and device layers are "edge" components, and the cloud and app layers are away from the edge. For convenience, nodes that are not on the edge will be referred to as "cloud", even though they may not be actually "in the cloud."

Figure 6A:
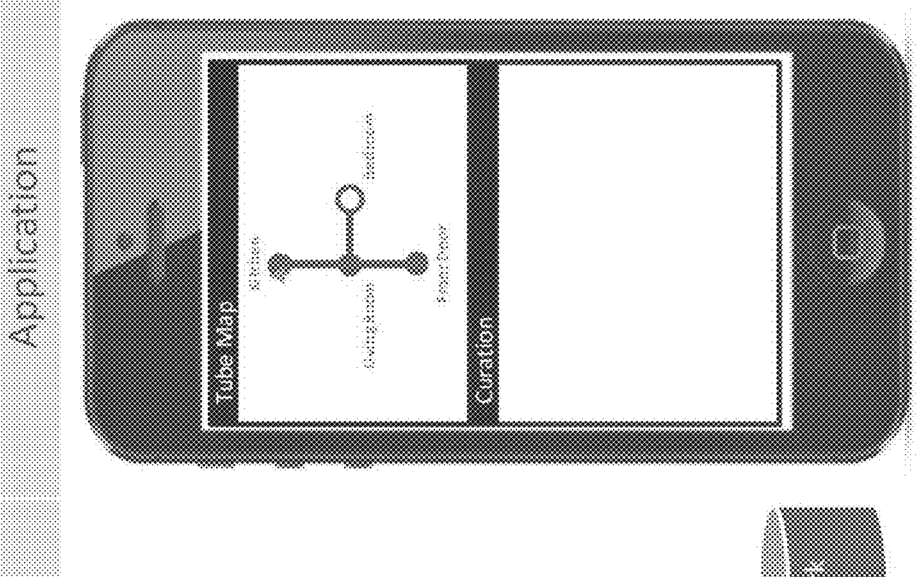
FIGS. 6A-6D show an example of a custom workflow using SceneMarks and SceneData.
Figure 6A:
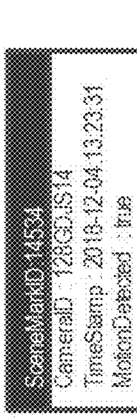
Figure 6A:
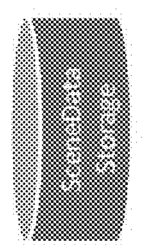
Figure 6A:
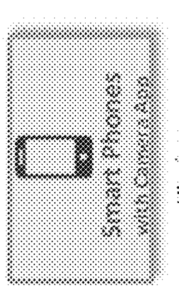
Figure 6A:
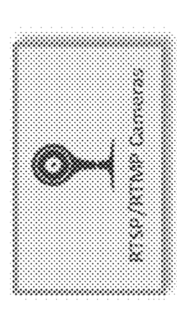
Figure 6A:
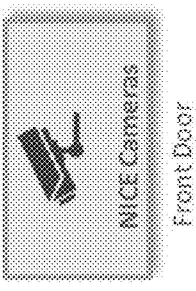
Figure 6B:
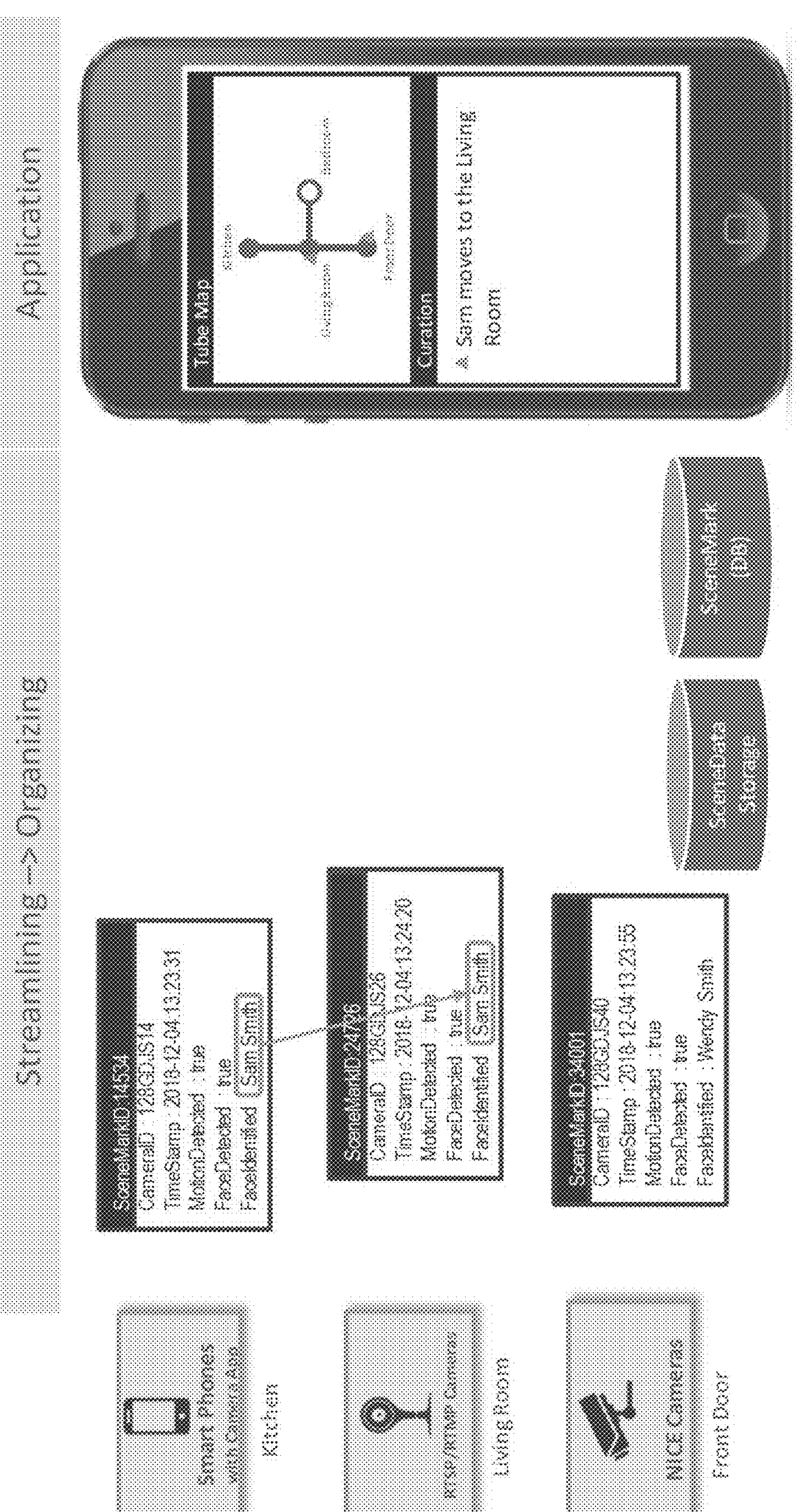

FIGS. 6A-6D show an example of a custom workflow using SceneMarks and SceneData. In this example, there is a camera in the kitchen and another camera in the living room and another camera at the front door of the house. The workflow has access to a Tube Map that shows the proximity of the different cameras to each other. In FIG. 6A, Sam Smith appears in the kitchen. The camera in the kitchen detects somebody, which is a trigger event that generates a SceneMark. The SceneMark includes the camera ID, timestamp, and contextual metadata of MotionDetected=true, FaceDetected=true, and FaceIdentified=Sam Smith. In FIG. 6B, the camera in the living room some time later detects the same person moving from the kitchen to the living room, which is consistent with the Tube Map. The appearance of Sam Smith in the living room also generates a SceneMark. The workflow for the application analyzes the data, including SceneMarks, understands the context of the situation and generates the notification "Sam moves to the Living Room." At the same time, Wendy Smith arrives at the front door and is detected by the front door camera. This also generates a SceneMark.

Figure 6C:
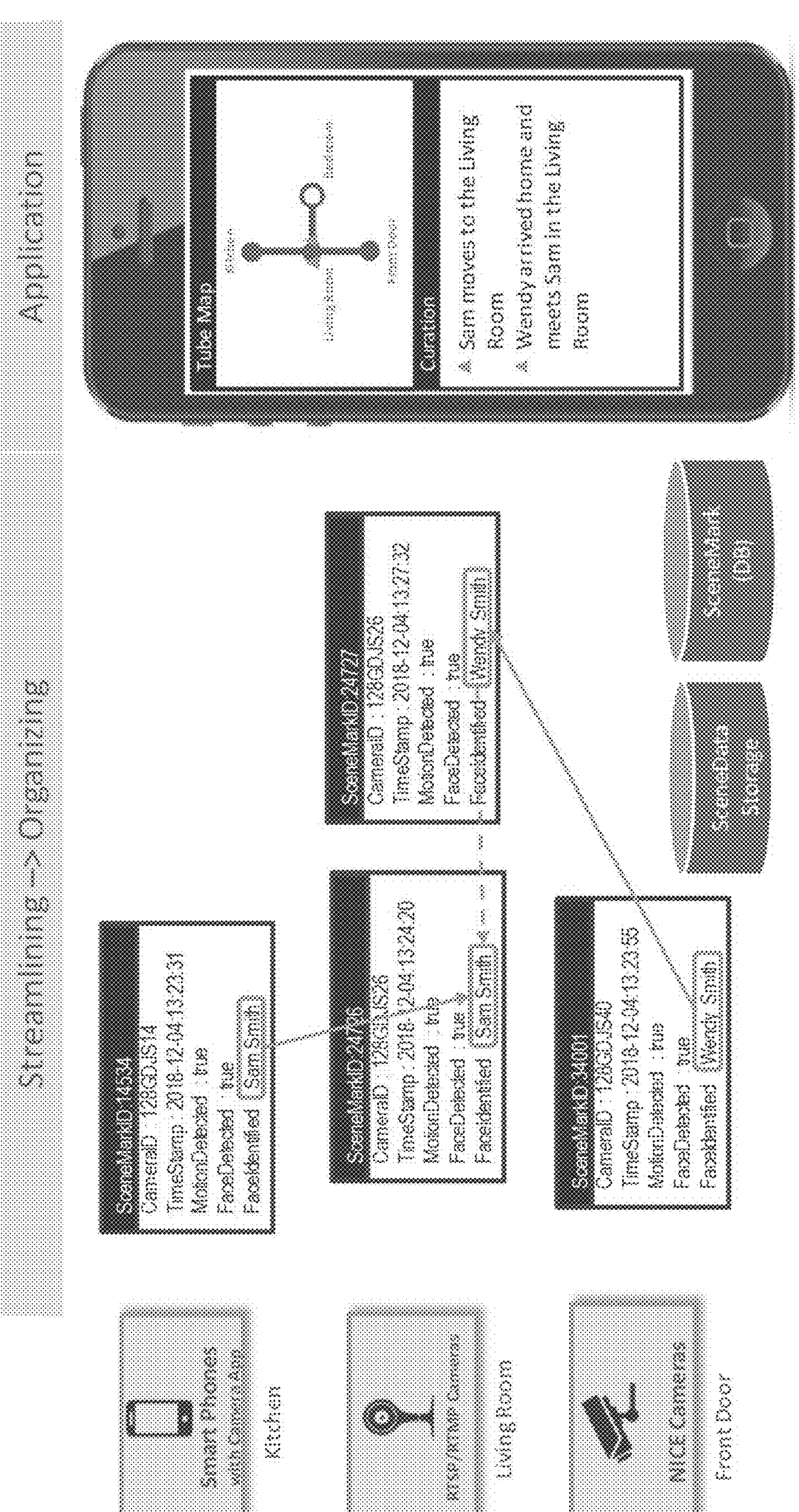

In FIG. 6C, Wendy moves to the living room. The living room camera detects Wendy's presence and generates the corresponding SceneMark. From the previous SceneMarks, the workflow knows that Sam is already in the living room. Therefore, Sam and Wendy meet in the living room and a notification is generated. Although not shown in FIG. 6C, this could generate a higher-level SceneMark for the meeting. That SceneMark is generated based on the analysis of the two SceneMarks for Sam in living room and Wendy in living room. Note that of all the data that is captured and analyzed, the workflow reduces this to two notifications that capture the high-level significance of what is happening. As far as the end user is concerned, he just gets a notification that Sam moved to the living room, and another notification when Wendy arrived and met Sam in the living room. This meaning is realized based on the underlying processing of the SceneData and SceneMarks.

Figure 6D:
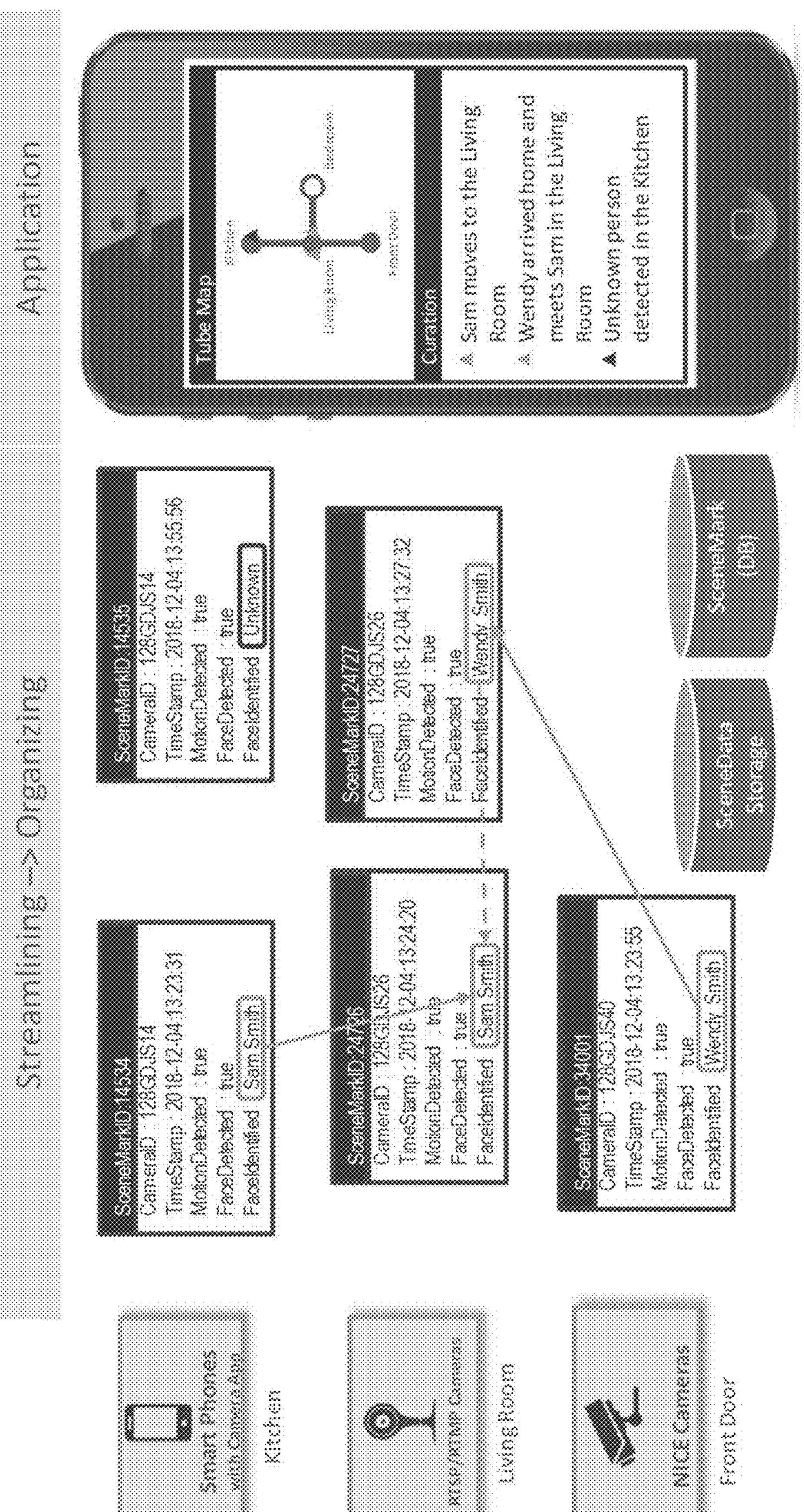

In FIG. 6D, an unknown person shows up in the kitchen, possibly an intruder because FaceIdentified=Unknown. The workflow analyzes the data and produces the notification "Unknown person detected in the Kitchen." By streamlining the events of interest and organizing analyzed information from multiple cameras, this reduces bandwidth/storage requirements and eliminates constant false alarm/notification caused by any motion. It also provides higher level realization and contextualization of the underlying raw data and events.

The custom workflow for an application could be determined by the application itself. Alternatively, it could be determined by a separate service, which in the following example is referred to as the curation service or Scene Director. FIGS. 7A-7E show an example of Scene Director software used to deploy the custom workflow for an application. The left side of these figures shows three different cameras or devices. In the middle is the cloud, which may provide additional capabilities. The overall workflow filters sensor data by using some sort of AI or computer vision, for example to identify events. The workflow also sorts and filters data to reduce the total volume of data, for example by capturing contextual metadata in SceneMarks. The workflow may also organize these SceneMarks so they can be indexed and searched. They may also be stored in the cloud and published for others to use.

On the right side of the NICE cloud is a Scene Director, and then there are Apps and Services which may not be NICE-compliant. The Scene Director is a software service that determines and implements the custom workflow for the Apps. The role of the Scene Director may be analogized to that of a movie director. When you make a movie, there are many cameras shooting the same scene. The movie director decides which camera footage to use, how to splice it together, etc. Sometimes only one camera can capture the entire story. Sometimes multiple cameras are used to show the story. If somebody is throwing a ball in sports, the director may use one camera to show the passer, one to show the ball in flight, and a third camera to show the receiver. Those kinds of sequences of a scene can be made by multi-camera capture.

Figure 7A:
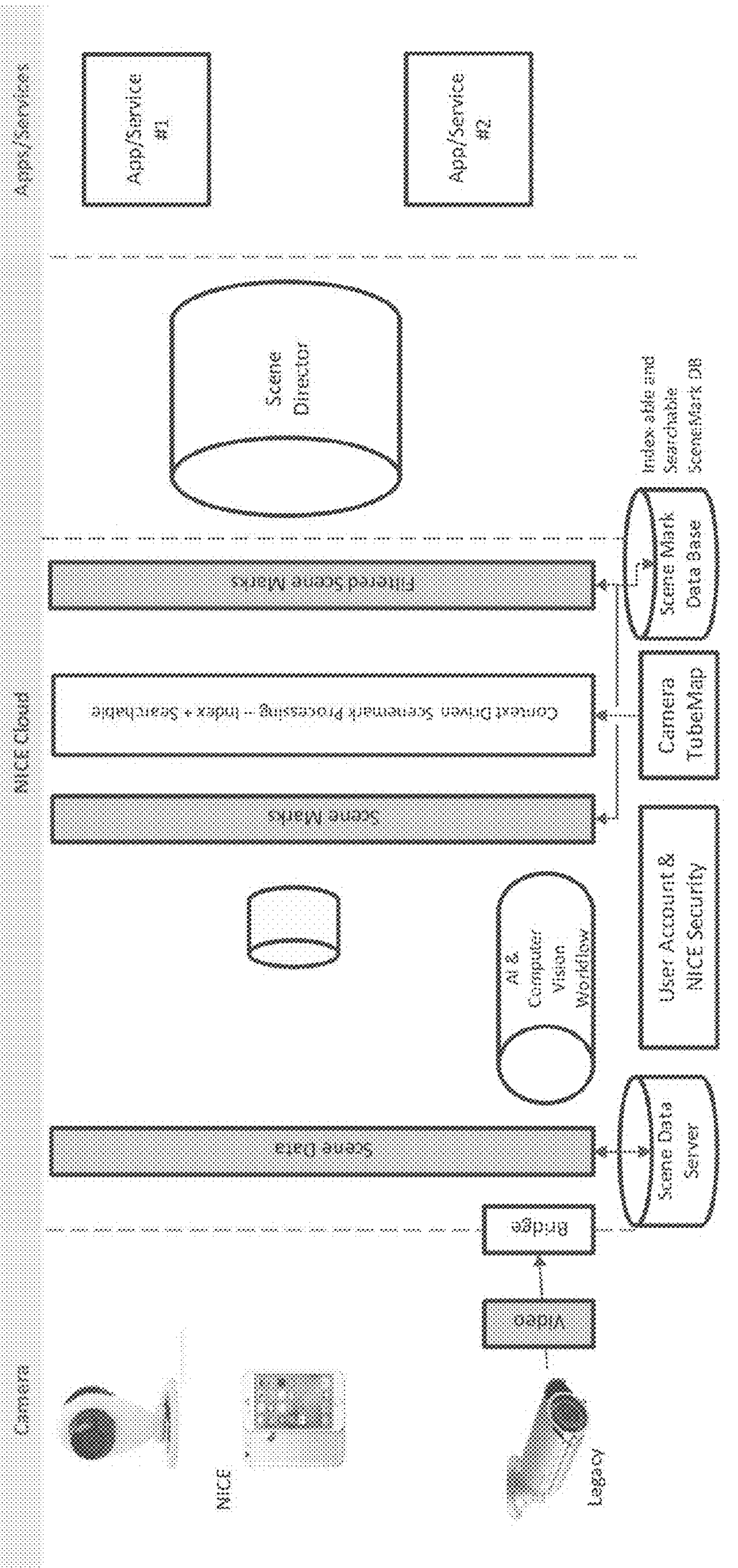
FIGS. 7A-7E show an example of a Scene Director software curating a custom workflow in a multi-layer technology stack.
Figure 7B:
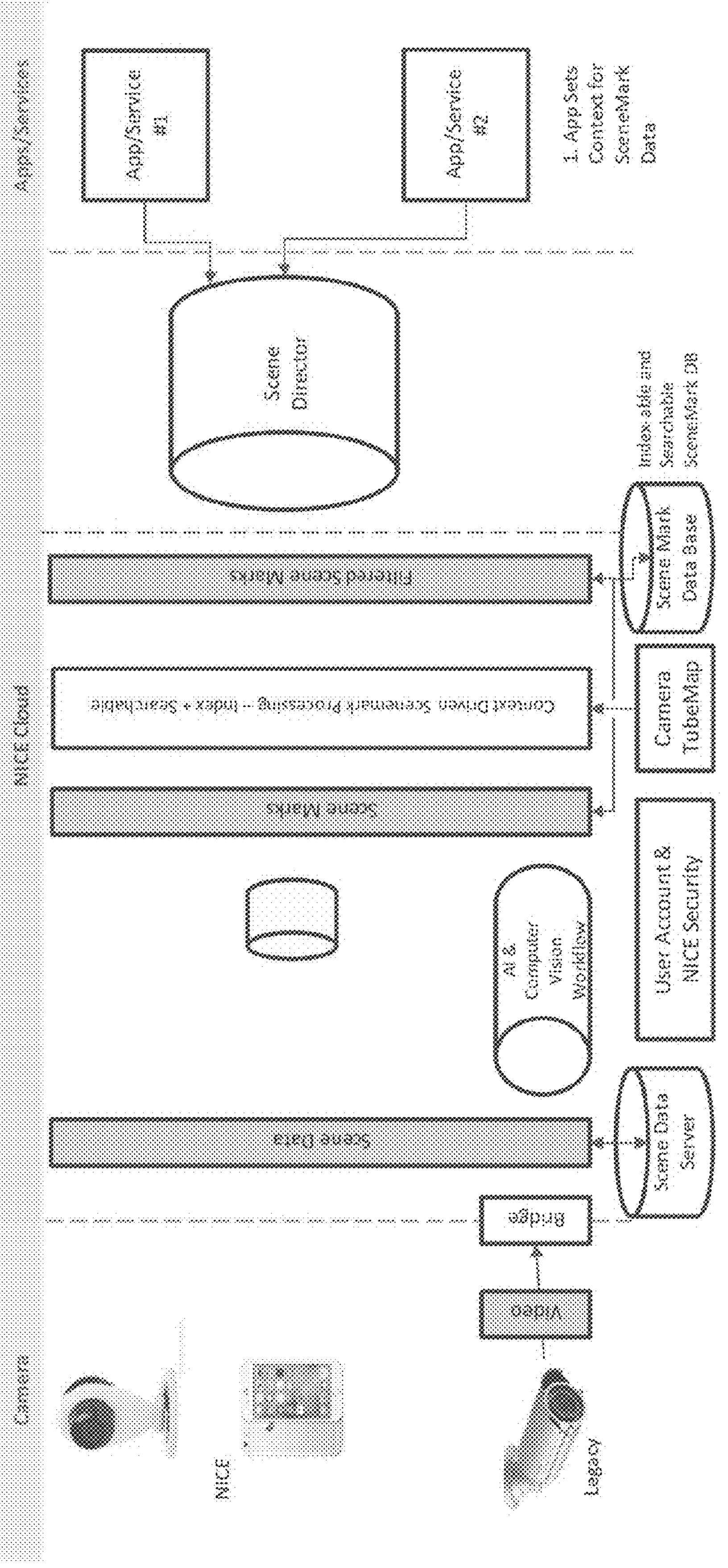

The Scene Director plays an analogous role here. In FIG. 7B, the App sets the requirements for its task: what is the App trying to do or what does it really care about? These requirements may require sophisticated interpretation or contextualization of sensor data captured by sensors monitoring the relevant space, including realizing what data may be not relevant. The desired task will determine what raw sensor data is captured and what processing and analysis will be performed to develop a custom set of data packages that is useful to the App. This typically will include sensor data and contextual metadata. The Scene Director software receives these requirements and, like a movie director, determines which components in the stack to use, how to configure those components, how to link those components into a custom workflow, and which data captured and produced by the workflow to use and how.

Figure 7C:
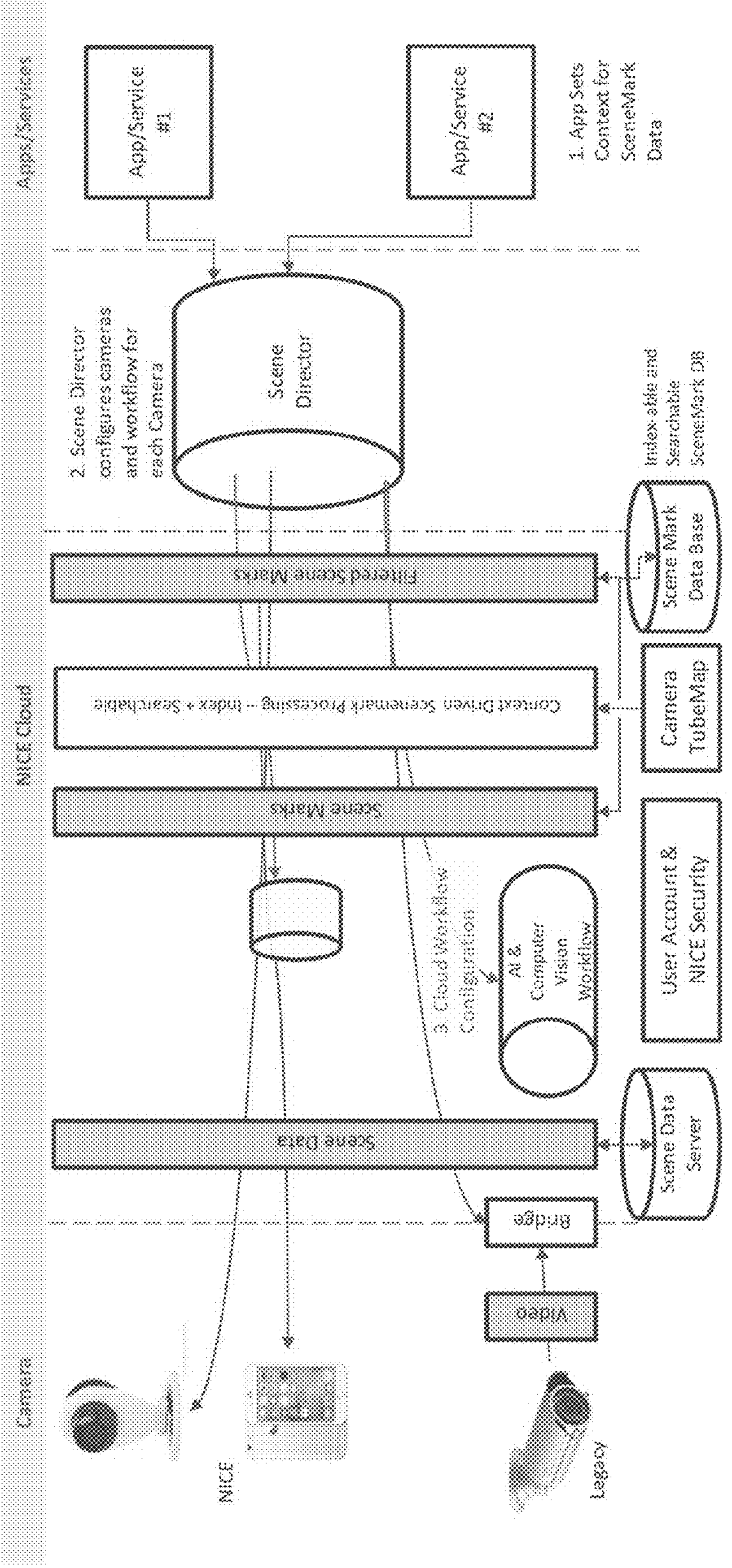
Figure 7D:
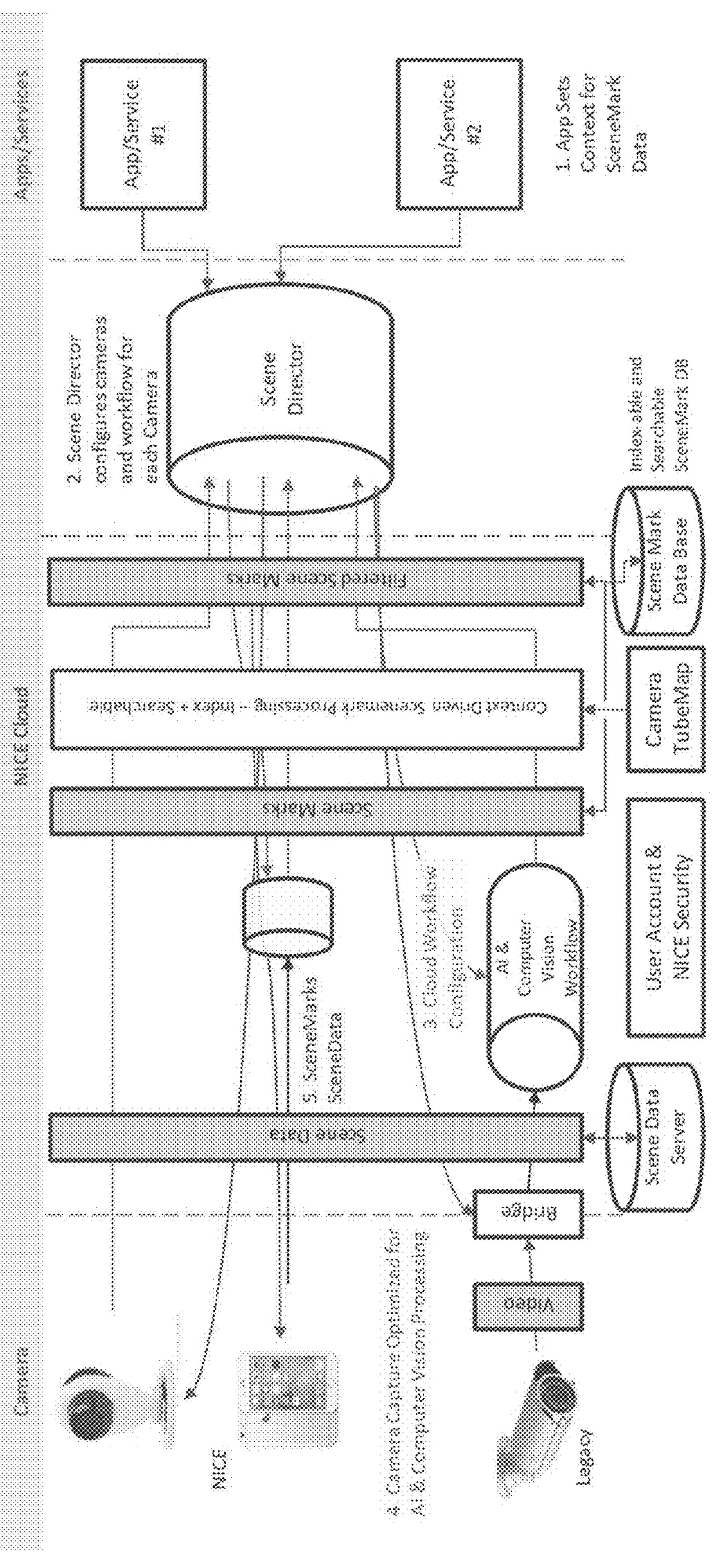
Figure 7E:
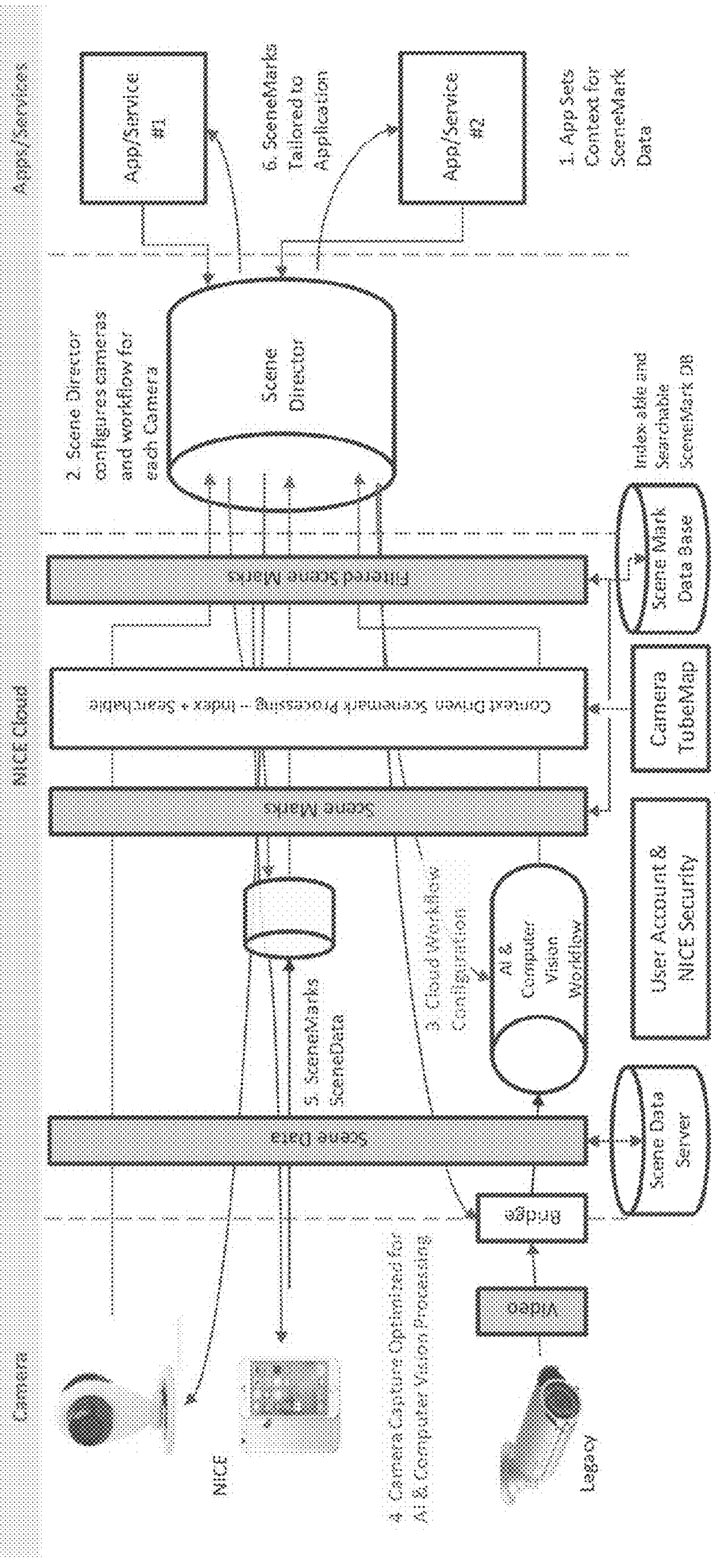

The Scene Director then implements the workflow by sending control data to the different components in the stack, as shown in FIG. 7C. It may do this directly to every component, or indirectly through the use of abstracted layers as described previously. The control data will generally be referred to as workflow control packages. The sensors capture the relevant raw data, and other components in the stack perform processing and/or analysis to generate SceneData and SceneMarks, as shown in FIG. 7D. The workflow may be dynamic, changing based on the captured data and analysis. The Scene Director may summarize or filter the SceneMarks or other data sent back to the Apps, as shown in FIG. 7E.

In FIG. 7, the flow starts from the right side. Control and configuration data, such as CurationModes, SceneModes and CaptureModes, flow from right to left. CurationModes are set by the requirements and semantics of the tasks requested by the Apps. The Scene Director configures cameras and workflow for each camera by choosing SceneModes according to the CurationMode from the Apps. At the device level, depending on a camera's capabilities, the SceneModes of the cameras are set via the NICE API to generate SceneMarks of interest. Cameras control the sensor modules with CaptureModes to acquire the right video images and then apply certain analytics processing to generate SceneData and lower level SceneMarks.

The sensors capture sensor data according to the control data. This is passed through the stack back to the Apps. The SceneData is filtered and organized and presented back to the Scene Director and Scene Director curates the relevant SceneMarks to create the final "story" to present to the Apps on the right side.

Figure 8:
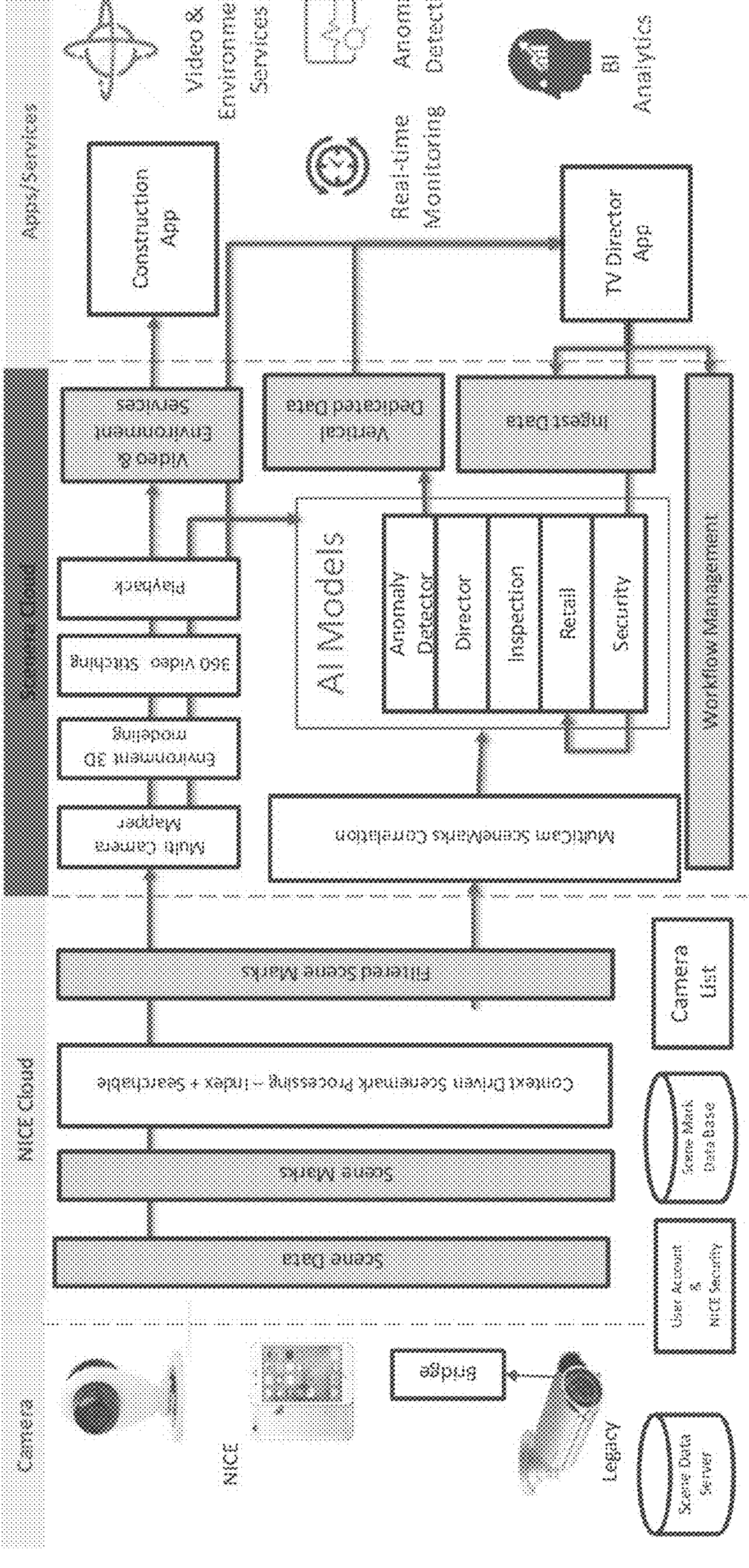
FIG. 8 shows more details of the Scene Director software.

FIG. 8 shows more details of the Scene Director software. In this figure, the Scene Director is labelled as the Scenera Cloud, to distinguish it from other cloud services. The components shown in the Scenera Cloud are regular components available in the stack, which are used by the Scene Director. When data is coming in from the NICE cloud originating from the cameras, the Scene Director calls on components in the stack to map this data. Some of the data may be run through AI, different AI models, for example to detect or analyze certain events. A summary of events (the curated scene) is then presented to the applications.

The Scene Director or other software may be used on top of the NICE basic service to provide increased value add. One class of services is multi-camera and SceneMarks data analytics services such as:

- Multi-camera and SceneMarks interpretation to create environmental aware capabilities
- Temporal and spatial features
- Multi-camera curation
- Market-specific AI models for NICE cameras
- Market-specific SceneMarks interpretation
- Data analytics combining SceneMarks and customer's input data Another class of services is video and environment services, such as:

- Physical relation scheme between cameras
- Physical model of the environment
- Stitched video from multi-cameras into a bigger picture
- Video storage, playback and search.

FIGS. 9-13 describe sequential capturing of related events and images based on SceneMarks. This describes how workflow can capture and generate related SceneMarks from different cameras depending on what happens and what events are triggered. For example, if a person is entering a building, a camera outside the building will capture images that trigger an event of somebody entering the building. Then the workflow expects that other cameras in that vicinity will soon capture related events. This is the ability to sequentially capture related events based on the generation of earlier SceneMarks. This is used to build the workflow for curating content. In other words, one camera generates a SceneMarks and communicates the SceneMark to other nearby cameras. This can help build curated content from multiple cameras. The curation of content and events from multiple cameras and other sources facilitates higher level interpretation and cognition of the environment and its setting. For example, if a scene unfolds across a larger space monitored by multiple cameras, the full context and significance of the scene may be better understood if the video clips from different cameras can be interpreted together. Events in one clip may provide context for, imply, clarify or otherwise relate to events in another clip.

Figure 9A:
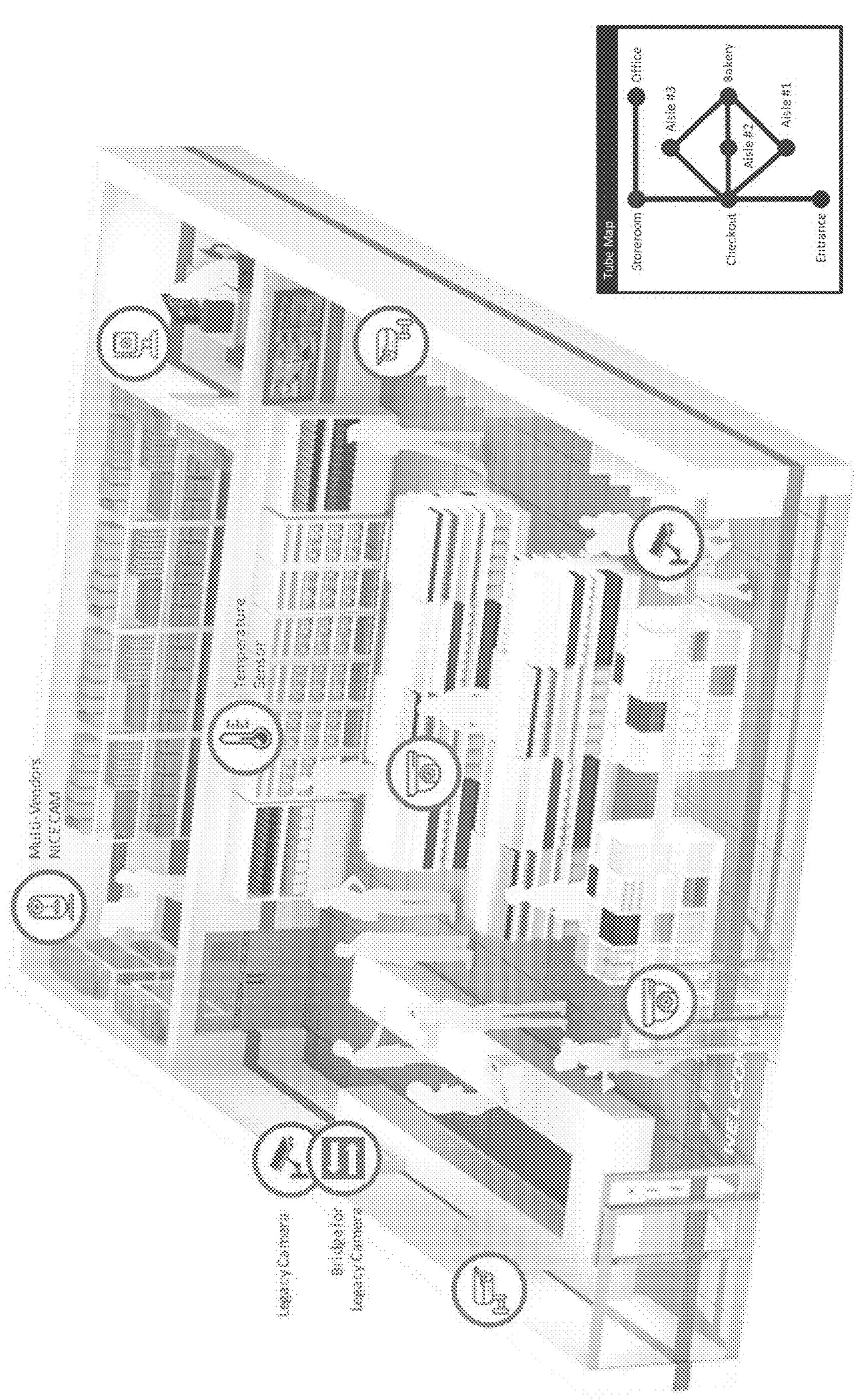
FIGS. 9A-9D show an example of sequential capture of related images based on SceneMarks.
Figure 9B:
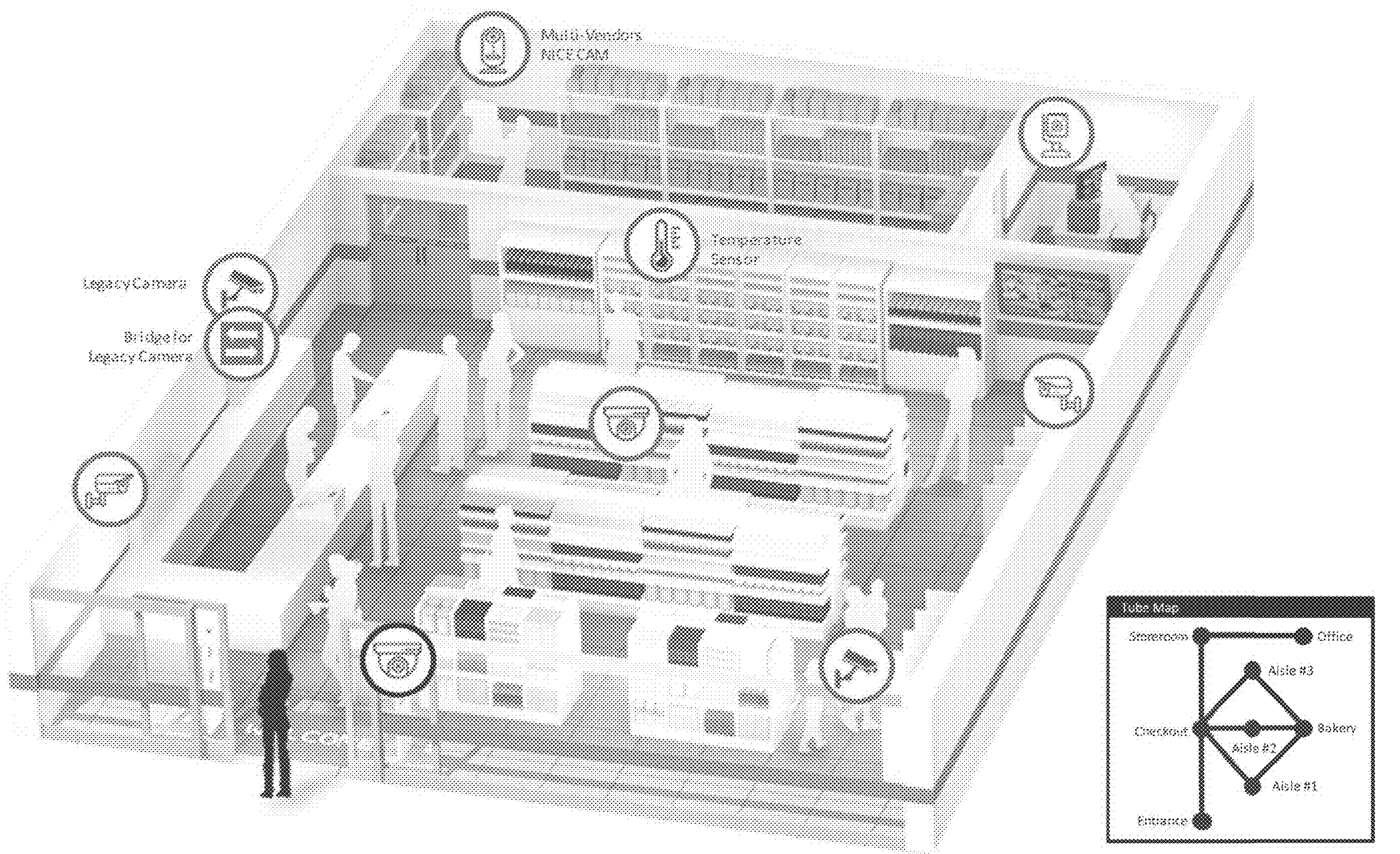
Figure 9C:
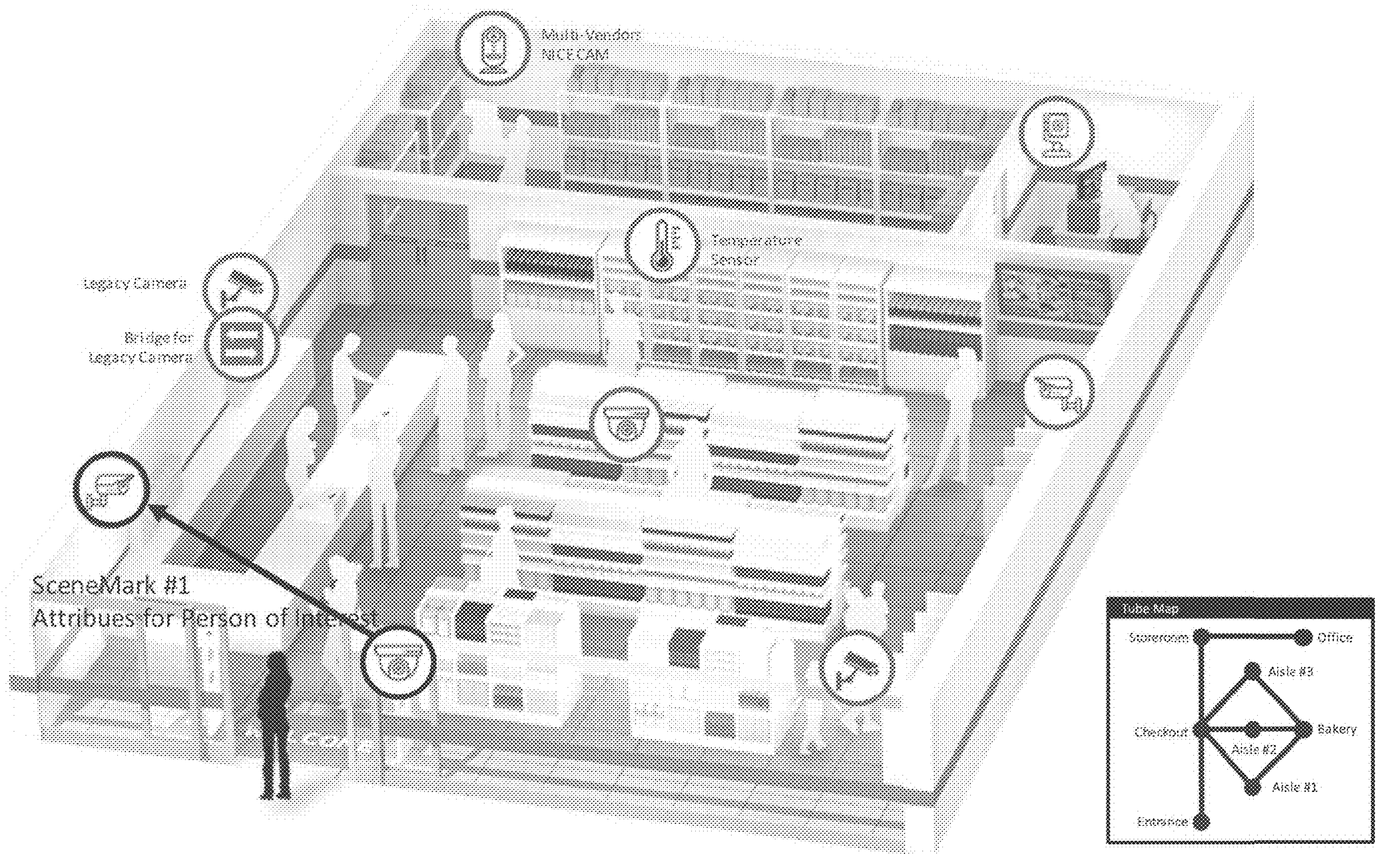
Figure 9D:
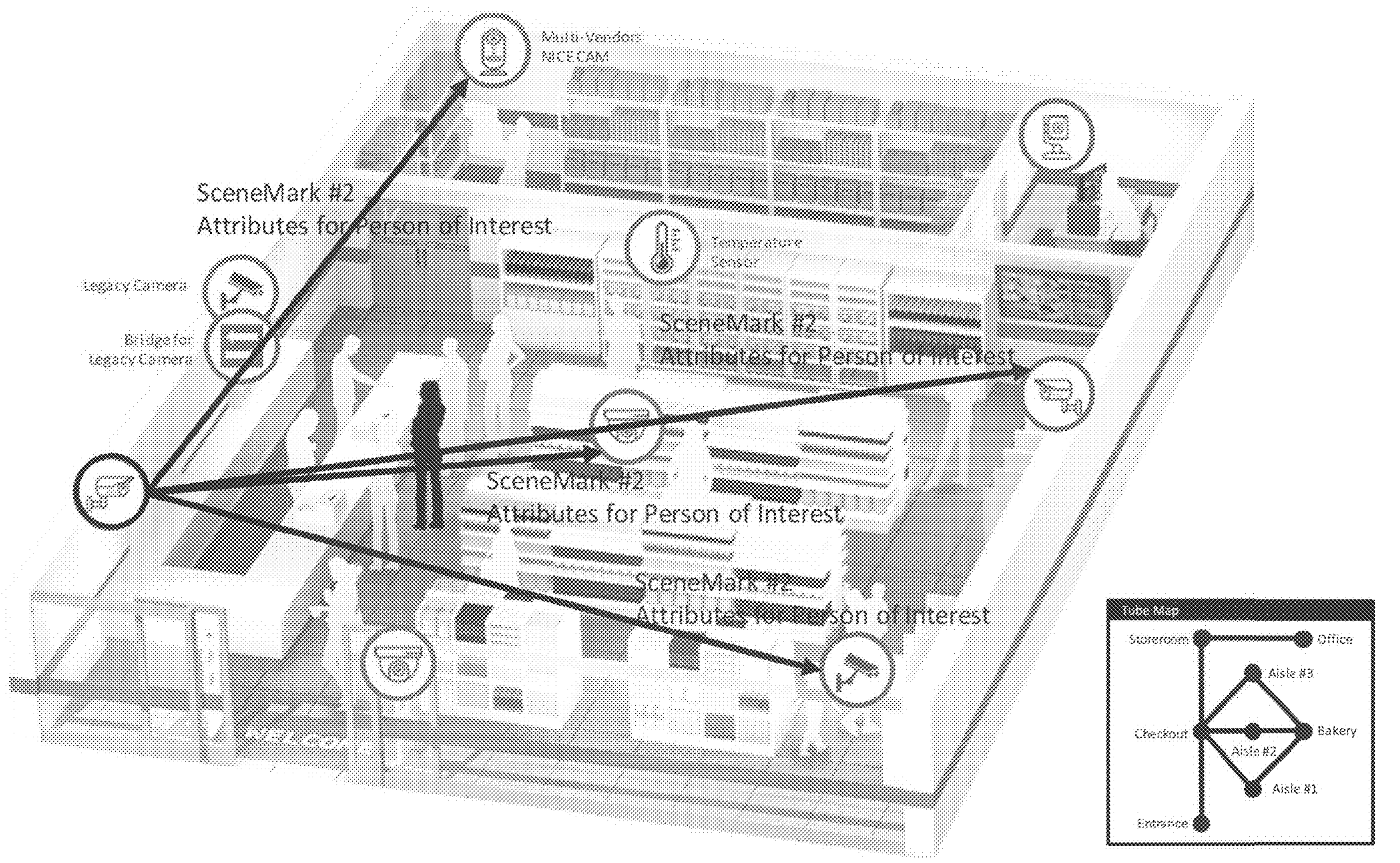

FIGS. 9A-9D show an example of sequential capture of related images based on SceneMarks. As shown in FIG. 9A, a retail store has an entrance and many aisles. Most customers come in through the entrance and browse through the store looking for certain products. Maybe they will go to the bakery section, and then they go to the refrigerator section and then they come to the checkout section to pay. The retail store is monitored by different cameras and sensors, and there is a Tube Map that shows the relative camera locations. When a person enters (FIG. 9B), the entrance camera detects that and a SceneMark is generated. This SceneMark is used to notify other cameras in the vicinity, according to the Tube Map. FIG. 9C shows notification of a checkout camera when a SceneMark is generated by the exterior entrance camera, because that is the only possible path for the person. FIG. 9D shows notification of multiple possible next cameras, for the SceneMark generated by the checkout camera. Upon receiving the SceneMark, the cameras that receive the forwarded SceneMark may capture SceneData relevant to the particular event. This is helpful because other cameras are now expecting this person and can tailor their data capture and processing. For example, if the person is already identified, it is easier for the next camera to confirm it is the same person than to identify the person from scratch.

Figure 10:
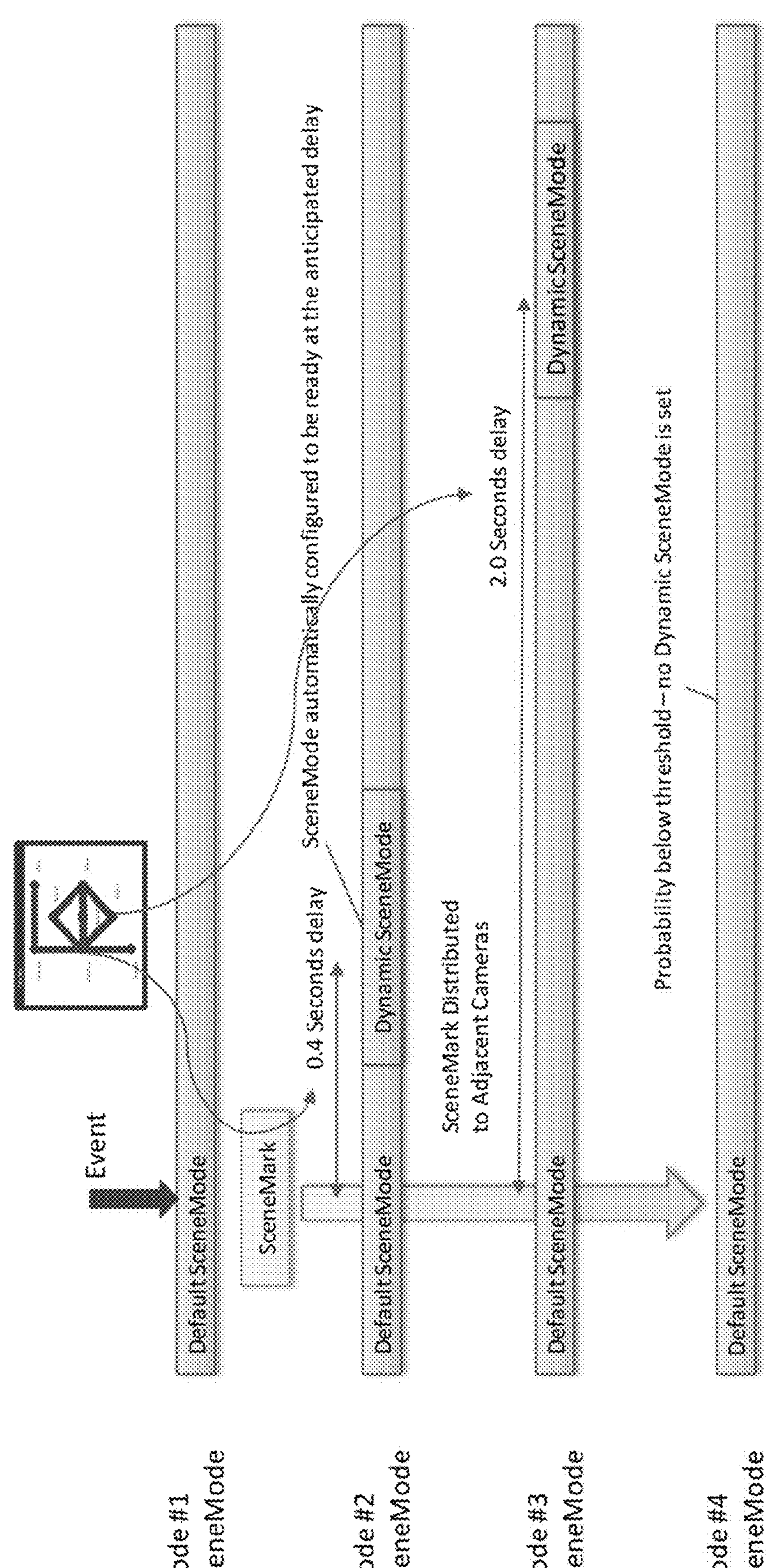
FIG. 10 shows an example of dynamic SceneModes triggered by SceneMarks.

FIG. 10 shows configuration of cameras triggered by SceneMarks. In this figure, the cameras are referred to as nodes and, in general, this approach may be used with any components (nodes) in the workflow, not just cameras. The Tube Map is used as a mechanism whereby, when one node detects an event or trigger, the workflow uses the Tube Map to determine nearby nodes and schedules different SceneModes or capture sequence configurations for the nearby nodes. The SceneMark triggers the receiving nodes to be optimally configured to capture the person or object of interest. Appropriate AI models may be loaded onto the receiving nodes. The Tube Map can also provide the expected probability of a person appearing in one camera and then appearing in another camera, and the expected delay to go from one camera to the next. This allows the workflow to anticipate the person appearing and to set up the correct SceneMode for that window of time. In FIG. 10, an event occurs, which is the red arrow. This generates a SceneMark, which is used to notify other cameras, which can then switch from a default SceneMode to a more appropriate SceneMode during the expected window of arrival. In FIG. 10, node #2 (e.g., the closest nearby camera) switches to the alternate SceneMode after 0.4 second delay, node #3 switches after 2.0 second delay, and node #4 does not switch at all because the probability is too low. This business logic may reside in the nodes themselves, consistent with the layering approach.

Figure 11A:
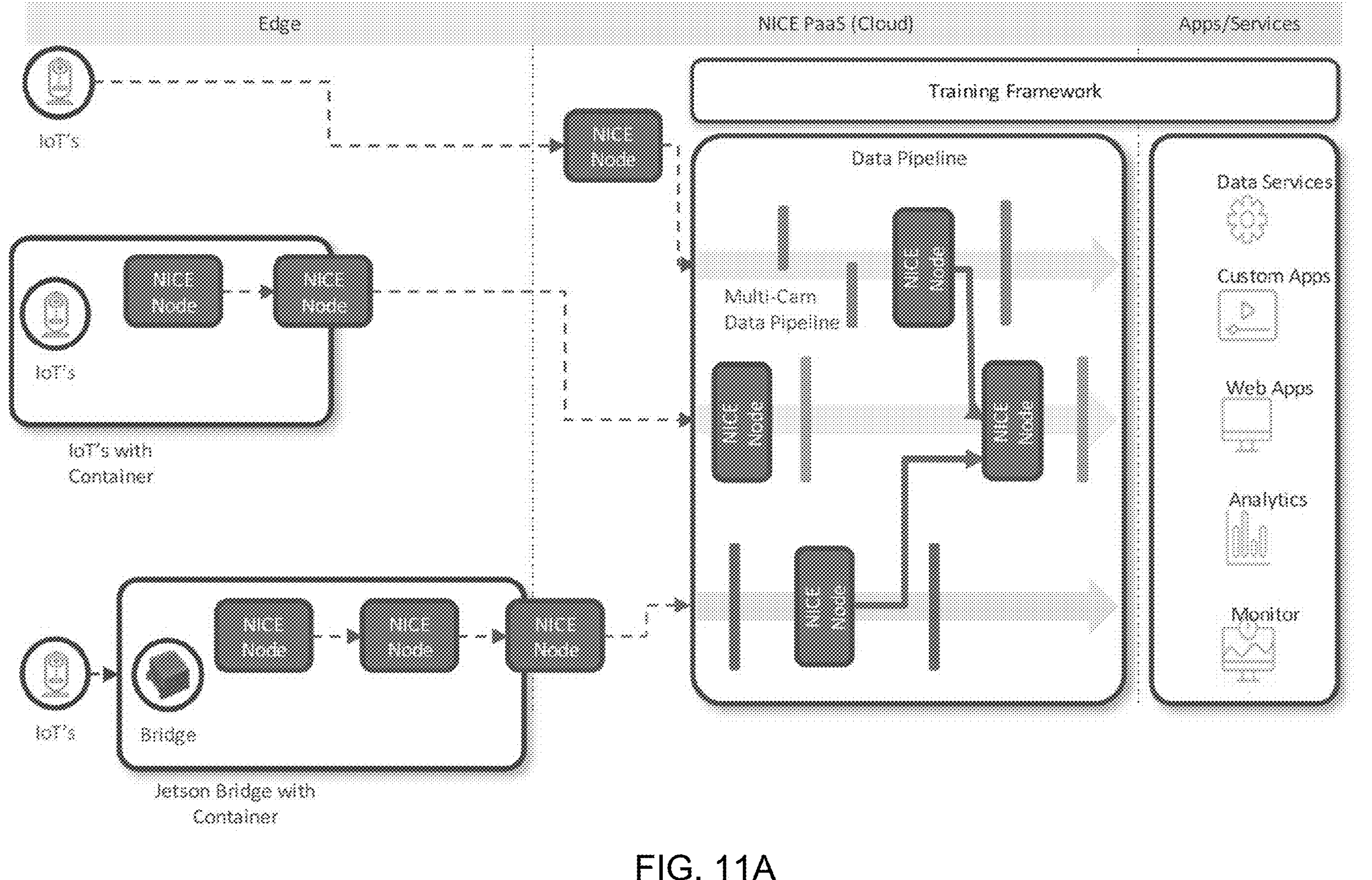
Figure 11B:
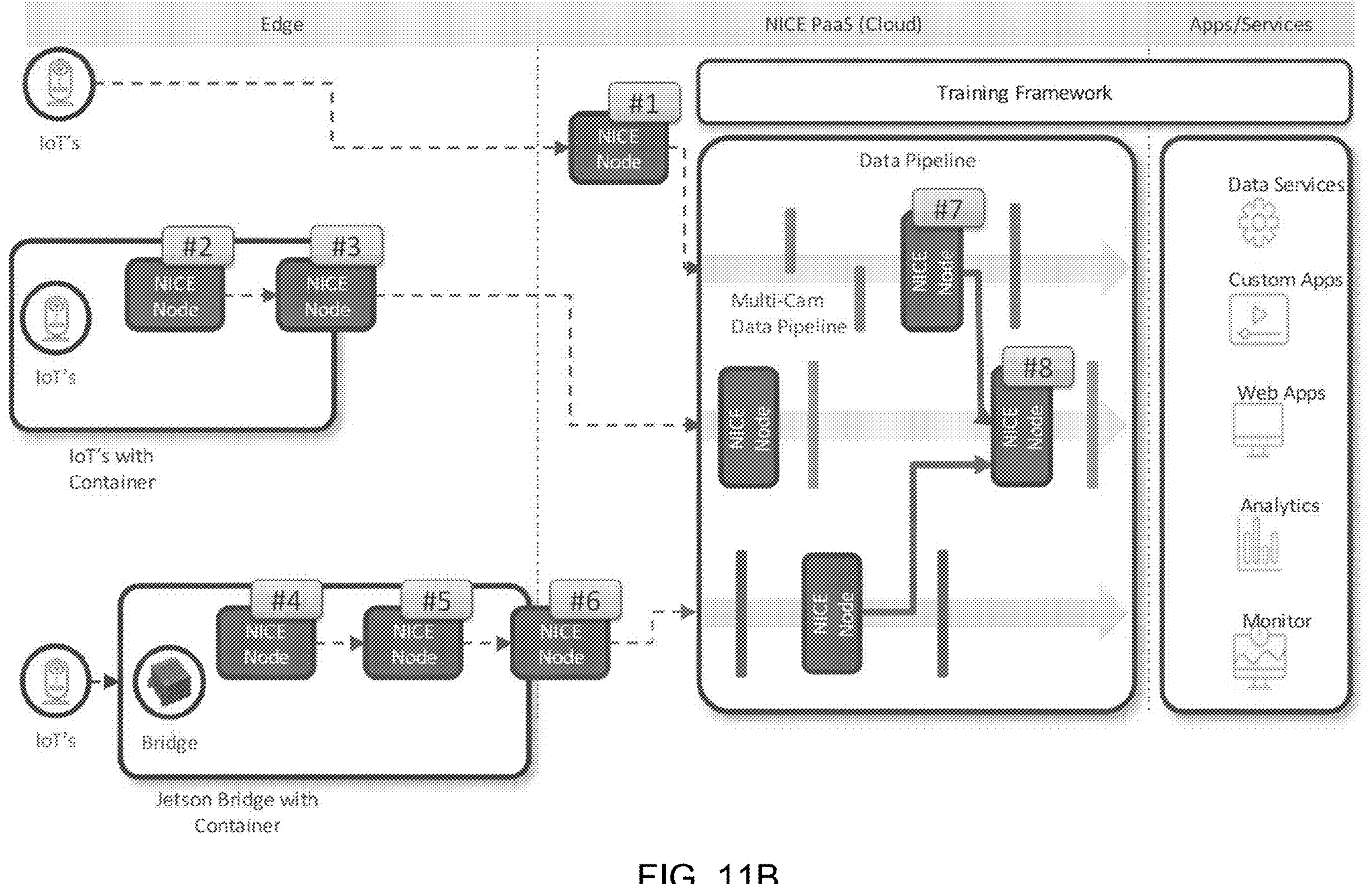

FIGS. 11A-11C shows a sequence for structuring SceneMarks from multiple cameras. FIG. 11A shows a multi-layer technology stack with multiple nodes in blue. FIG. 11B shows events #1-8 detected by nodes in the stack. Each event generates a SceneMark, as shown in FIG. 11C. Some SceneMarks trigger other nodes to capture SceneMarks. These SceneMarks serve as notifications to other nodes to set up their dynamic SceneModes, and those SceneModes generate their own SceneMarks. For example, SceneMark #3 is triggered by SceneMark #1, as indicated by the Trigger SceneMark field. This creates a summary of events in the form of a linked list of SceneMarks which are generated by some initial trigger plus the subsequently generated SceneMarks.

Figure 12:
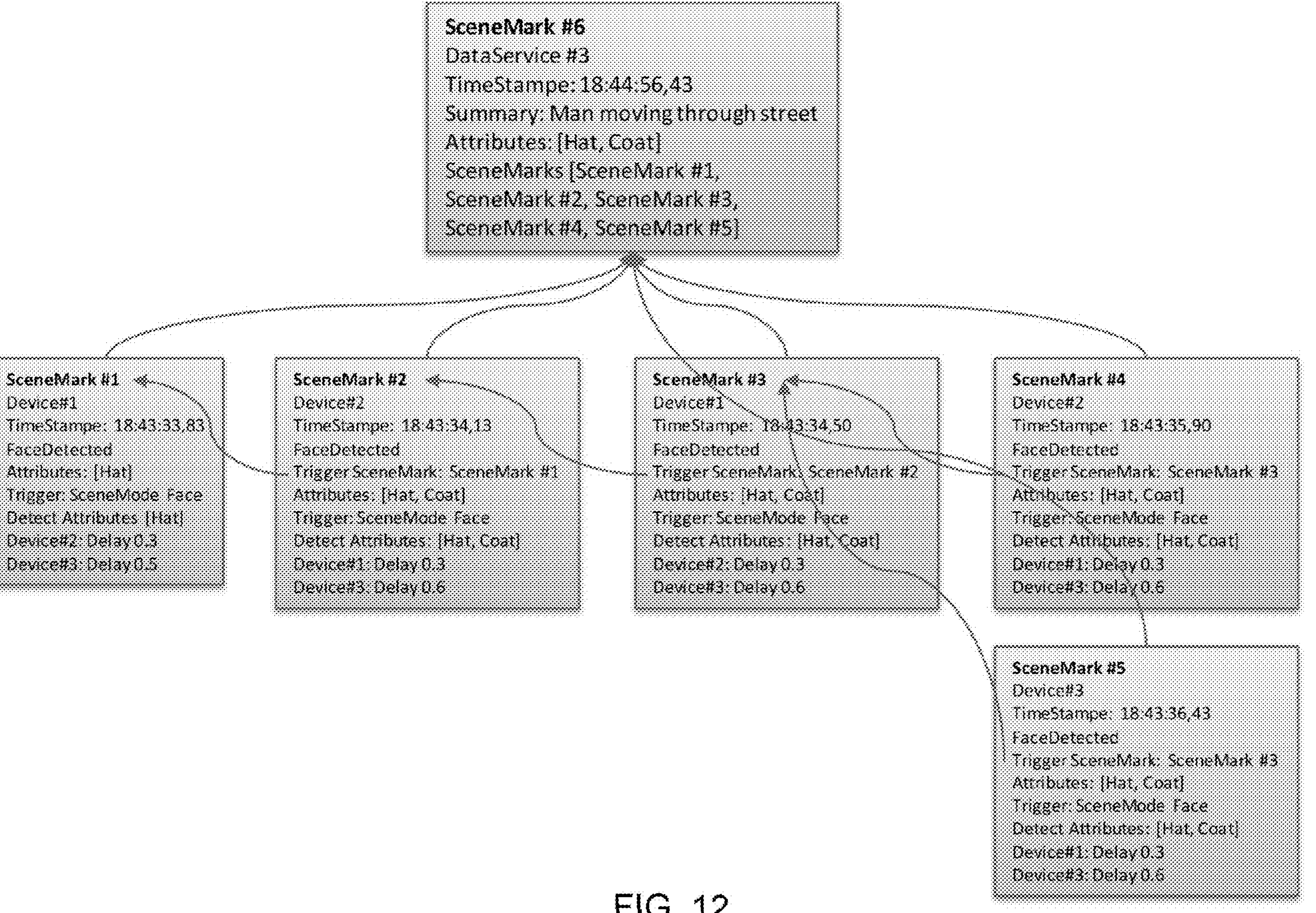
FIG. 12 shows an event summarized by structured SceneMarks.

These linked lists of SceneMarks may be analyzed and summarized. They can provide a summary of events, as shown in FIG. 12. They may generate a summary of SceneMarks associated with the event and may also have a description of the event that occurred. In FIG. 12, SceneMark #6 is created by a higher-level node. It analyzes SceneMarks #1-5, which were generated by lower level nodes. SceneMark #6 lists the underlying SceneMarks #1-5 but also summarizes them. It is a higher order SceneMark. It may be produced by generative AI, for example.

The generation of SceneMarks are typically triggered by an analysis sequence. It could be an analysis SceneData (sensor data), such as detecting motion or detecting a person. It could also be an analysis of other SceneMarks (metadata), such as detecting a sequence of four or five SceneMarks with a particular timing between them and between different nodes with certain events in the SceneMarks, that could then become a trigger for a higher level SceneMark. Certain recognized patterns of lower level SceneMarks can trigger the generation of higher level SceneMarks.

Figure 13:
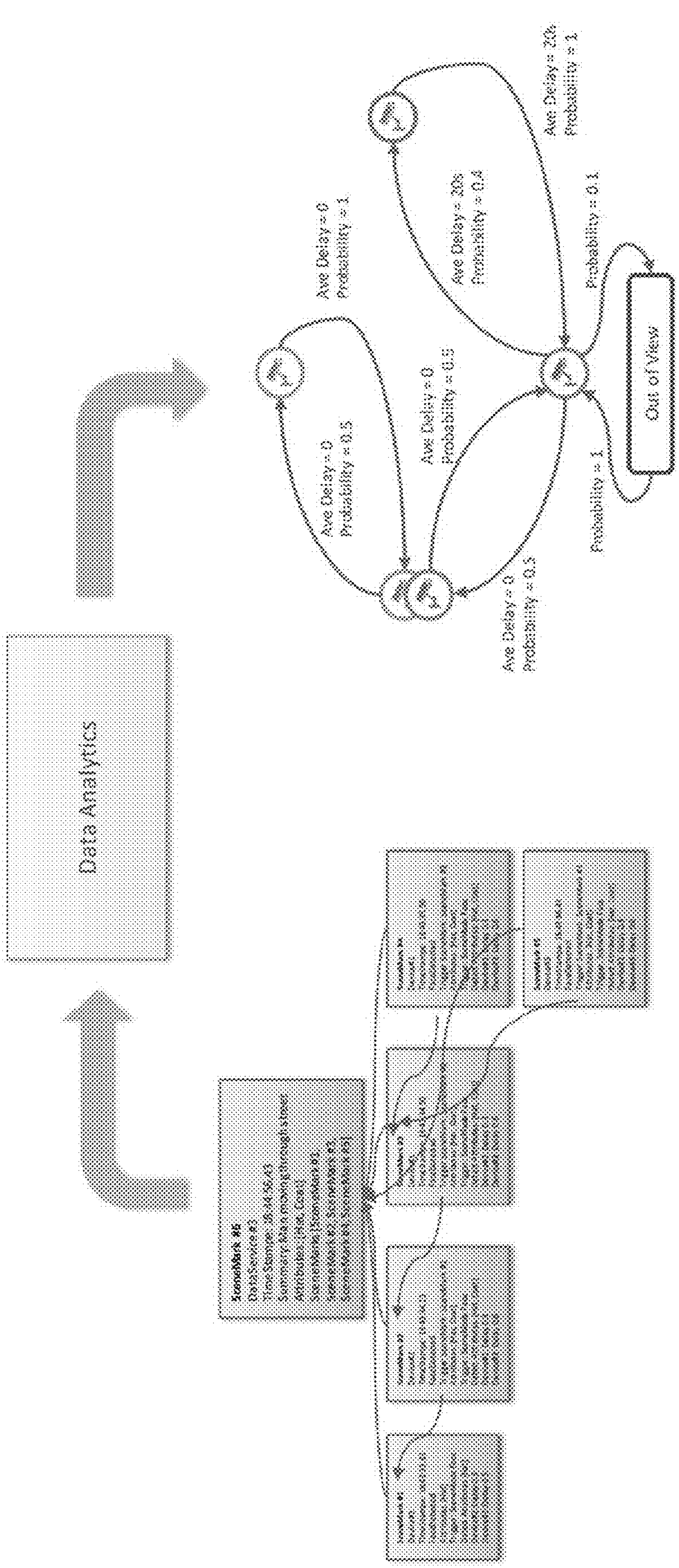
FIG. 13 shows analysis of SceneMarks to determine relationship of cameras.

As shown in FIG. 13, SceneMarks that are accumulated over time may be used to update other parts of the workflow. In this example, chains of SceneMarks are fed into an analytics engine. SceneMarks intrinsically have information about the spatial and time relationship between nodes, including cameras. Data analytics analyzes the SceneMarks to derive the relationships between nodes, such as the probability that an object appearing in one camera will then appear in a neighboring camera or the delay from one appearance to the next. This builds the overall understanding of the relationships among different sensors. The data analytics could include machine learning. SceneMarks accumulated over time could be used as a training set for machine learning. The machine learning can then be used to estimate probability and delay between nodes.

Analysis of SceneMarks can also determine what kinds of AI models or AI processing is appropriate for devices. This additional information can then be sent to the devices as part of the workflow control package, such as in the CaptureMode or capture sequence. Some sensor and devices have capability to do some analysis for certain analytic models. For example, AI models may be transmitted to the sensors and devices using industry standards, such as ONNX.

Some of the features described above include the following:

Using Tube Map to manage the triggering of nodes

Tube Map includes probability and delays between event happenings among nodes

Figure 14:
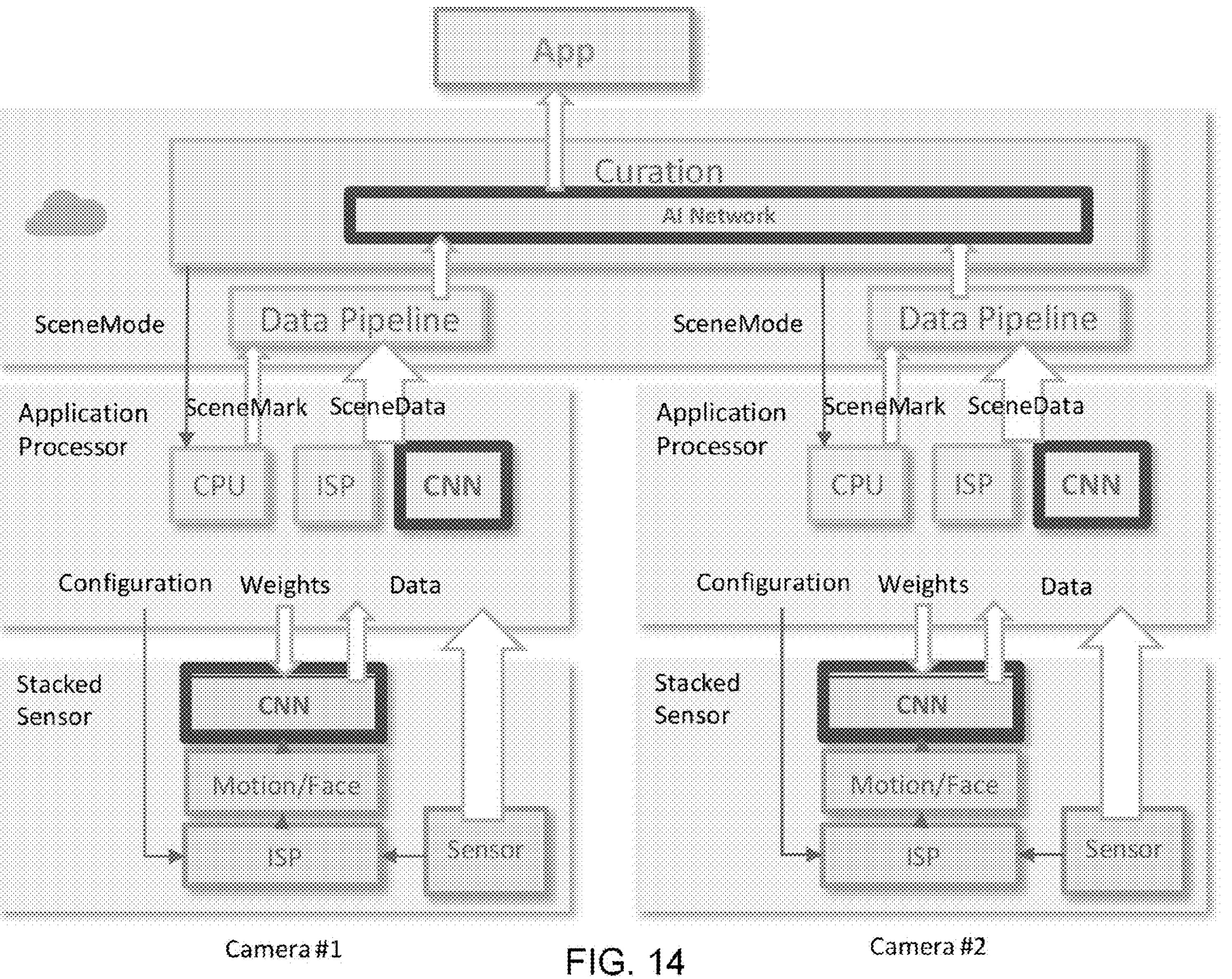
FIG. 14 shows an example multi-layer technology stack with distributed AI processing for multiple cameras.

Mechanism to allow timing information to be used to set SceneMode of other relevant nodes SceneMark incorporates relationship between initial SceneMark and subsequent SceneMarks captured in response to the initial (or other prior) SceneMarks FIG. 14 shows an example multi-layer technology stack with distributed AI processing for multiple cameras. This example shows two cameras and shows the different layers for each camera. The sensor layer is labelled "stacked sensor," the device layer is labelled "application processor" and the cloud layer is marked by the cloud symbol. Machine learning exists in all three layers, as shown by the CNNs in the sensor and device layers and the AI Network (broader range of machine learning and AI techniques) at the cloud layer.

The AI at the sensor layer may perform sensor level detection of objects, faces etc., and limited classification. Feedback to the sensor may be implemented by changing the weights of the CNN. Use of the sensor layer AI reduces bandwidth for data transmission from the sensor layer to higher layers. The AI at the device layer may include single camera analytics and more robust classification of objects, faces, etc. The AI at the cloud layer may include multi camera analytics and curation, interpretation of scenes and detection of unusual behavior.

Based on accumulated data and intelligence (e.g., capturing sequences of SceneMarks as described above), the workflow may program a sensor or low-level devices to generate the low-level SceneMarks. Based on those low-level SceneMarks at the sensor level, data can be passed on to the next layer of the device, through a bridge device or using a more advanced camera with application processors. From there, the workflow can determine higher-level SceneMarks and then send both relevant sensor data and metadata (SceneData and SceneMarks) to the cloud. The final curation can be done in a more intelligent way compared to brute force analysis of raw data. The layering is important to enable this.

The layering is also important for the control. As part of the control, the control plane is virtualized from layer to layer. Not only can the workflow send control packages specifying what can be captured, like a CaptureMode and capture sequence, but the workflow can also communicate back to the different layers what kind of AI model is appropriate. The layering also affects cost. The more that is done at the lower layers, the less is the total cost of analytics. Layering also reduces latency—how quickly events are detected, analyzed and responded to.

Figure 15A:
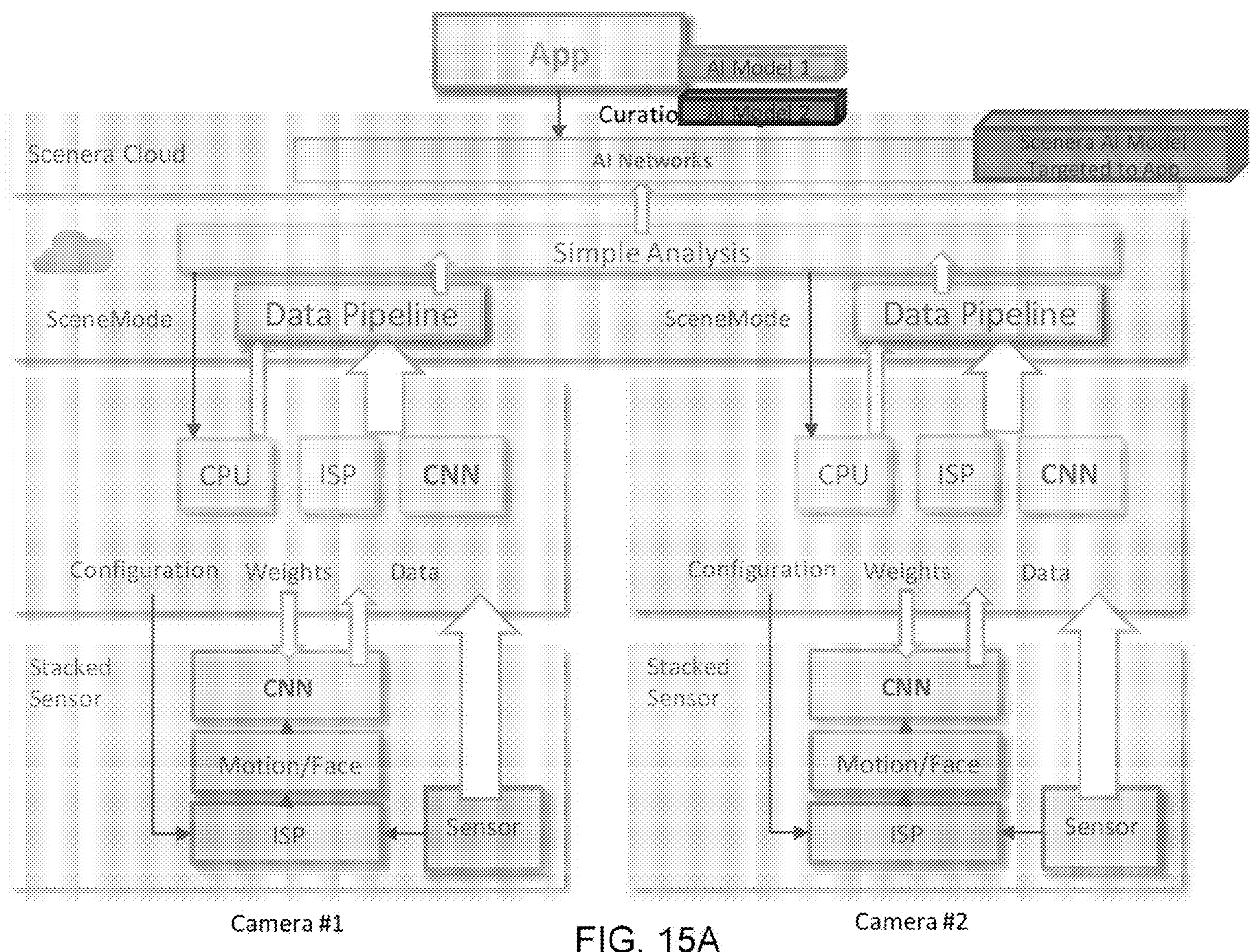
FIGS. 15A-15C show the distribution of targeted AI models through the multi-layer technology stack of FIG. 14.
Figure 15B:
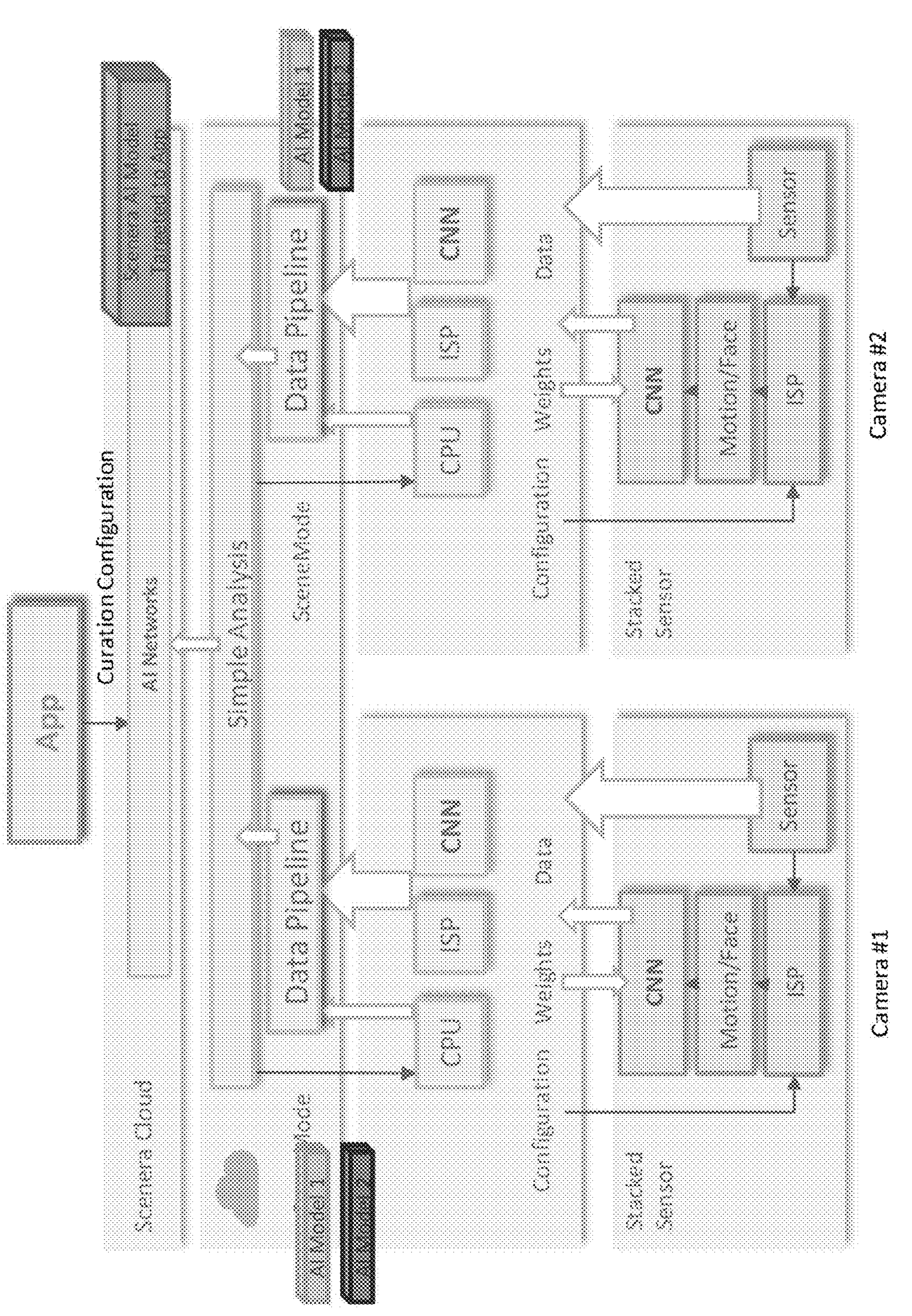
Figure 15C:
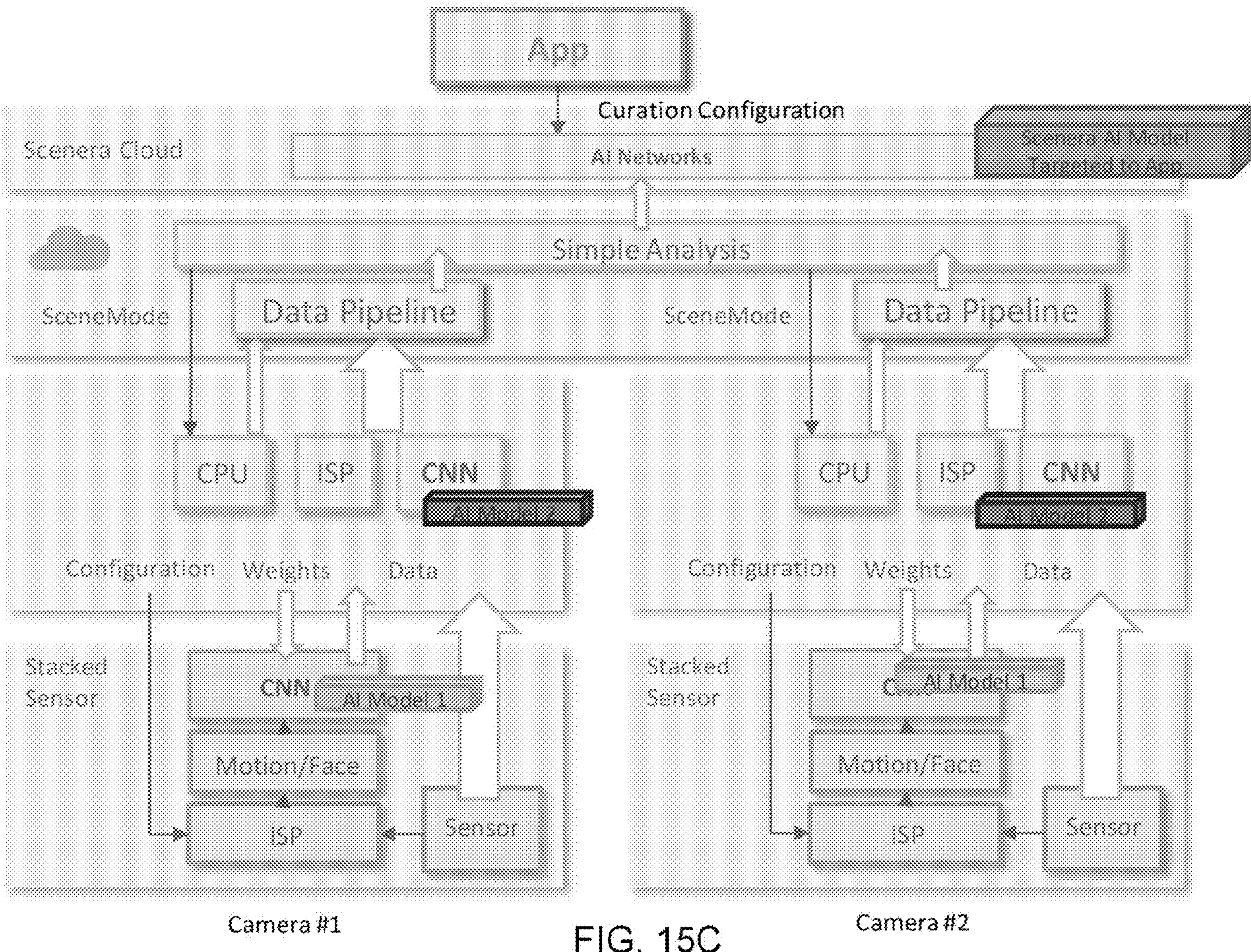

FIGS. 15A-15C show the distribution of targeted AI models through the multi-layer technology stack of FIG. 14. Simple data search techniques may be widely used in a cloud-based system. More sophisticated AI and machine learning, including learning characteristics of the relationships between nodes in the multi-layer stack, can also be done in the cloud. This can lead to a more customized or sophisticated AI compared to a generic cloud platform. FIG. 15A shows AI models targeted to specific applications. Data accumulated over time can be used to develop different AI models for different devices or different layers. This can include AI models for bridge devices or more advanced devices and also AI models for sensors which have some analytic capability like a CNN capability.

In this example, the stacked sensor is the sensor and processor stacked together and offered as one device. If the sensor has many pixels (e.g., 100-megapixel sensor), then no processing means sending 100 megapixel data to the next layer, which requires lots of bandwidth. With a stacked sensor, certain processing is done at the sensor with a stack processor in order to reduce data. Only important data is retained and sent to the next layer. To do so, what should this low-level sensor do to accomplish the task for the top-layer application? Knowing what problem that the application is trying to solve and knowing the capabilities of the nodes, and possibly after capturing much data and learning through that data, the workflow determines what AI model runs at which layer. This could also be done in real time. In real time, depending on what the workflow is trying to capture and summarize, each node can be programmed to capture and process data more efficiently.

In the example of FIG. 15, a curation service (labelled Scenera Cloud in FIG. 15) enables AI models tailored to specific enterprise verticals to be pushed to the edge layers (camera and sensor) for intelligent capture. In this example, the application is in a specific vertical and the curation service determines that AI Models 1 and 2 are appropriate for the task, as shown in FIG. 15A. These are pushed through the layers to the device layer and sensor layer respectively, as shown in FIGS. 15B and 15C. The curation service may provide sophisticated AI models which utilize the SceneData and SceneMarks to provide automated control and interpretation of events in the enterprise.

Figure 16A:
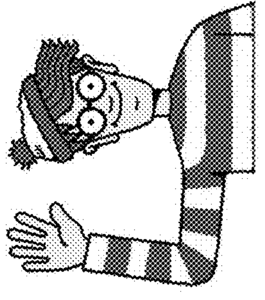
FIGS. 16A-16H show a use example based on finding Waldo.
Figure 16A:
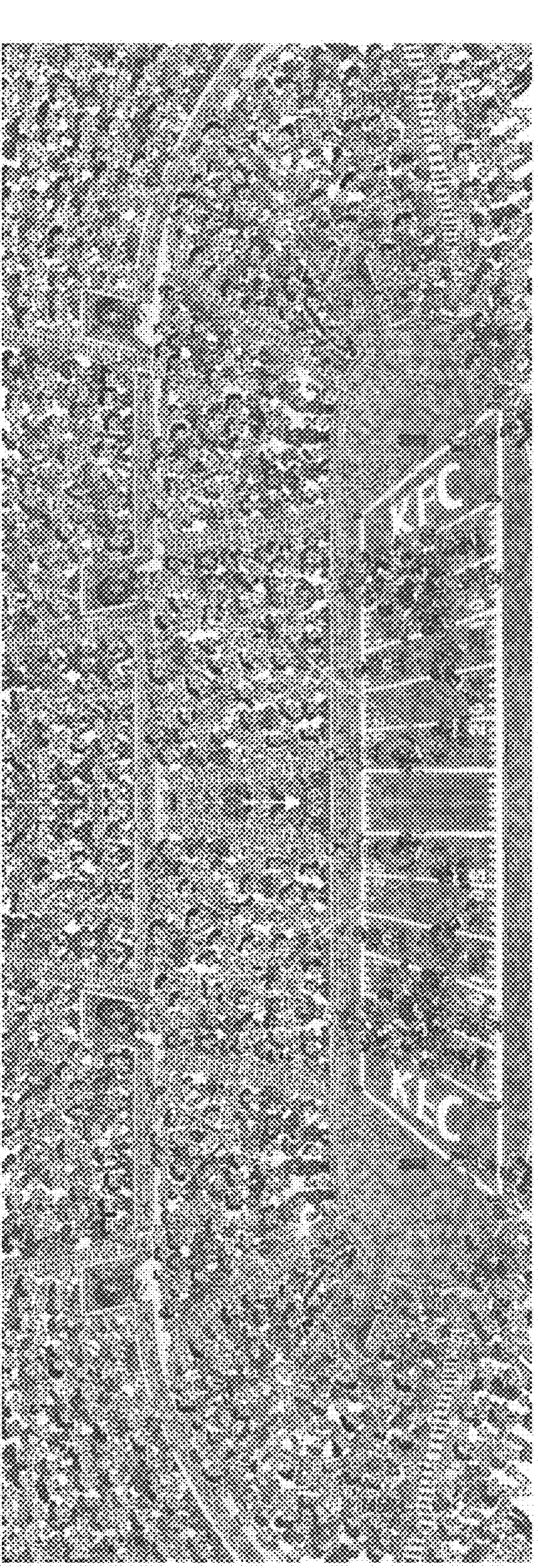
Figure 16B:
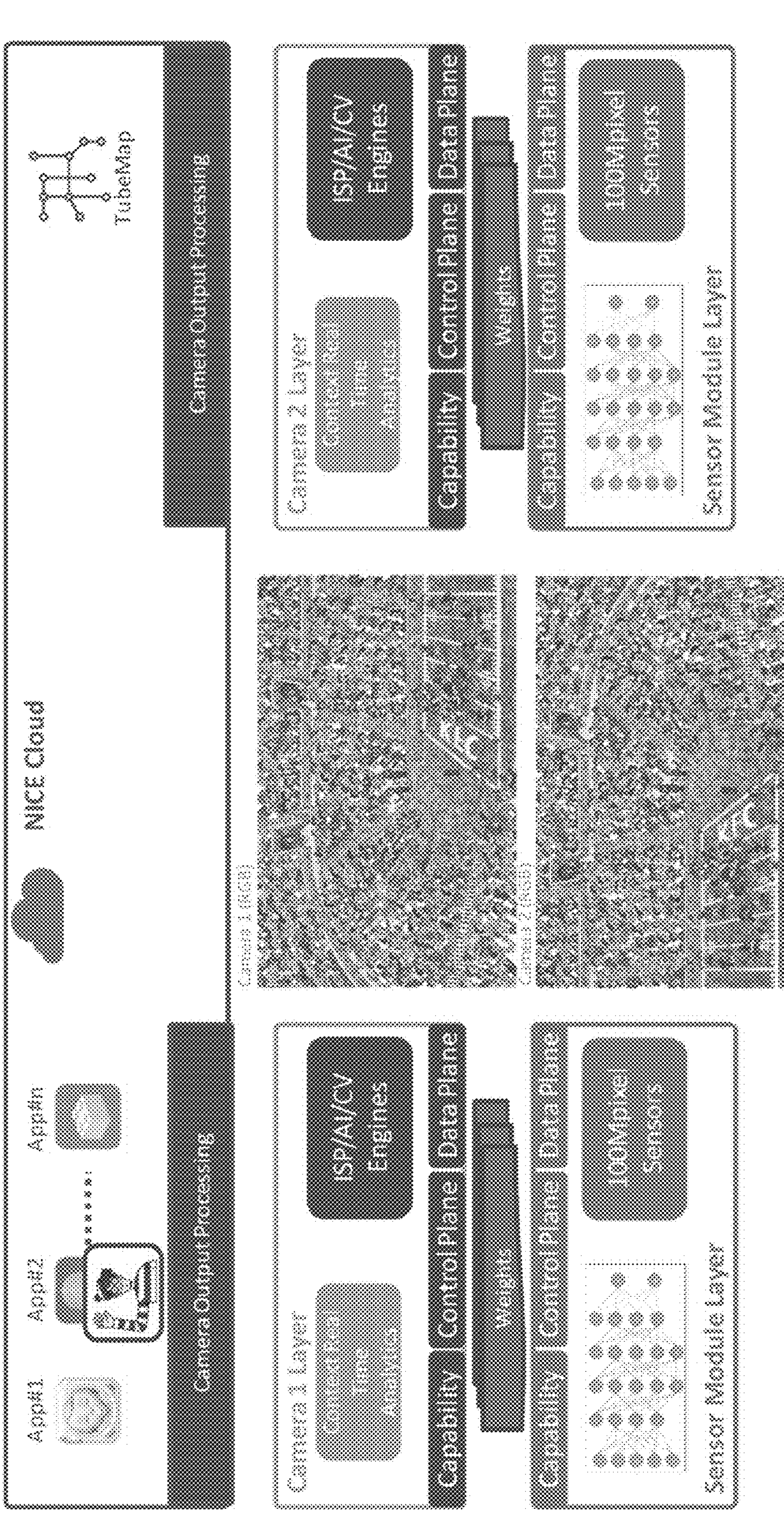

FIGS. 16A-16H show a use example based on finding Waldo. As shown in FIG. 16A, the application's task is to find all the Waldos at a crowded football game. Finding many Waldos in the same field can be achieved using multiple cameras and a multi-layer stack, as described above. In FIG. 16B, the system uses cameras with stacked sensor and sensors with 100 megapixels. There are two cameras, so two sensors and two camera processors. The workflow may divide the field, with camera 1 imaging the left half and camera 2 imaging the right half. Two cameras are used here, but any number of cameras may be used. One hundred cameras may be used to capture images in 100 different sections.

Figure 16C:
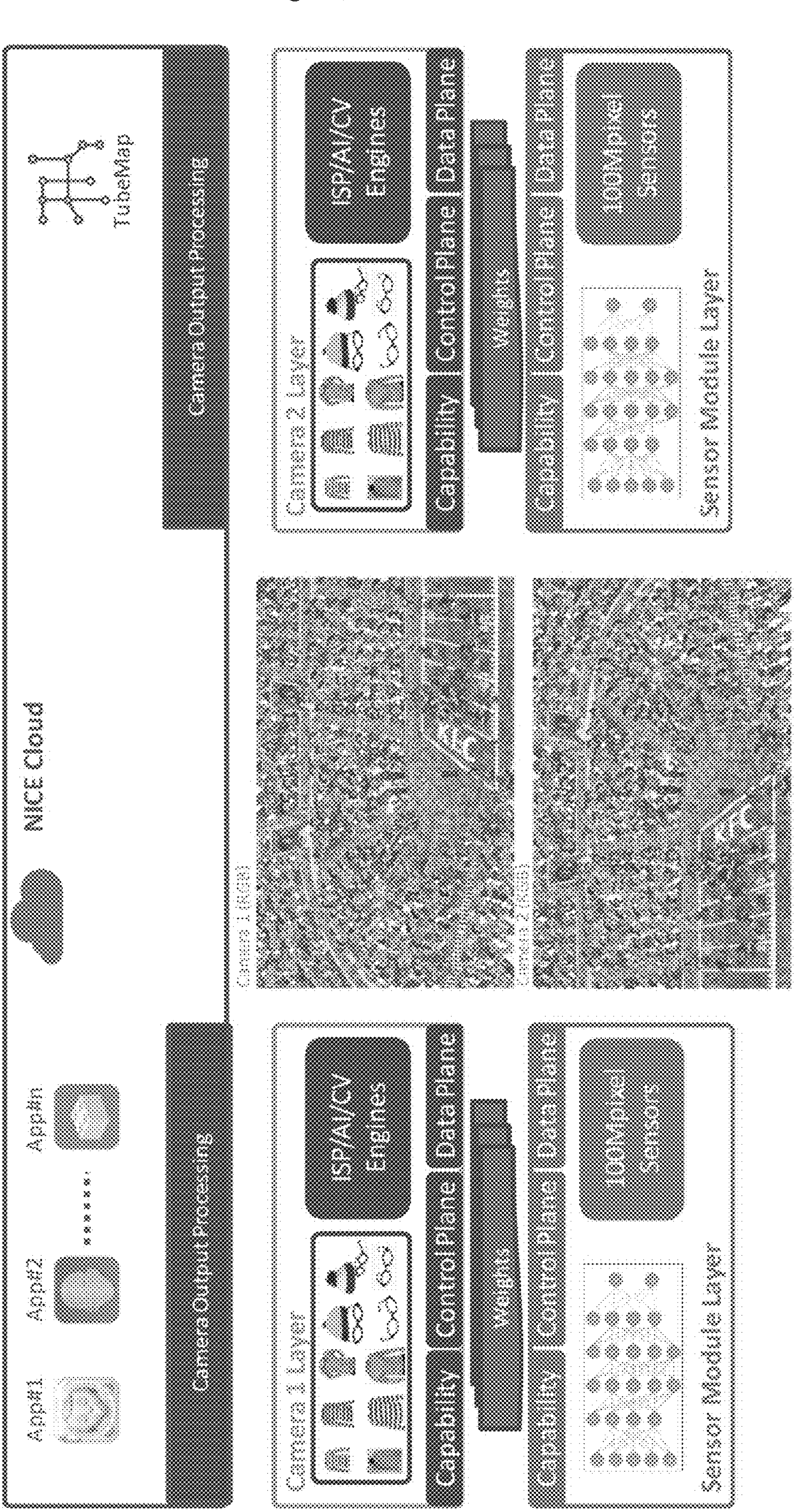
Figure 16D:
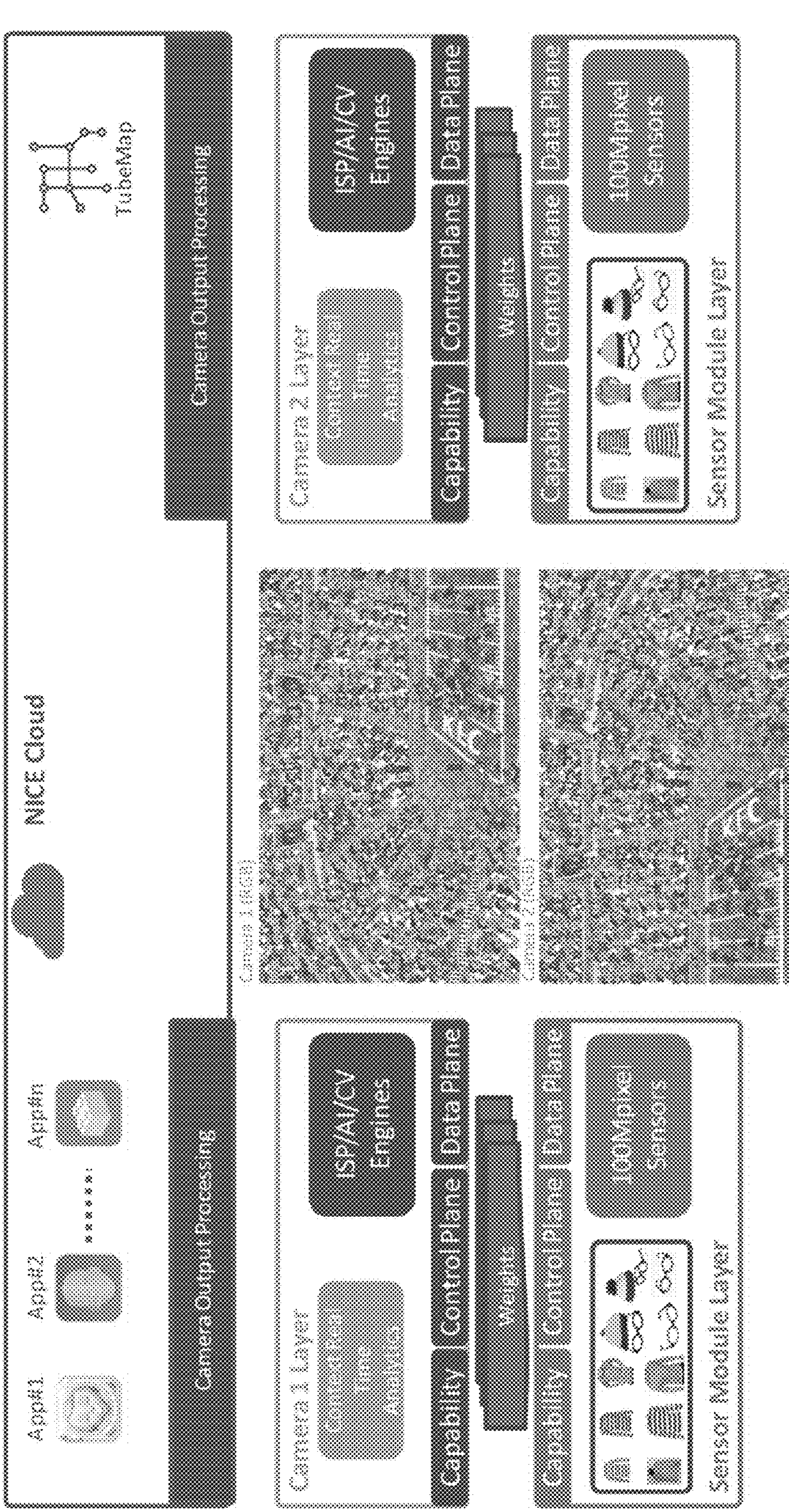
Figure 16E:
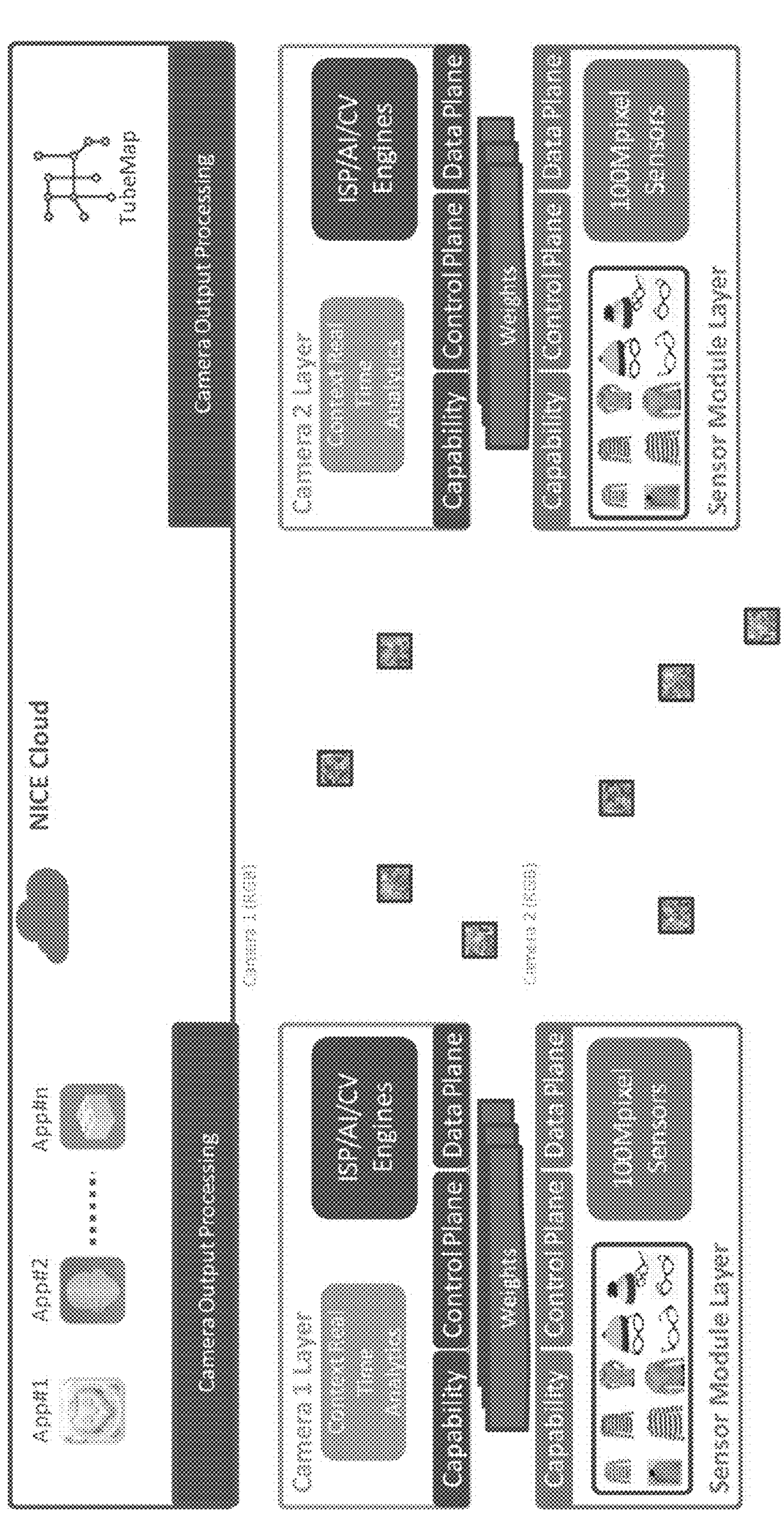
Figure 16F:
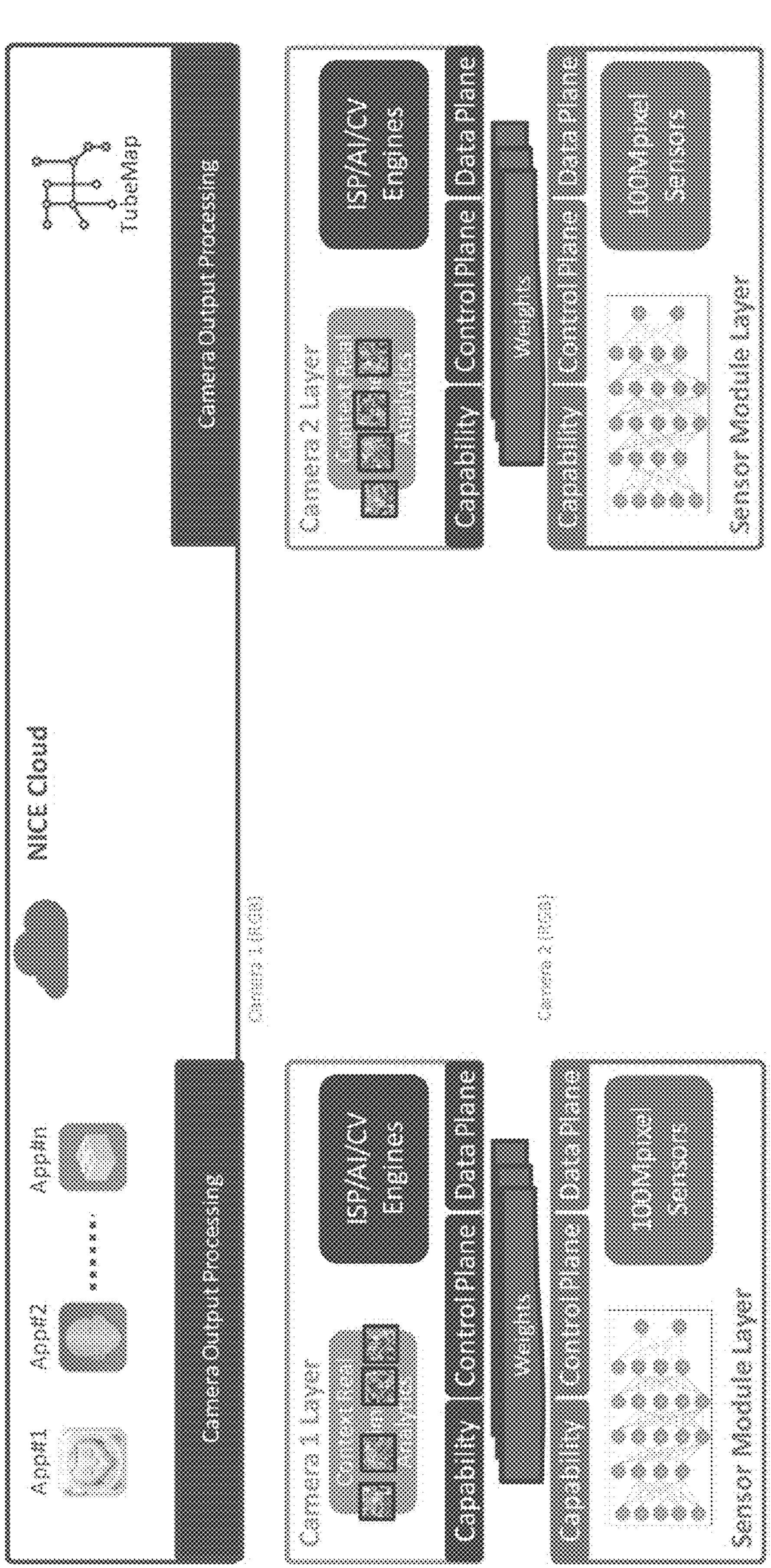
Figure 16G:
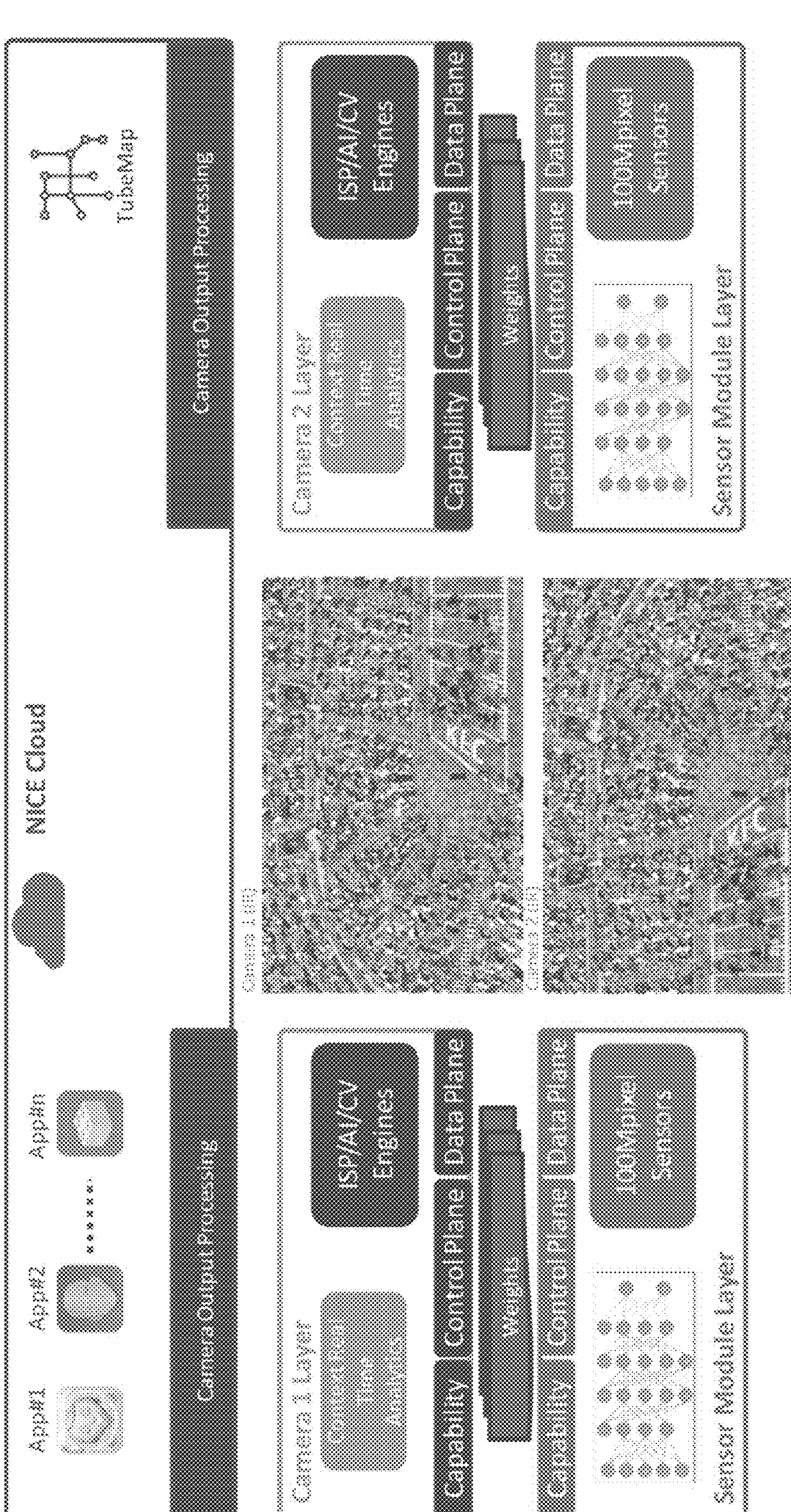
Figure 16H:
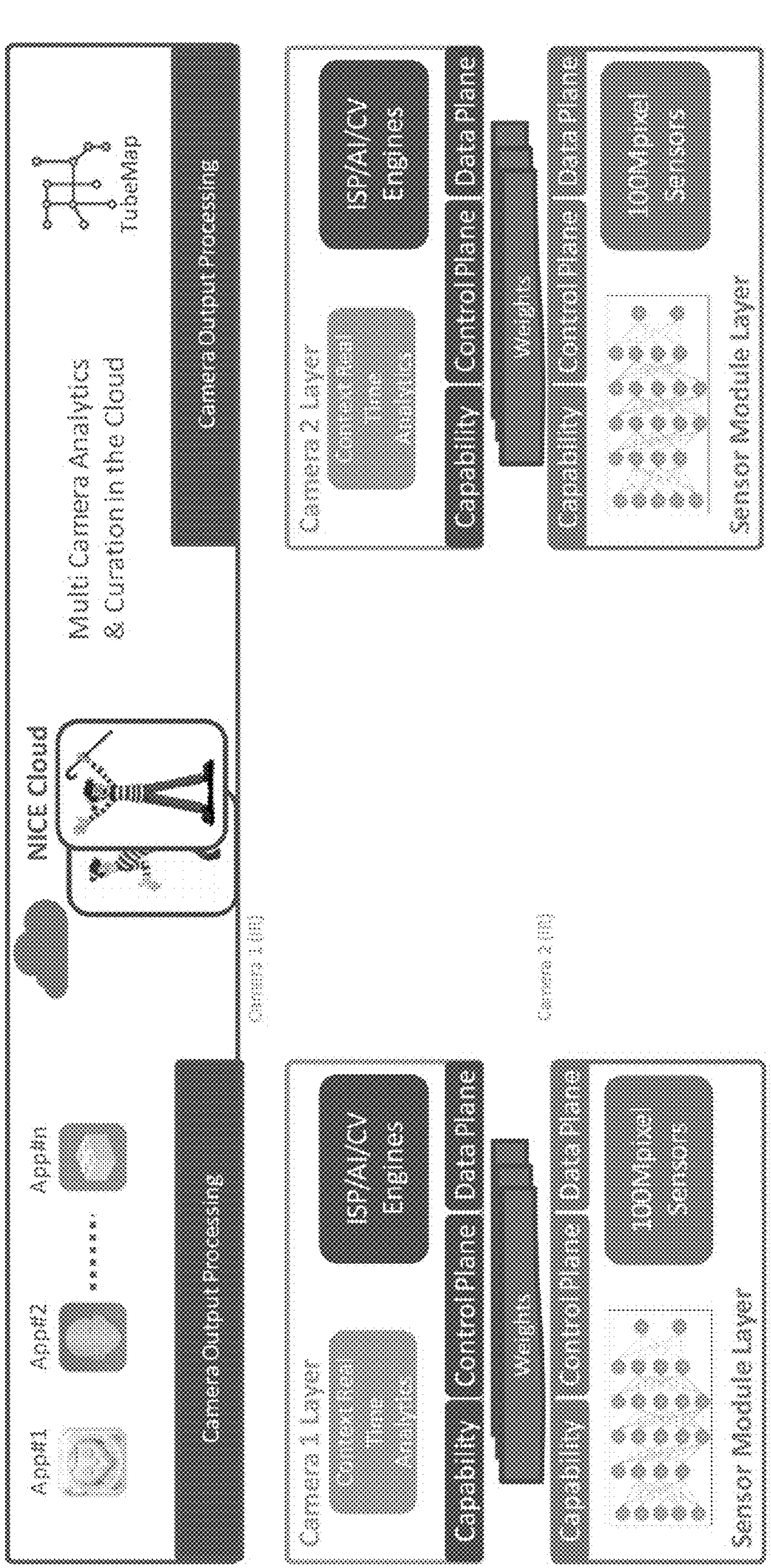

The task is finding Waldo. Waldo has certain distinguishing attributes: round glasses, red and white striped shirt, particular hat, and so on. The workflow identifies these attributes and sends these attributes to the device layer, as shown in FIG. 16C. If an image has any of these attributes, it may be an indication that Waldo is present. The presence of these attributes can be computed by sending appropriate weights for machine learning models in the sensing process, as shown in FIG. 16D. The sensor has 100 megapixels with a processing capability and it also gets these certain weights to look for red color, white color, stripes, round shapes, faces, etc. The weights for those attributes are downloaded to the sensors. The sensors then filter for these particular attributes and generate SceneMarks upon their detection. In FIG. 16E, the sensors have detected attributes at certain locations within their view. The sensor sends only those images where it detected possible Waldo attributes and then the camera layer processes these together. It may perform more sophisticated analysis of the SceneData and/or SceneMarks received from the sensor layers, as shown in FIG. 16F. Similar parallel processes may be performed for IR, black and white, or other modes or types of sensors, as represented by FIG. 16G. The SceneData and SceneMarks from the camera layer is analyzed by the cloud layer to identify Waldos, as shown in FIG. 16H.

The attributes described above may be extracted using machine learning, for example a CNN which produces a vector. The attribute is effectively encoded into the vector, typically in a manner that is not understandable to humans. For example, the color of a person's jersey may be encoded as certain numbers or combinations of numbers in the CNN's 256-number output vector. The CNN encodes the data in this way as a consequence of the training process that the network has undergone to differentiate between people. The triggering and distribution of attributes may then be based on the vector outputs of the CNN.

The layering facilitates the detection. The lowest layer may detect red, white, stripes, circles, face, torso, and other attributes, and generate corresponding SceneMarks. The next layer might realize that there are SceneMarks for red, white, striped and torso all in the same proximity and therefore it generates a SceneMark for red and white striped shirt. This is combined with SceneMarks for round black glasses, red and white tassel cap, tall skinny guy, etc. to generate a SceneMark for Waldo detected.

Figure 16I:
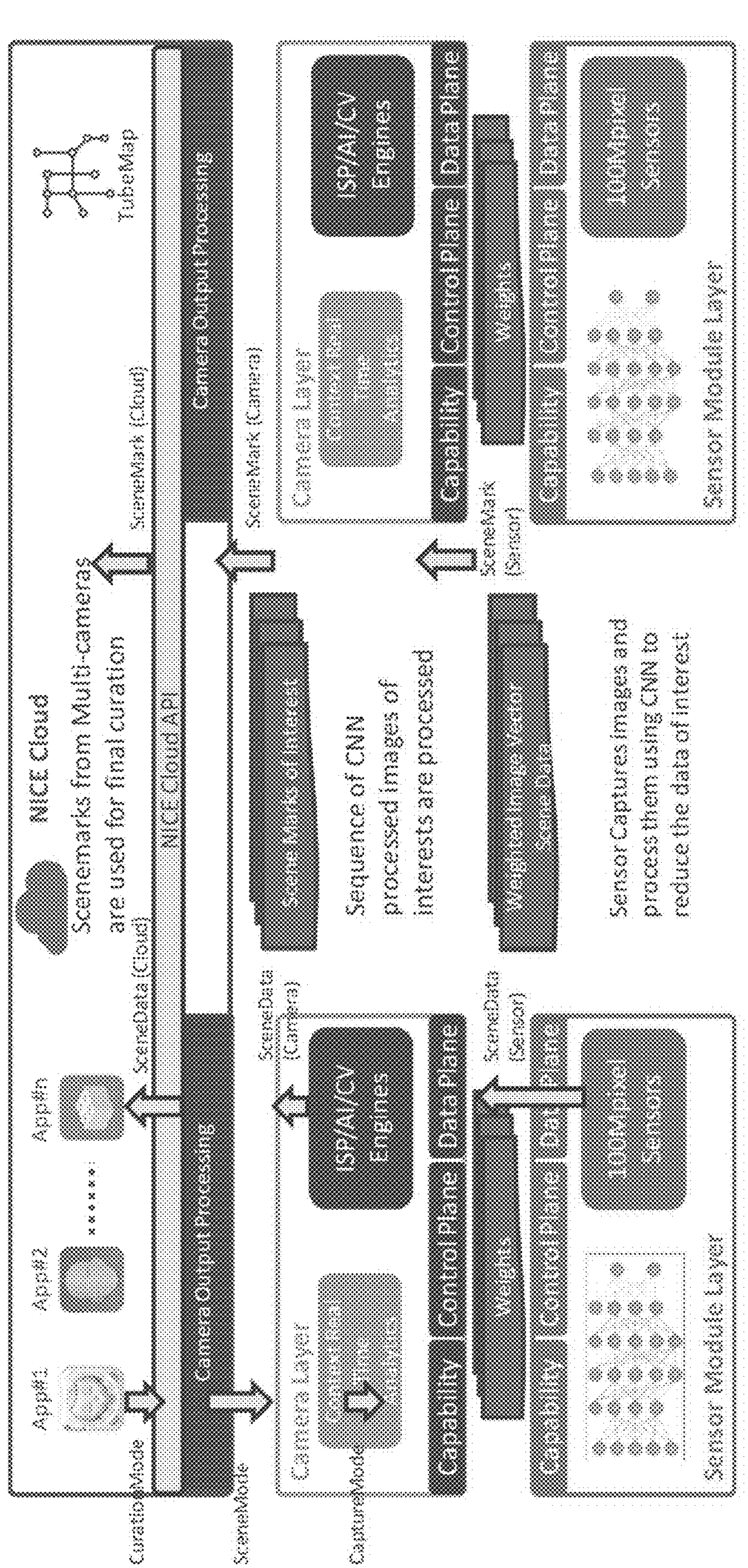
FIG. 16I shows data passing through the multi-layer technology stack.

FIG. 16I shows data passing through the multi-layer technology stack, via interface between the different layers. The middle set of arrows shows the passing of sensor data from the sensor capture up to the cloud. "SceneData" is sensor data, including processed and combined versions and possibly also including additional data. In the Waldo example, SceneData can include the raw captured images, processed versions of those images (e.g., change of resolution, color filtering, spatial filtering, fusion of images). The right set of arrows shows the passing of contextual metadata packaged into "SceneMarks". In the Waldo example, these are also passed from sensor layer to cloud layer. The left arrows show control data which deploy the overall workflow. In this example, the control data define different modes for the components in the layers. The packages of control data are referred to as CurationMode, SceneMode and CaptureMode, depending on which layer.

Figure 17A:
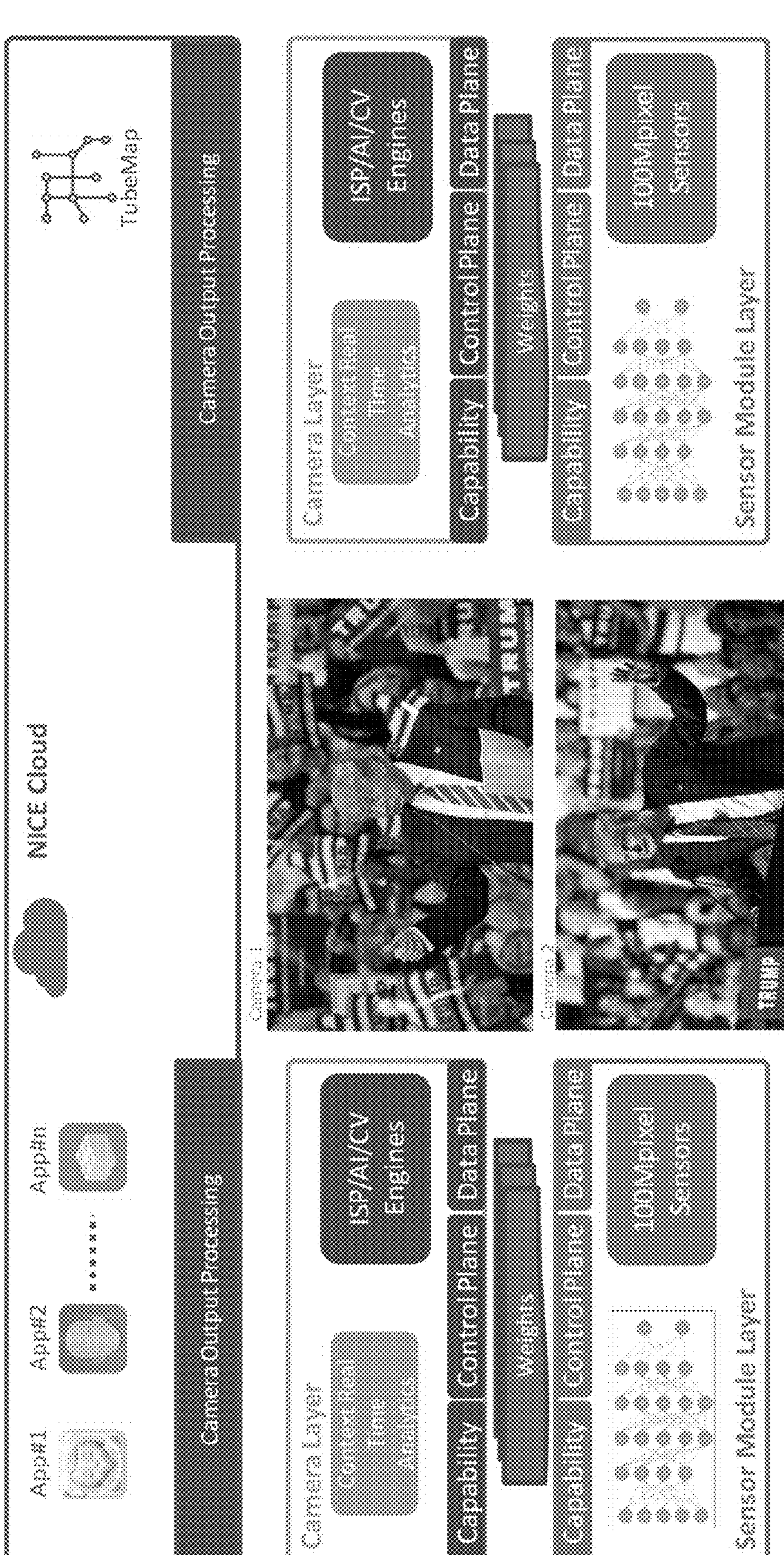
FIGS. 17A-17F show a use example with security and privacy.
Figure 17B:
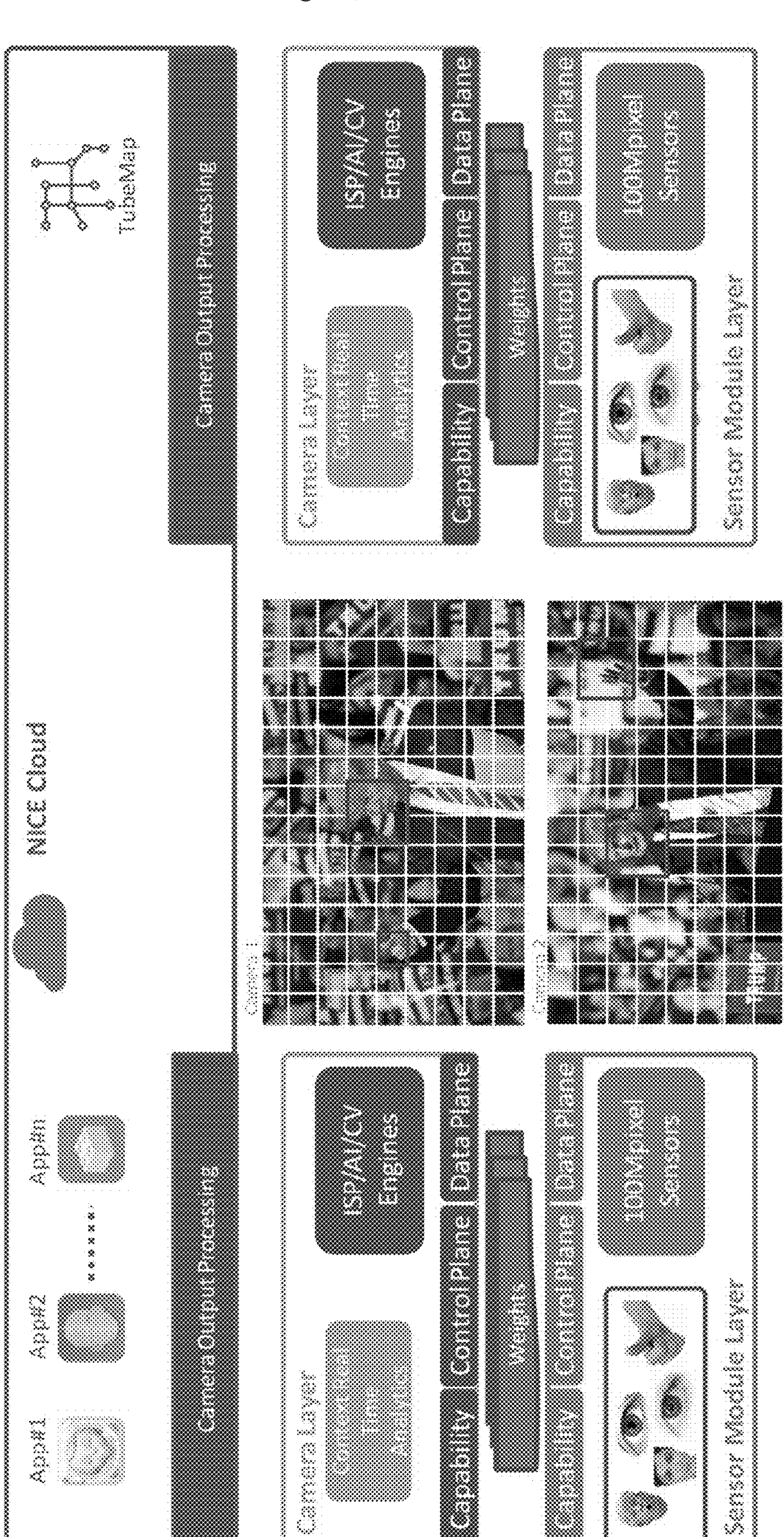
Figure 17C:
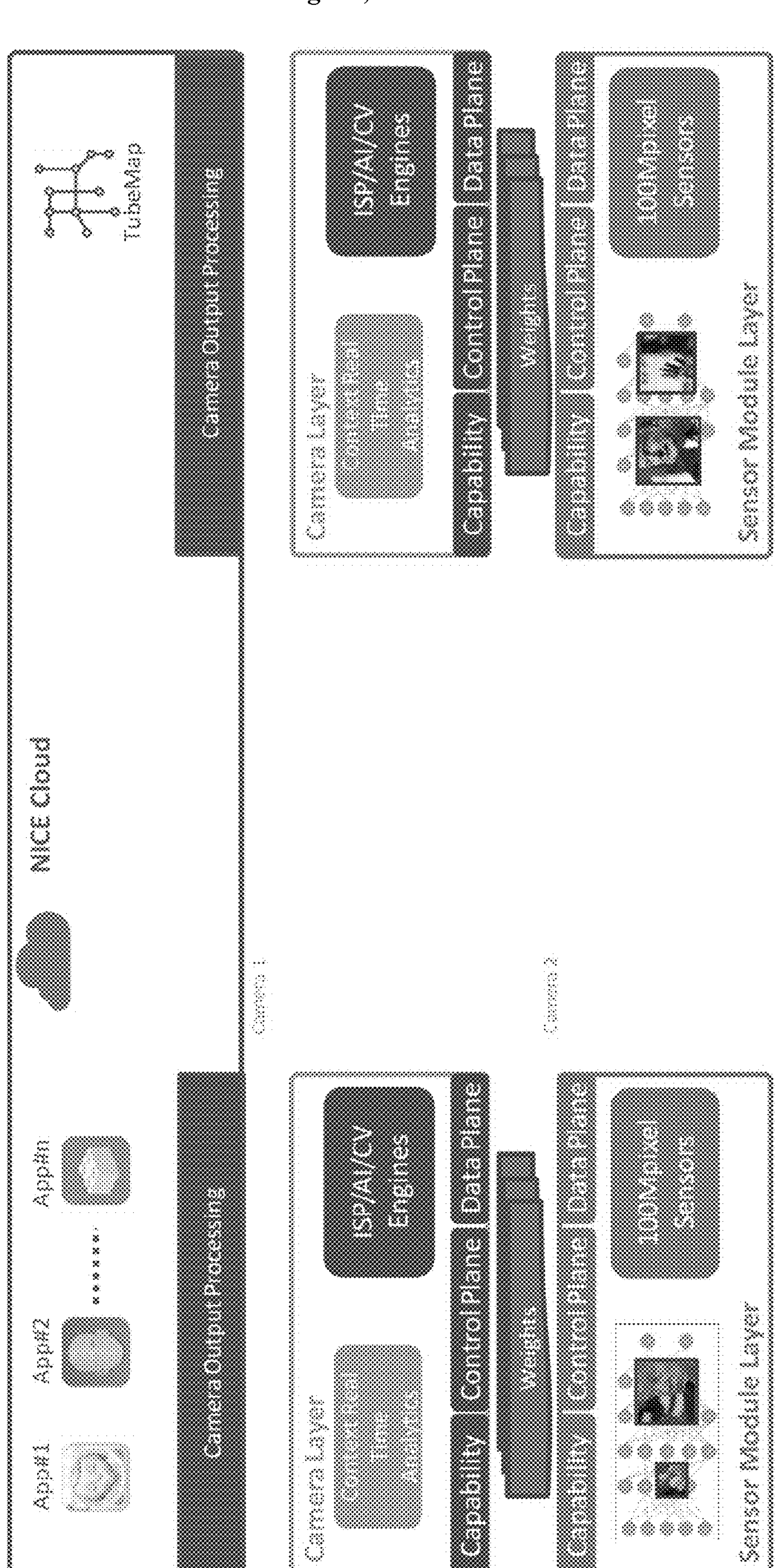
Figure 17D:
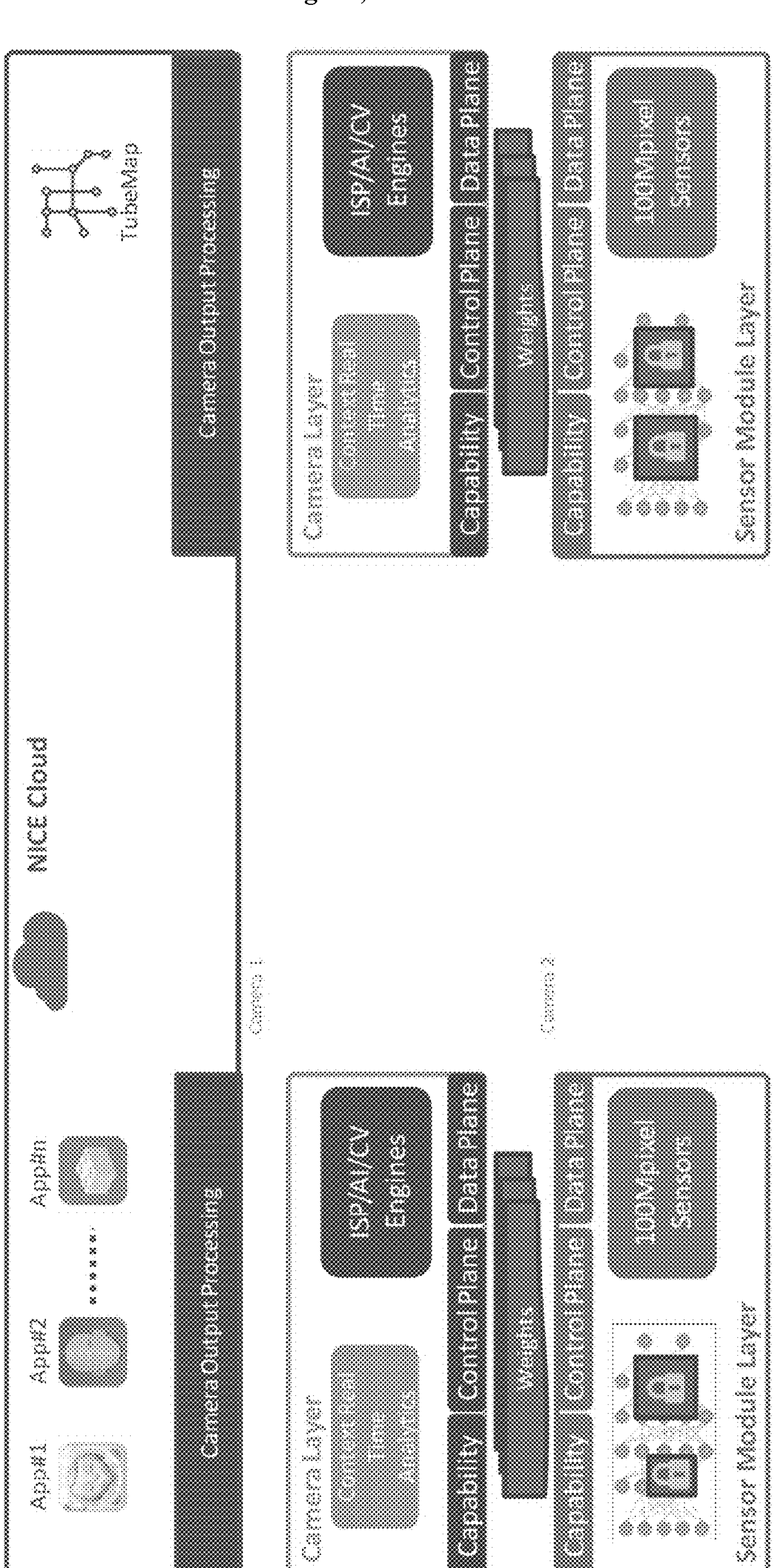
Figure 17E:
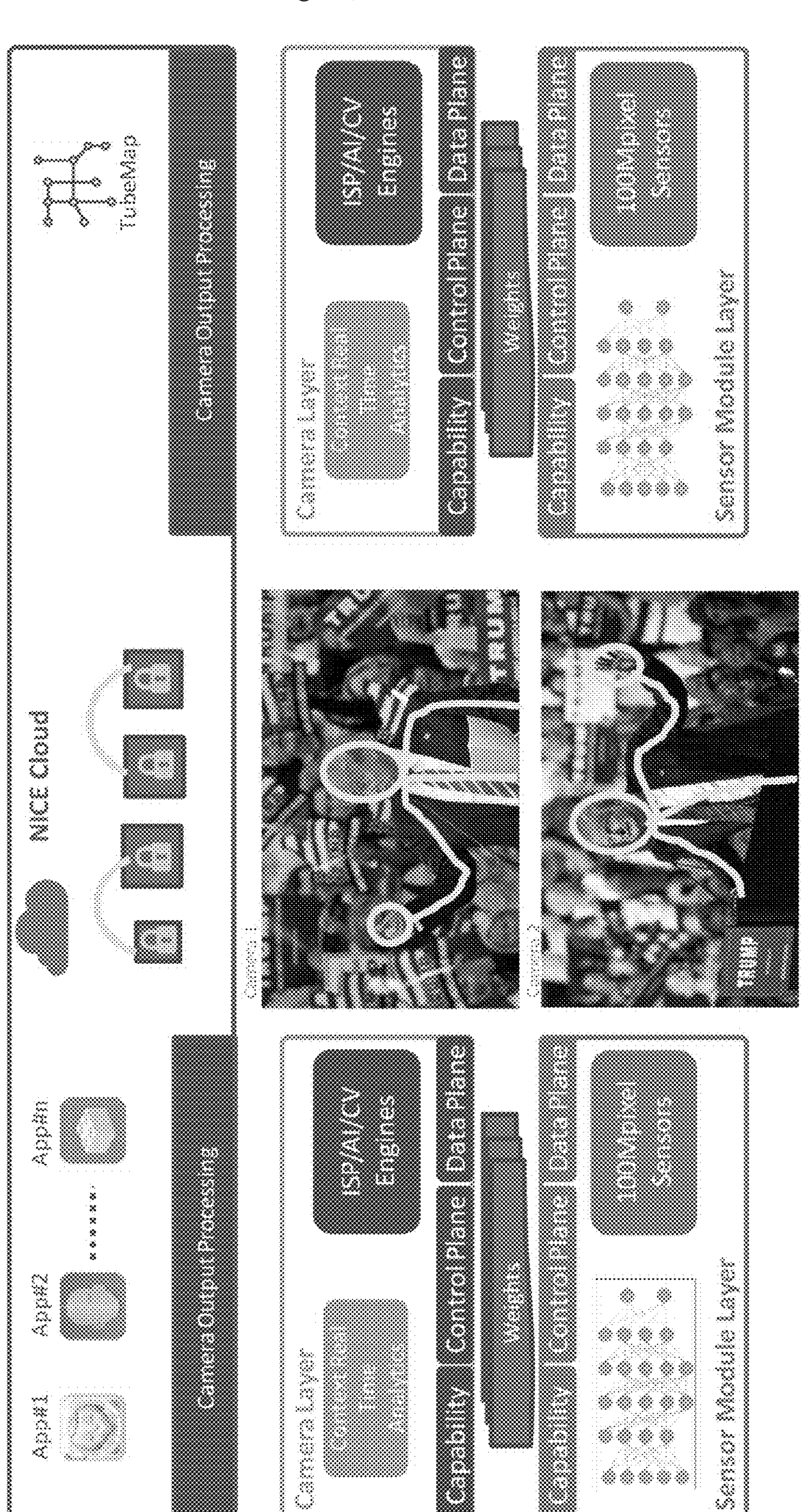
Figure 17F:
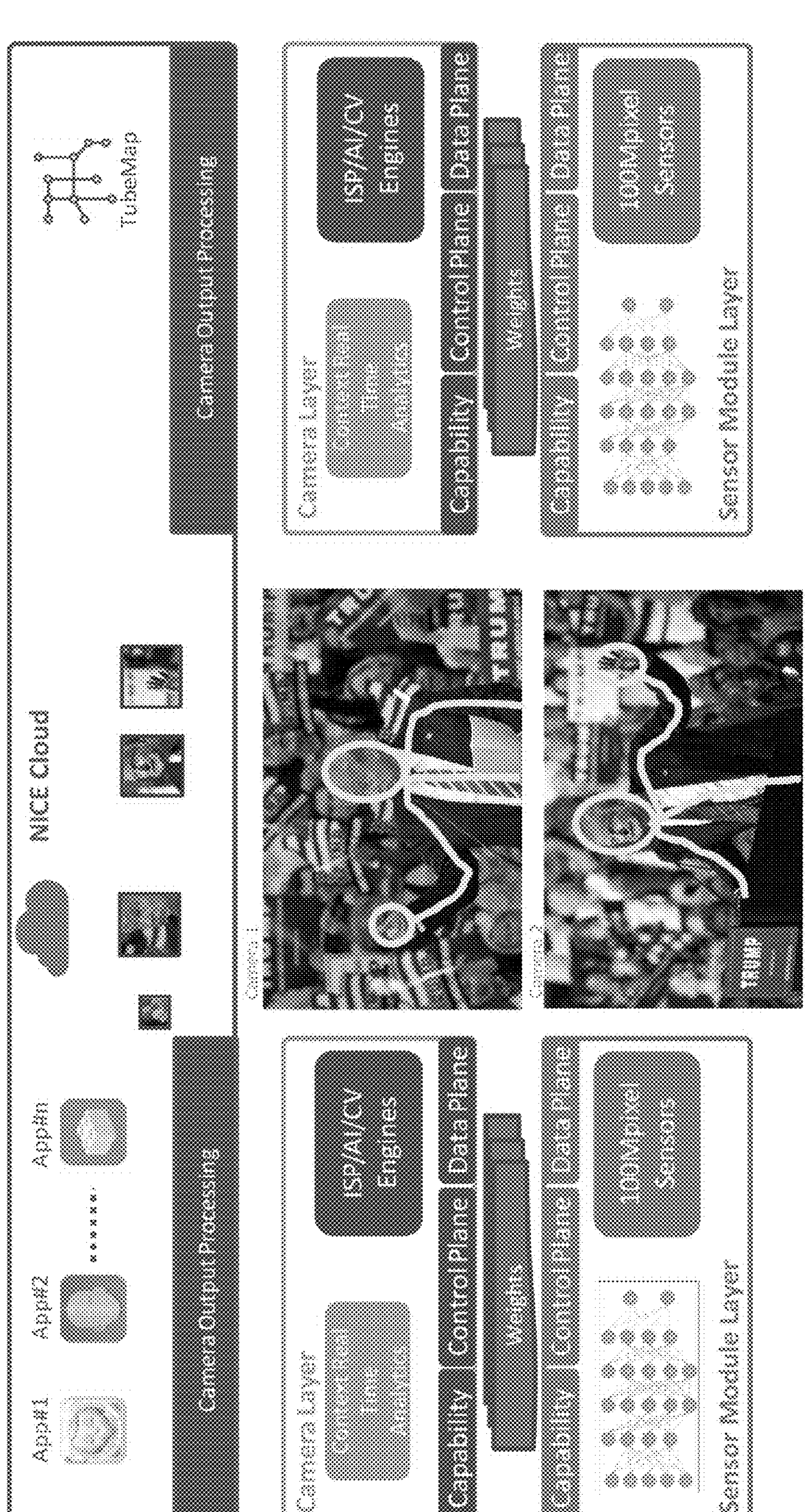

FIGS. 17A-17F show an example with security and privacy. Security and privacy concerns apply to many types of information, including biometric information like fingerprints and iris patterns. In this example, the workflow captures private information, so security measures are also taken. In FIG. 17A, a politician is shown here giving a thumbs up. A 100 megapixel camera can have enough resolution to capture the person's fingerprint or his iris. A similar approach to FIG. 16 identifies different attributes of the politician, including possibly his fingerprint, iris, etc. FIGS. 17B and 17C show the identification of sensitive attributes at the sensor layer. The workflow recognizes these are more sensitive information, so they are encrypted even before they leave the sensors, as shown in FIG. 17D. As soon as it is captured and recognized as biometric or private information, it is encrypted. The data is passed in encrypted from through the layers. The layers can decrypt on a need to know basis to build up the task required. The final result is detection of the politician. This end result may be presented without requiring disclosure of the sensitive information as shown in FIG. 17E. Here, fingerprint, iris print, and other sensitive information may be used together to identify the person as indicated by the yellow connections, but not shown in the final presentation. Alternatively, the sensitive information may be shown only to authorized users as in FIG. 17F.

Figure 18A:
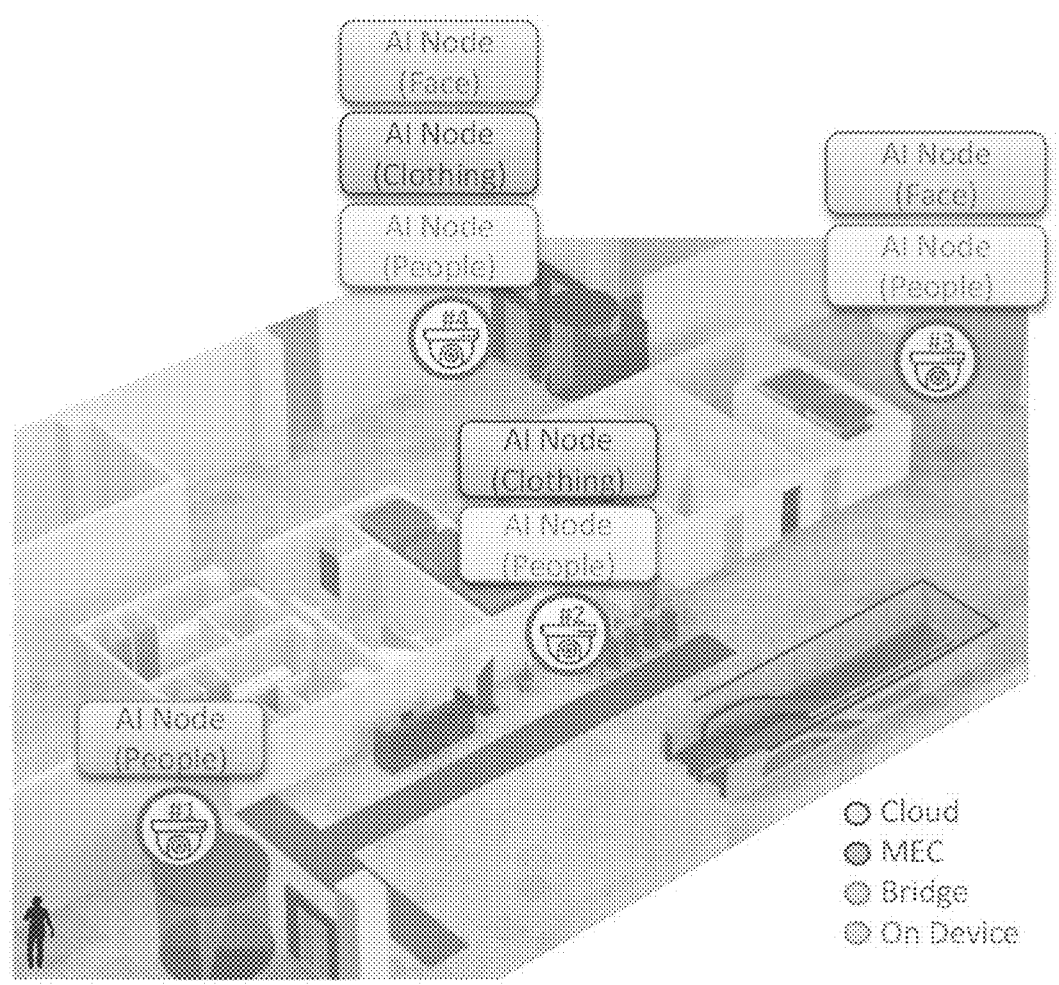
FIGS. 18A-18D show another use example for monitoring a space.

FIGS. 18A-18D show another example. FIG. 18A shows the first floor of a building. The building has four cameras labeled #1-#4. Camera #1 monitors the revolving door at the entrance of the building. Camera #2 monitors the interior of the building by the reception area. Cameras #3 and #4 monitor more interior spaces in the building. The colored rectangles in FIG. 18A show different capabilities associated with each of the cameras (i.e., available for processing images captured by the cameras). These capabilities are represented as nodes.

The color of the nodes in FIG. 18A indicates where that capability is implemented. Camera #1 has some limited AI capability to detect people, and this is implemented on the device itself. For example, camera #1 may be AI-ready, and AI models for detecting the presence of people may be downloaded onto the camera. Cameras #2-#4 may be older cameras. As a result, they themselves do not contain any AI capability. Rather, the AI node for detecting people for those cameras is implemented on a bridge device connected to the camera. AI nodes for detecting clothing and performing facial recognition is also available for these devices, but implemented on MEC (Multi-access Edge Computing) or on the cloud, respectively.

A curation service has access to these nodes, and knows which nodes have which capabilities. The curation service also has access to a proximity map of the different cameras. The curation service generates custom workflows based on the different capabilities to accomplish various tasks. In this example, the task is monitoring who is entering and existing the building to identify suspicious or anomalous events. The curation service may implement the custom workflow by sending workflow control packages to the different nodes. The workflow may be dynamic, meaning that the workflow changes in response to the detection of events or triggers. Information is passed between the nodes and the curation service through the production and transmission of SceneMarks (including SceneMarks created by nodes with inference capabilities). In this way, the raw video data does not have to be transmitted in bulk. Rather, SceneMarks summarize and capture the relevant events that are occurring in the monitored space and that is sufficient information to make dynamic changes to the workflow. If any nodes need access to the underlying video (SceneData), the SceneMarks contain pointers to relevant points in the SceneData.

Figure 18B:
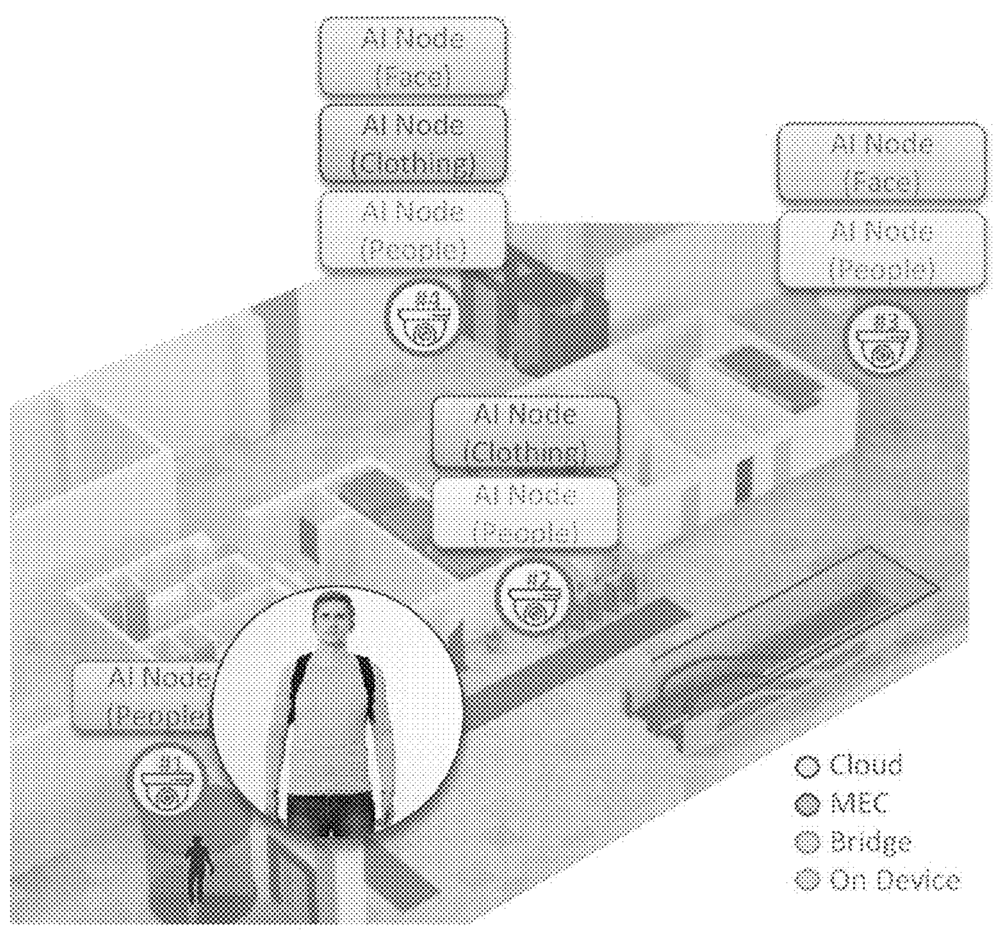
Figure 18B:
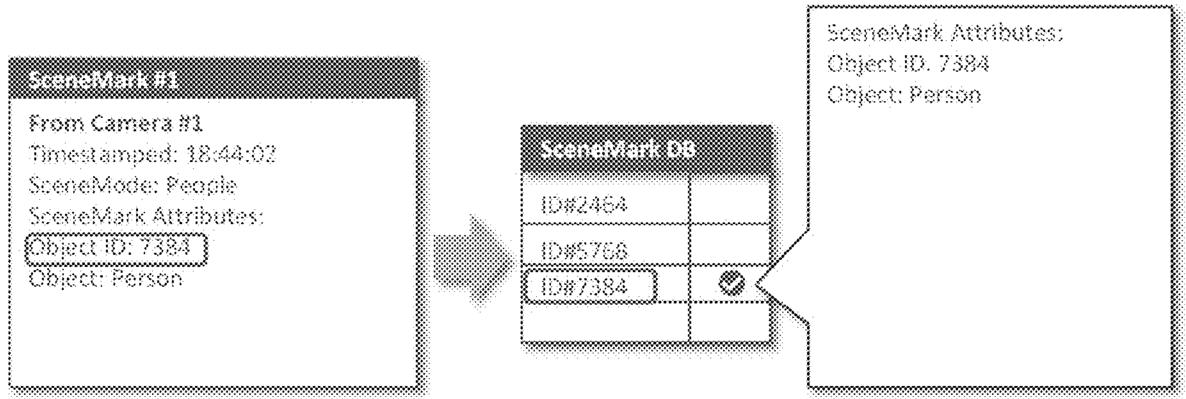

In FIG. 18B, a person is approaching the entrance of the building. Camera #1 is continuously monitoring the building entrance. When the person comes into the field of view of camera #1, the limited AI in camera #1 detects the presence of a person in the video. This event triggers the generation of SceneMark #1. The SceneMark includes the source (camera #1), timestamp, and SceneMode (person detection). The SceneMark also includes attributes: Object ID and Object type in this case. Since the SceneMode is person detection, this means that a person(s) have been detected in the video. The Object ID is an ID given to that person, and the Object type=person since it is a person that was detected. This particular format allows for the detection of different types of objects. Packages, guns, weapons, and animals might be other types of objects. In some cases, all of these nodes may be analyzing the video from camera #1, but only the person detection node generates a SceneMark because only that node detected an event. The SceneMark also contains a reference to the underlying frames of video. SceneMark #1 is saved in a SceneMark database.

Figure 18C:
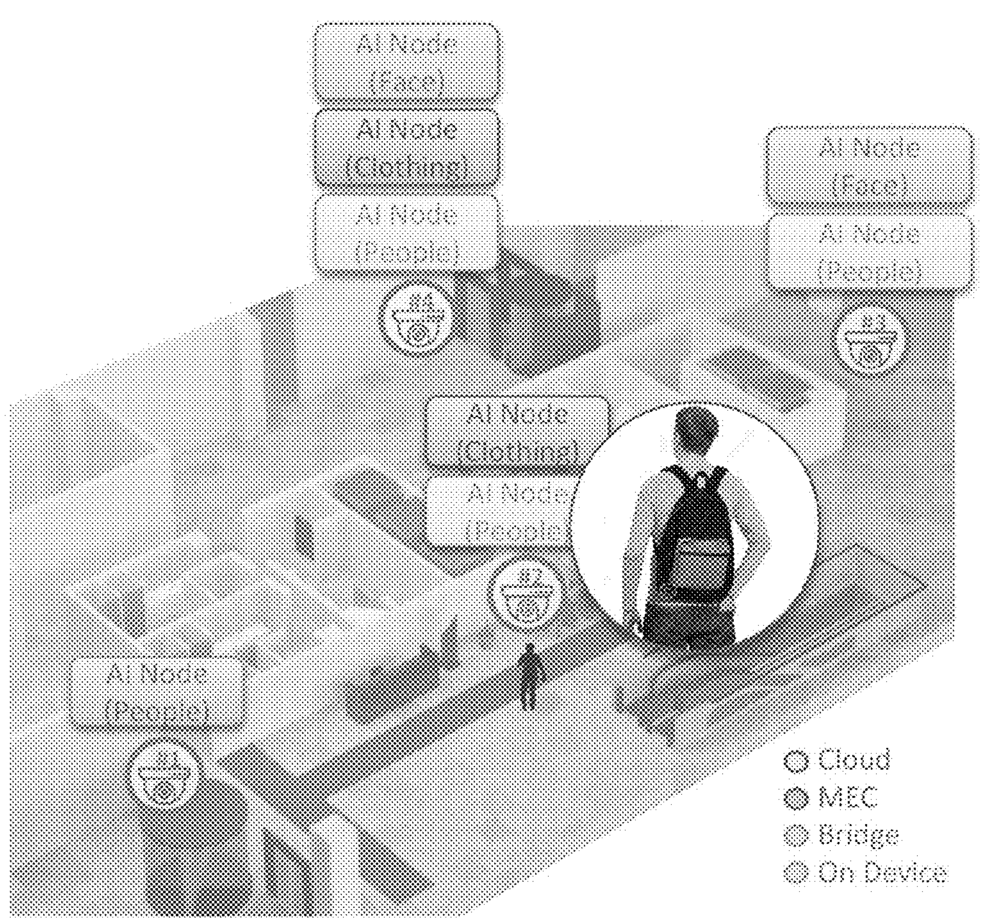
Figure 18C:
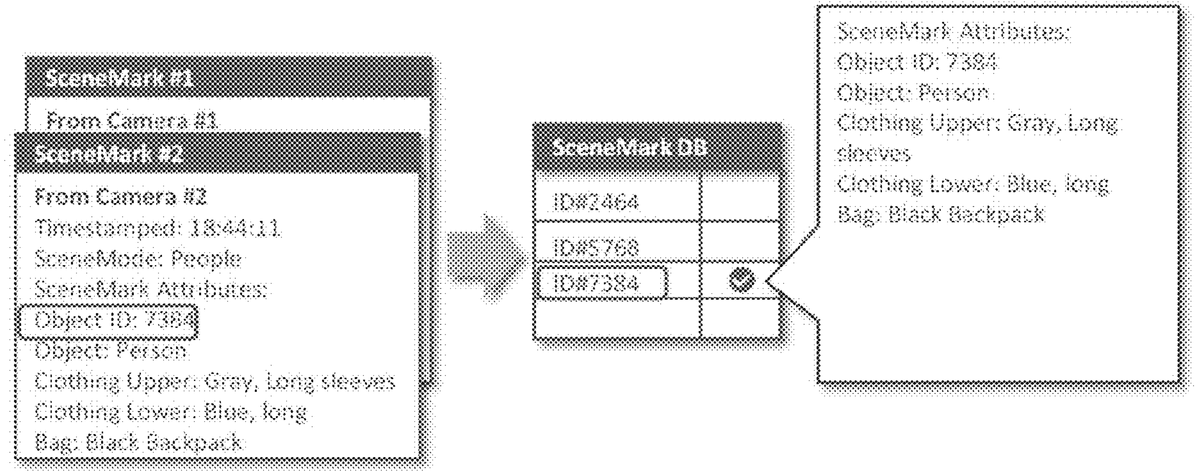

In FIG. 18C, the person enters the reception area and appears in camera #2's field of view. Camera #2 may also be continuously capturing video. The nodes associated with camera #2 may have more AI capabilities. In addition to person detection, it also has clothing recognition. The person detection node is implemented on a bridge device, and the clothing recognition node is implemented on an MEC. SceneMark #2 is generated based on the detection of a person. In addition, to the person detection attributes, SceneMark #2 also includes a description of the clothing: gray long sleeves for upper body clothing, long blue for lower body clothing, and backpack for bag.

The person is also recognized as the same person from FIG. 18B. The curation service has access to the proximity map and knows that there is a direct path from camera #1 to camera #2. It may also know, based on past observations, that people take a certain amount of time (or range of times) to move from camera #1 to camera #2. The timestamp for SceneMark #1 is 18:44:02. The timestamp for SceneMark #2 is 18:44:11, which is nine seconds later. The curation service may determine that this is within the range of expected times and, therefore, the person in SceneMark #2 is the same as the person in SceneMark #1. As a result, the Object ID in SceneMark #2 is the same as from SceneMark #1. SceneMark #2 and SceneMark #1 are grouped together to start to build a larger understanding of this object of interest.

In some cases, these determinations are made locally. For example, camera #1 may pass SceneMark #1 to camera #2. Camera #2 may know its proximity to camera #1 and therefore may expect the person to show up within a certain time range. When he shows up within that time range, SceneMark #2 is generated using the same Object ID.

It is also possible that SceneMark #2 is generated with a different Object ID, and it is determined later that the person in SceneMarks #1 and #2 are the same person. In that case, the two Object IDs may be merged and the corresponding SceneMarks updated accordingly. SceneMarks of an object can be contiguously amended as the object moves from node to node, especially when moving to a node with additional inference capabilities, marking the resulting SceneMark for an object with more attributes to be identified later at other nodes and at different times.

Figure 18D:
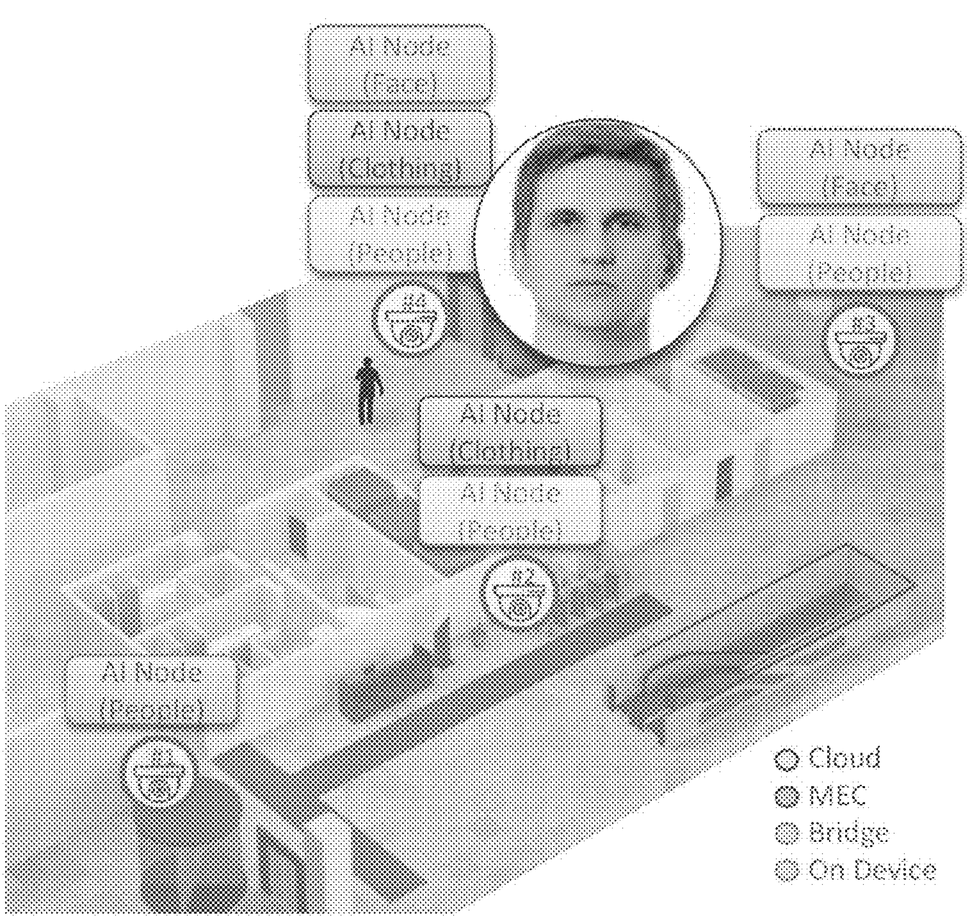
Figure 18D:
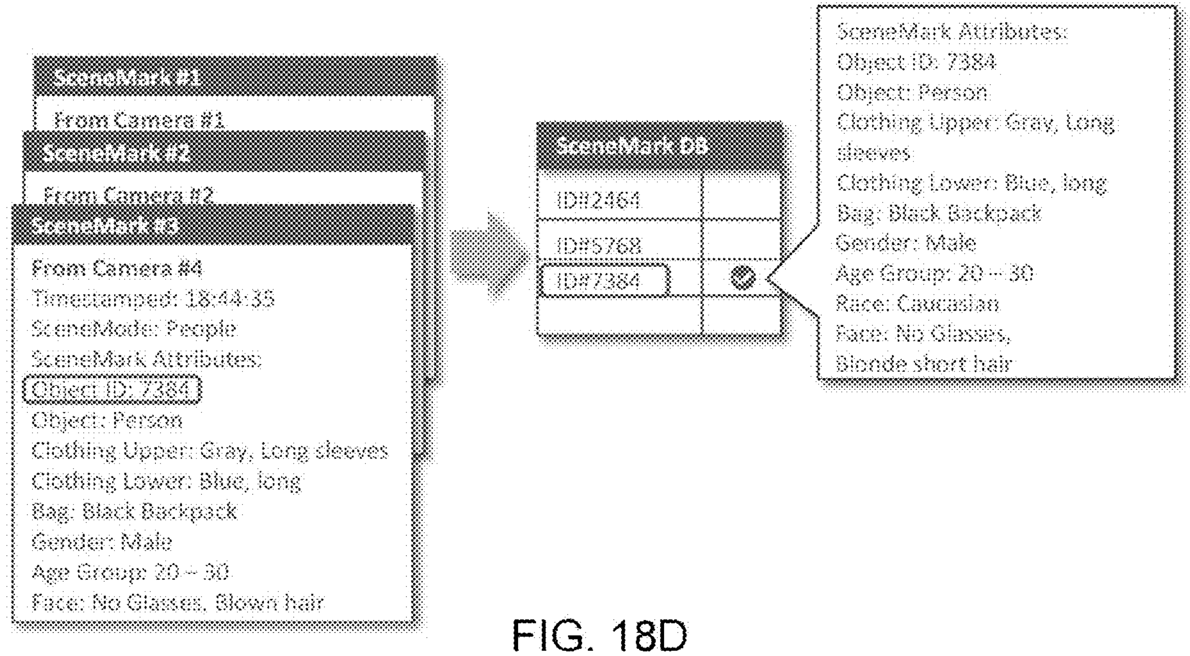

From the location of camera #2, based on the proximity map, the person might go down the hallway (camera #3) or he might go to the area monitored by camera #4. In this example, the person goes to camera #4, as shown in FIG. 18D. Camera #4 has access to clothing recognition, which recognizes the same clothing as SceneMark #2. Thus, the same ObjectID is used in SceneMark #3. In addition, perhaps most people take 30-50 seconds to walk from camera #2 to camera #3, but this person did so in 20 seconds based on the SceneMark timestamps. This is flagged as possibly suspicious activity. As a result, facial recognition is also performed. The facial recognition AI node is implemented on the cloud and has access to more processing power. It generates gender, age group, race, hair color, and any facial features such as wearing glasses, facial hair, jewelry, etc. SceneMark #3 is added to further build out this understanding of the object and overall Scene.

Figure 19A:
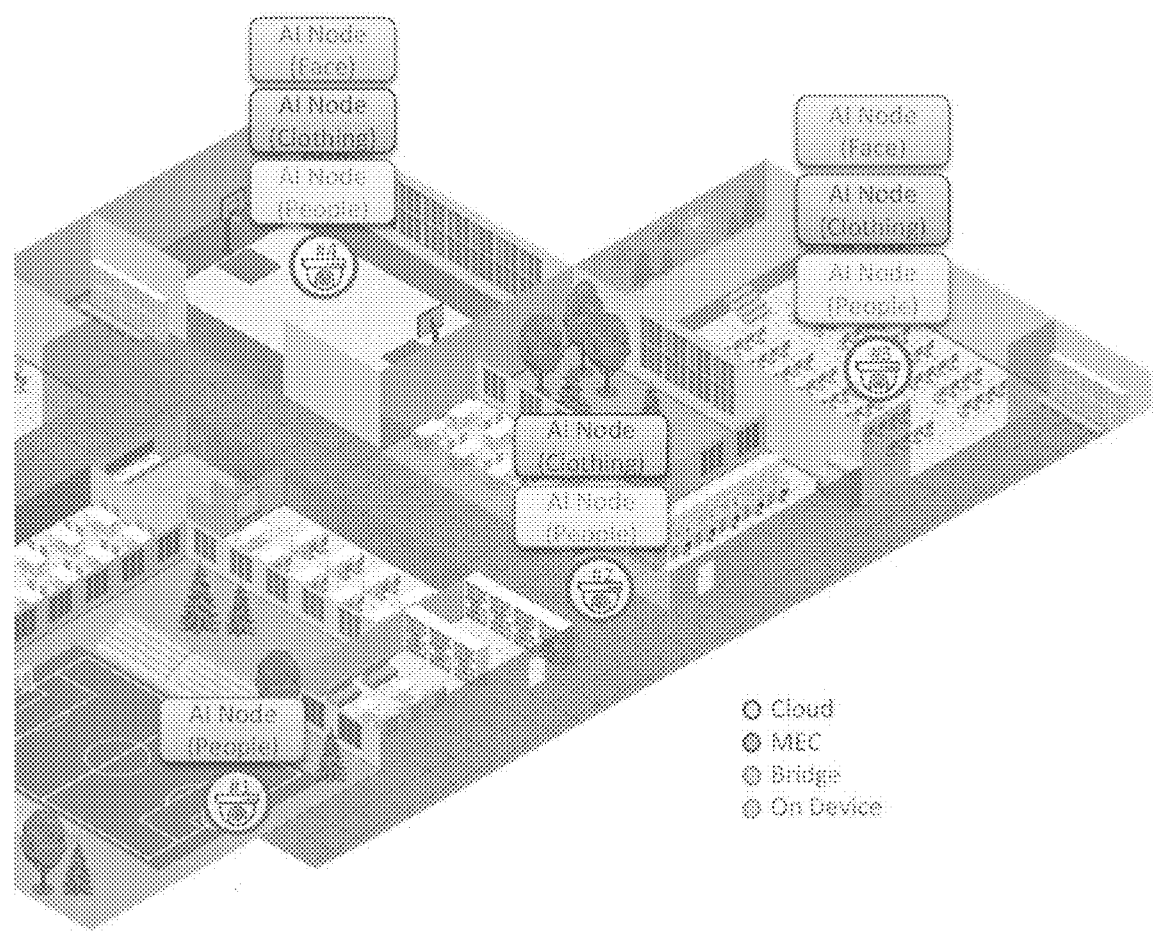
FIGS. 19A-19D show yet another use example for monitoring a space.

FIGS. 19A-19D show another example. FIG. 19A shows a school campus. This section of the campus has four cameras labeled #1-#4. Camera #1 monitors an entrance to campus by an outdoor soccer field. Camera #2 monitors an intersection of pedestrian walkways through campus. Cameras #3 and #4 monitor a basketball court and an auditorium, respectively. The colored rectangles in FIG. 19A show different capabilities associated with each of the cameras (i.e., available for processing images captured by the cameras), using the same nomenclature as FIG. 18. These capabilities are represented as nodes.

A curation service has access to these nodes, and knows which nodes have which capabilities. The curation service also has access to a proximity map of the different cameras.

The curation service generates custom workflows based on the different capabilities to accomplish various tasks. In this example, the task is security surveillance.

Figure 19B:
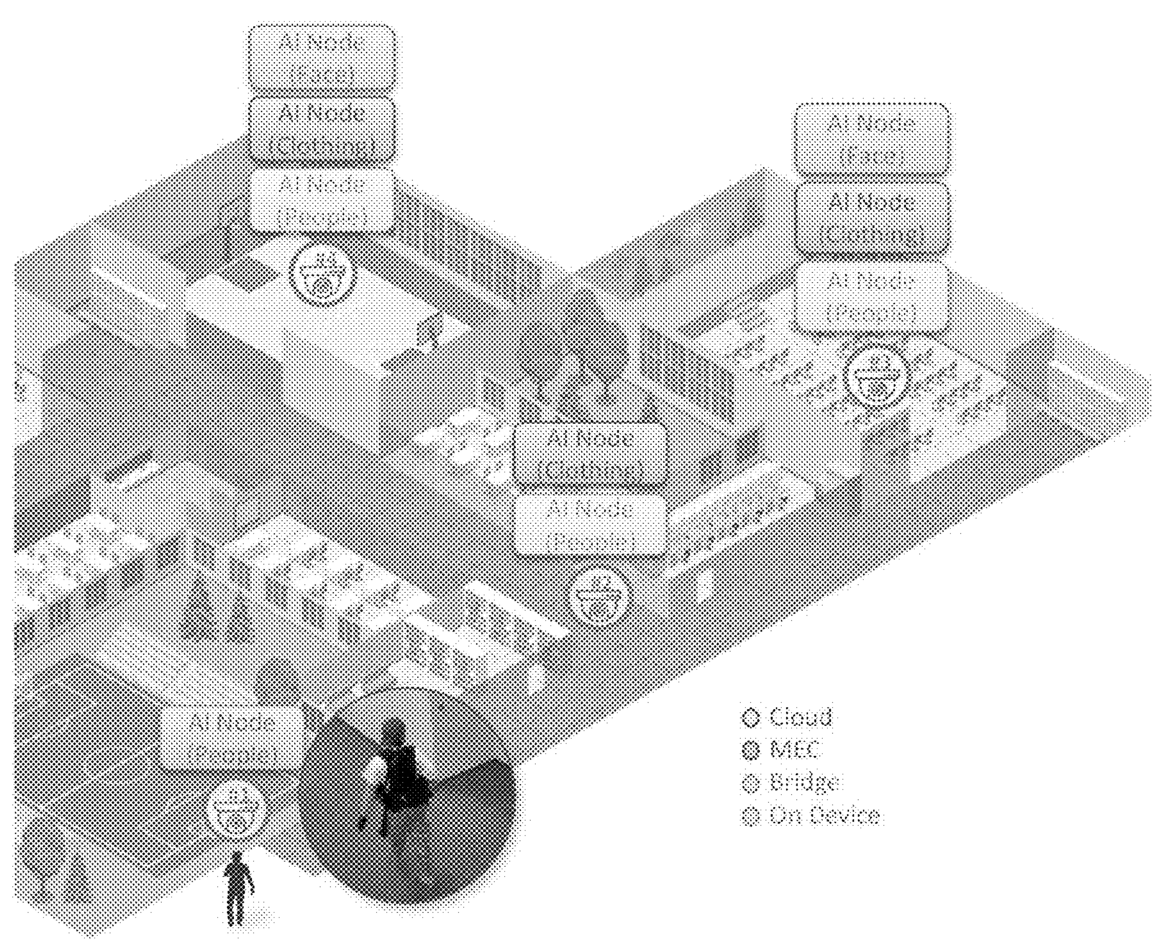
Figure 19B:
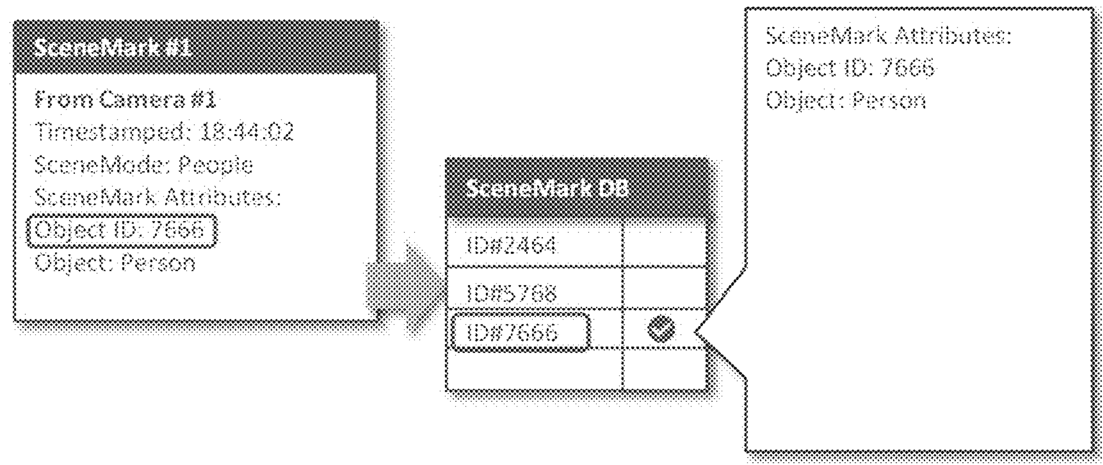

In FIG. 19B, a person is entering campus by the soccer field. Camera #1 is continuously monitoring this entrance to campus. When the person comes into the field of view of camera #1, the limited AI in camera #1 detects the presence of a person in the video. This event triggers the generation of SceneMark #1. SceneMark #1 is saved in a SceneMark database.

Figure 19C:
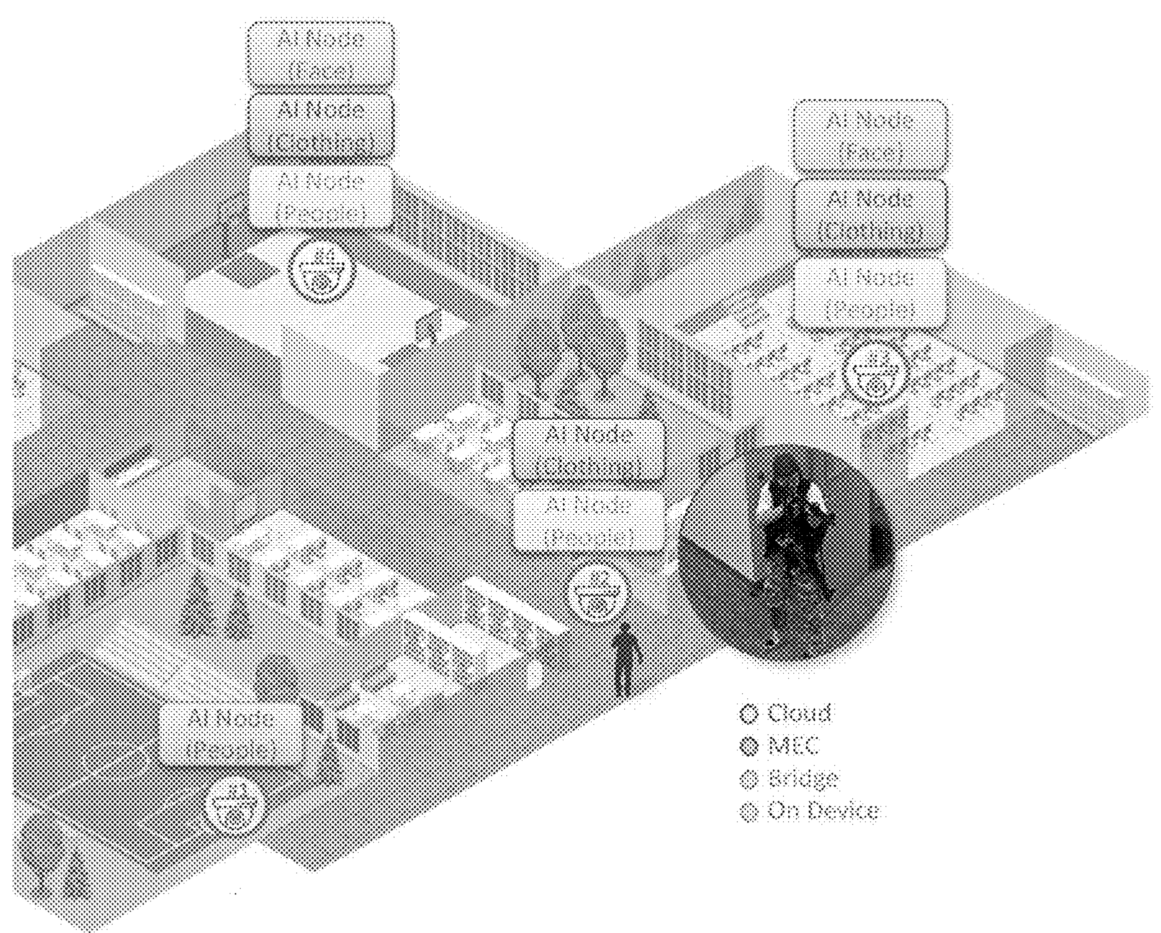
Figure 19C:
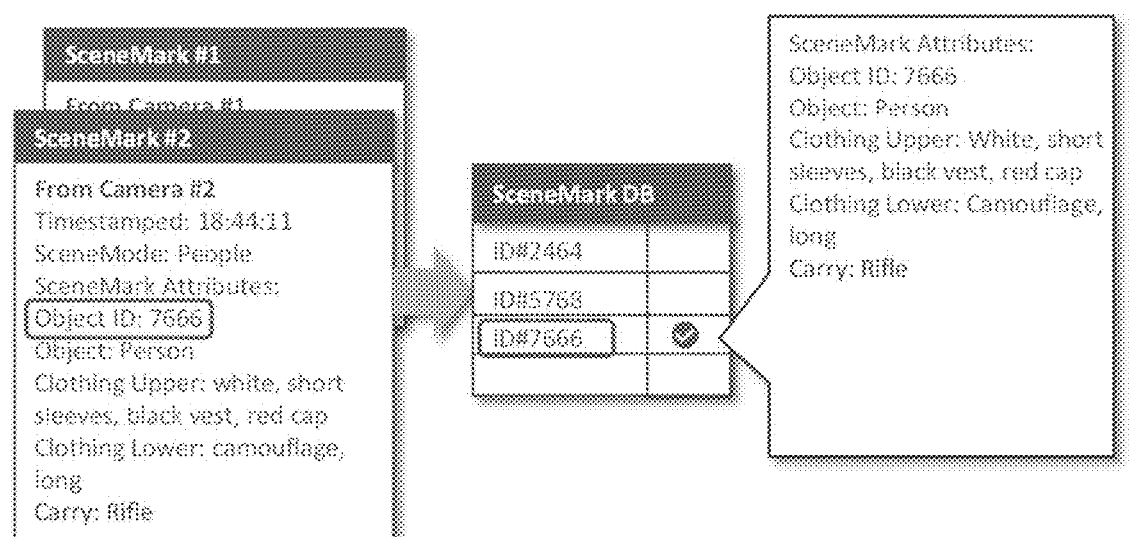

In FIG. 19C, the person travels into campus and appears in camera #2's field of view. Camera #2 may also be continuously capturing video. The nodes associated with camera #2 may have more AI capabilities. In addition to person detection, it also has clothing recognition. SceneMark #2 is generated based on the detection of a person. In addition, to the person detection attributes, SceneMark #2 also includes a description of the clothing: white, short sleeves, black vest, red cap for upper body clothing; and camouflage, long for lower body clothing. The AI also detects that the person is carrying a rifle, which is identified as a danger situation and triggers an alarm. Resulting actions may include locking gateways or sounding an alarm. The person is also recognized as the same person from FIG. 19B. As a result, the Object ID in SceneMark #2 is the same as from SceneMark #1. Attributes from SceneMark #2 and SceneMark #1 are grouped together to start to build a larger understanding of this object of interest.

Figure 19D:
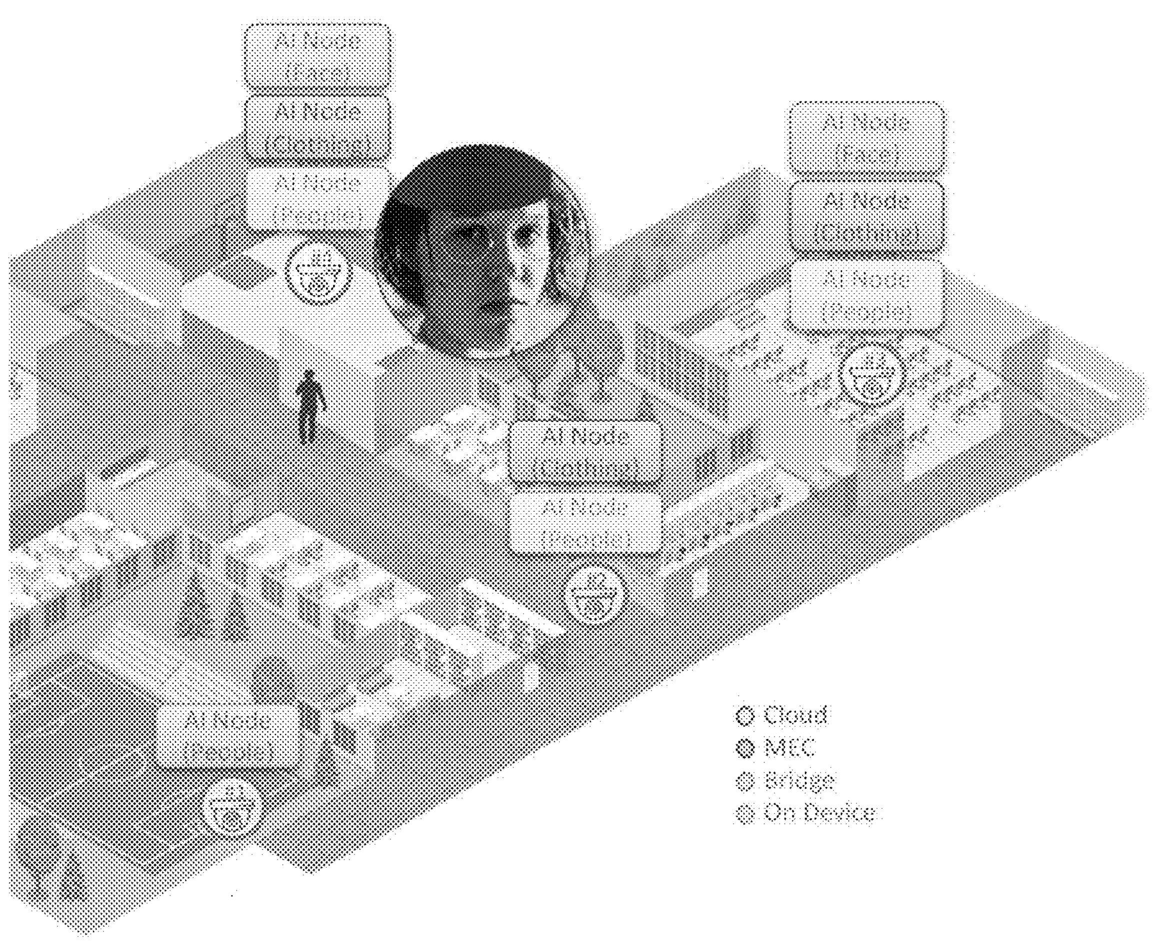
Figure 19D:
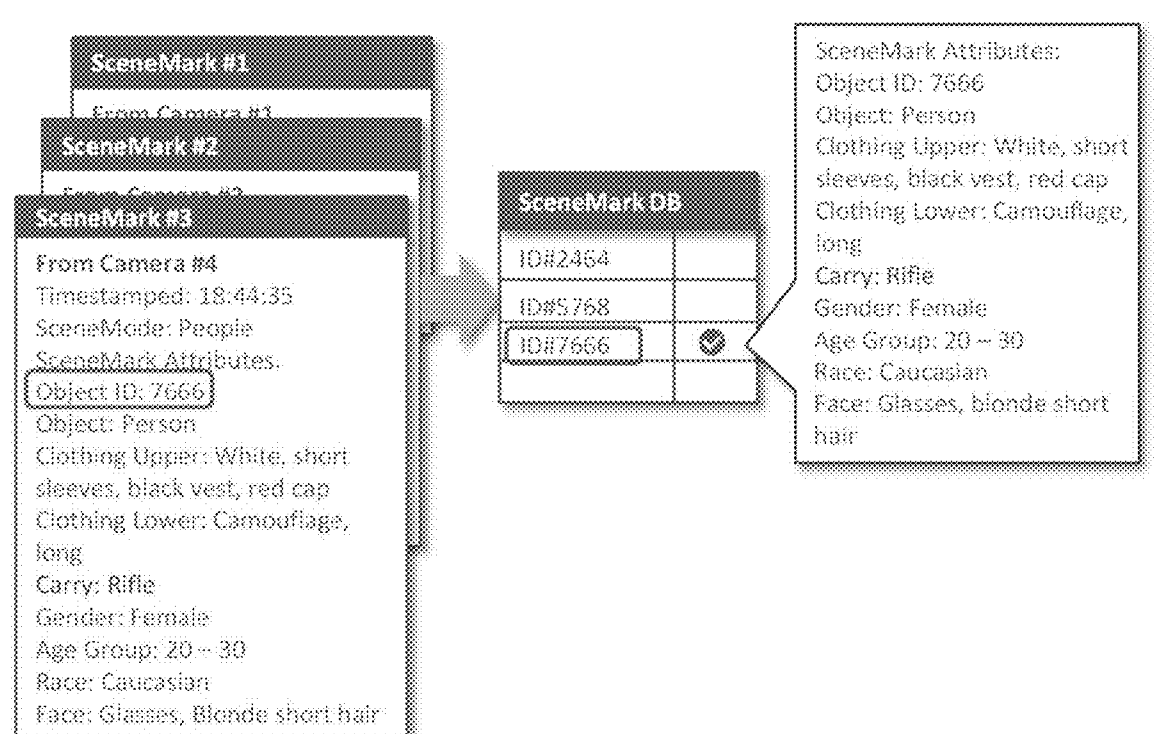

From the location of camera #2, based on the proximity map, the person might go down the hallway (camera #3) or he might go to the area monitored by camera #4. In this example, the person goes to camera #4, as shown in FIG. 19D. Camera #4 has access to clothing recognition, which recognizes the same clothing as SceneMark #2. Thus, the same ObjectID is used in SceneMark #3. In addition, camera #4 was alerted to the dangerous situation. As a result, high resolution pictures are captured and facial recognition is also performed. The facial recognition AI node is implemented on the cloud and has access to more processing power. It generates gender, age group, race, and facial features such as wearing glasses, facial hair, jewelry, etc. SceneMark #3 is added to further build out this understanding of the object and overall Scene.

In these prior examples, security may be added to the underlying video and the SceneMarks. For example, privacy concerns or requirements may specify that certain information may be used only for certain purposes, made available only upon occurrence of certain conditions and/or made available only to certain entities. That data may be otherwise secured against access. In the examples of FIGS. 18 and 19, identification of the person may be information that is secured due to privacy, legal or other concerns. It may be made available only to certain entities under certain conditions. In FIG. 19, the condition of carrying a rifle or the identification of a danger situation may trigger the release of the person's identification to law enforcement or other security entities.

Other examples of conditions for release may include the following:

- Detection of a specific event, such as fighting, loitering, intrusion, vehicle accident, other types of accident, fire flooding or other disasters, or crime.
- Detection of a specific sequence of events, for example a person making an unusual path through a space, or a person loitering at different locations through the course of a day, of detecting unusual movement or behavior patterns in a neighborhood or other space.
- Detection of a specific sequence of events involving the interaction of two or more people, for example tailgating, one person following another, people avoiding each other, fighting, verbal conflict/dispute, other conflicts (e.g., gesturing), physical cooperation or other types of cooperation, forming or joining a group, or dispersing or leaving a group.
- Specific requests from authorized personnel.

The release may be limited to entities or individuals who are authorized to view the material in response to the release condition, for example the head of security at a facility, law enforcement, fire department or other public agencies, etc.

In the above examples, generative AI, machine learning, and other types of AI may be used to implement some of the functions, particularly the high-level functions of image understanding and of determining when observed Scenes fall outside the norm or what is expected. Examples of behavior that falls outside the norm may include the following:

- Unexpected occupancy: person in space expected to be vacant, or no people in a space expected to be occupied. Occupancy limit exceeded.
- Loitering at one or more locations.
- Unusual path of a person through a building.
- Unusual movement for the location, for example running in a foyer where people usually walk, traveling too fast or too slow, or looking around too much or not enough.
- Unusual combinations of movement between two or more people—for example tailgating.
- Unexpected objects: Right after the last person leaves the room, check to see if there are any left items; detection of unexpected dangerous objects.
- Unexpected conditions: A person in a construction zone is not wearing a helmet. Persons in a certain type of space are required to wear certain gear (safety gear, protective gear, work gear, occupational gear), check for that.
- Different type of activity than normally expected.
- Different type of behavior than expected
- Different person(s) than expected
- Different condition(s) for the space than expected In some cases, contextualized events or scenes may be classified into different categories. Different actions may be taken based on the category. For example, for commercial real estate, scenarios may be classified as the following:

- Janitorial service. Count how many people were present (or how often the room has been occupied over the day time), dispatch appropriate cleaning. Determine whether furniture was rearranged and needs to be re positioned. Detect smoke, stains, litter, etc. More generally, other types of adaptive services may include determine usage of space, and then adapting services according to usage.
- Facility maintenance (e.g. fixing lights and HVAC).
- Security and safety (e.g. elderly person falling down or getting off the routine routes)
- Insurance record (e.g. emergency exit door blocked by certain objects)
- Business insight analytics—CFO can have a report on facility's condition or service cost based on the above categories, which affect the lease expense and service expense.

In some cases, generative AI or other types of machine learning/AI may operate on SceneMarks and/or SceneMark tokens to perform these functions. A token in a sequential neural network is a basic unit that is processed in the network. For example, in text, a token may be a word or even a letter. The fields in the SceneMark may be a single token or may be further broken down into a sequence of tokens. For example, where the SceneMark may have a list of detected items, each item will become a token when the SceneMark is processed by the network. Detected items may be “human”, “vehicle”, “animal” etc. “Human” can then be used as a token. If a field has a free format, for example it is a text string describing an event, the tokens may either be the words in the text string or the characters in the string. The SceneMark may be implemented in JSON format, which is made up of combinations of words. The following is an example of a JSON structure:

```
{
    “ItemID”: “898”,
    “ItemType”: “Human”
}
```

The ‘{’ may be a token, “ItemID” may be a token, ‘:’ may be a token, “Human” may be a token.

Generative AI may be trained on accumulated SceneMarks and responses to those SceneMarks collected over time for various Scenes. The trained AI may be able to predict what Scene/Event may happen at certain nodes/cameras or what is the expected response. It may also identify when Scenes/Events fall outside what is expected.

SceneMarks may be used to train AI to understand common events and routine responses to such events for the space being monitored. This learning can then be applied to interpret events more accurately and/or to predict what may happen next. A specific generative AI model can be built for such SceneMark tokens. So SceneMarks may be used to train generative AI models. Such models may produce additional SceneMarks or enhance existing SceneMarks to improve prediction of what the event will be or what specific response may be needed.

The following is a more detailed description of how the AI may be trained to generate predictive SceneMarks. A group of cameras is allowed to run for a period of time generating SceneMarks for a normal period of operation. In a building management use case, this may entail letting the cameras run over a few weeks so that different patterns of behavior can be captured for office hours, night time, public holidays, weekends, etc. The group of cameras generates SceneMarks based on the occurrence of people and events. These SceneMarks are stored and used as a training data set.

This data set may be further enhanced by manual labelling or feedback from users of the system. Feedback or labelling may include grouping SceneMarks into “Scenes.” It may also include labelling a SceneMark or group of SceneMarks as a particular Scene. For example, a SceneMark of when a person enters the front door of the building and then another SceneMark of when they stop at the reception desk could be grouped together as a Scene labelled as “guest entering the building”.

The recorded SceneMarks can then be used as training data for an AI. The AI is trained to reproduce sequences of SceneMarks that match the original data set of SceneMarks. The trained AI will generate a sequence of SceneMarks when provided with an input sequence of SceneMarks.

In the case where the AI has been trained with labelled Scenes, the AI may generate groupings of SceneMarks and labels for those groupings of SceneMarks. For example when a SceneMark generated by someone entering the building is followed by a SceneMark of someone stopping at reception, the AI may automatically group the two SceneMarks as a single Scene and label the Scene as “guest entering the building.”

The AI that can predictively generate SceneMarks may be separate or combined with the AI that can group and label a sequence of SceneMarks.

The AI that has been trained to generate new SceneMarks will create SceneMarks with fields that are most likely to occur given the previous sequence of SceneMarks. For example, assume that a typical sequence of three SceneMarks has a delay of 5 seconds between the first and second SceneMark and 10 seconds between the second and third SceneMark. If the first two of the SceneMarks are fed into the AI, the AI will generate a third SceneMark with a time stamp delayed by 10 seconds relative to the second SceneMark. Similarly other fields in the SceneMark will be generated by the AI for the predicted SceneMarks.

Anomalies may be detected by comparing the predicted sequence of SceneMarks vs the actually detected SceneMarks generated by the cameras. A score may be generated which measures the difference between two sequences of SceneMarks and based on this score the sequence may be deemed to be an anomaly or not. Additional AIs may be trained to compare sequences of SceneMarks and determine whether the detected sequence of SceneMarks represent an anomaly or not.

Another approach in automatically detecting an anomaly in the sequence of SceneMarks is to use labelling. When the AI is used to analyze newly captured sequences of SceneMarks, the AI groups the SceneMarks into Scenes and labels the Scenes. An AI which is trained to recognize patterns in sequences may generate scores for matching different labels. A high score for a particular label means that the sequence is likely to match the label. In case the sequence does not generate scores that are a strong match for any of the labels for which the network has been trained, the sequence can be considered to be an anomaly and flagged as such.

Figure 20A:
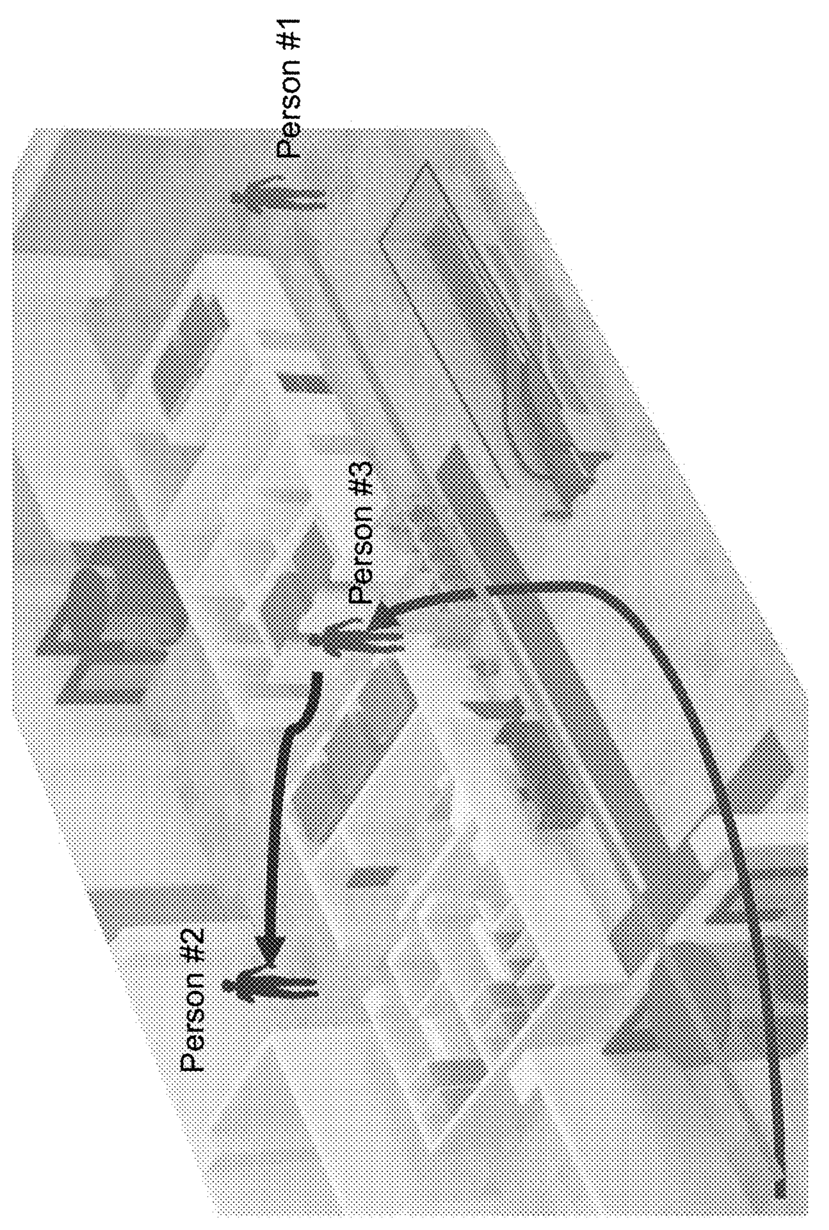
FIGS. 20A-20C show additional use examples using AI models.
Figure 20B:
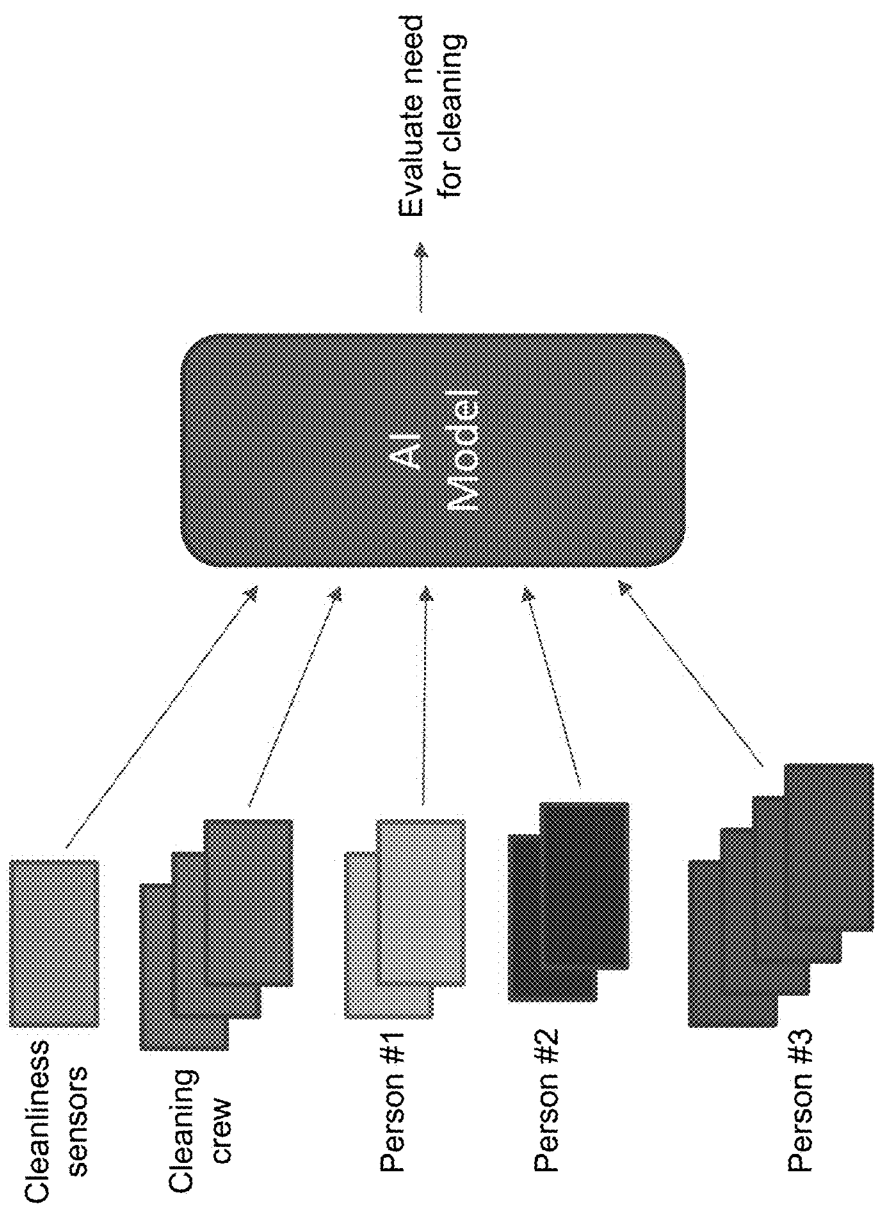
Figure 20C:
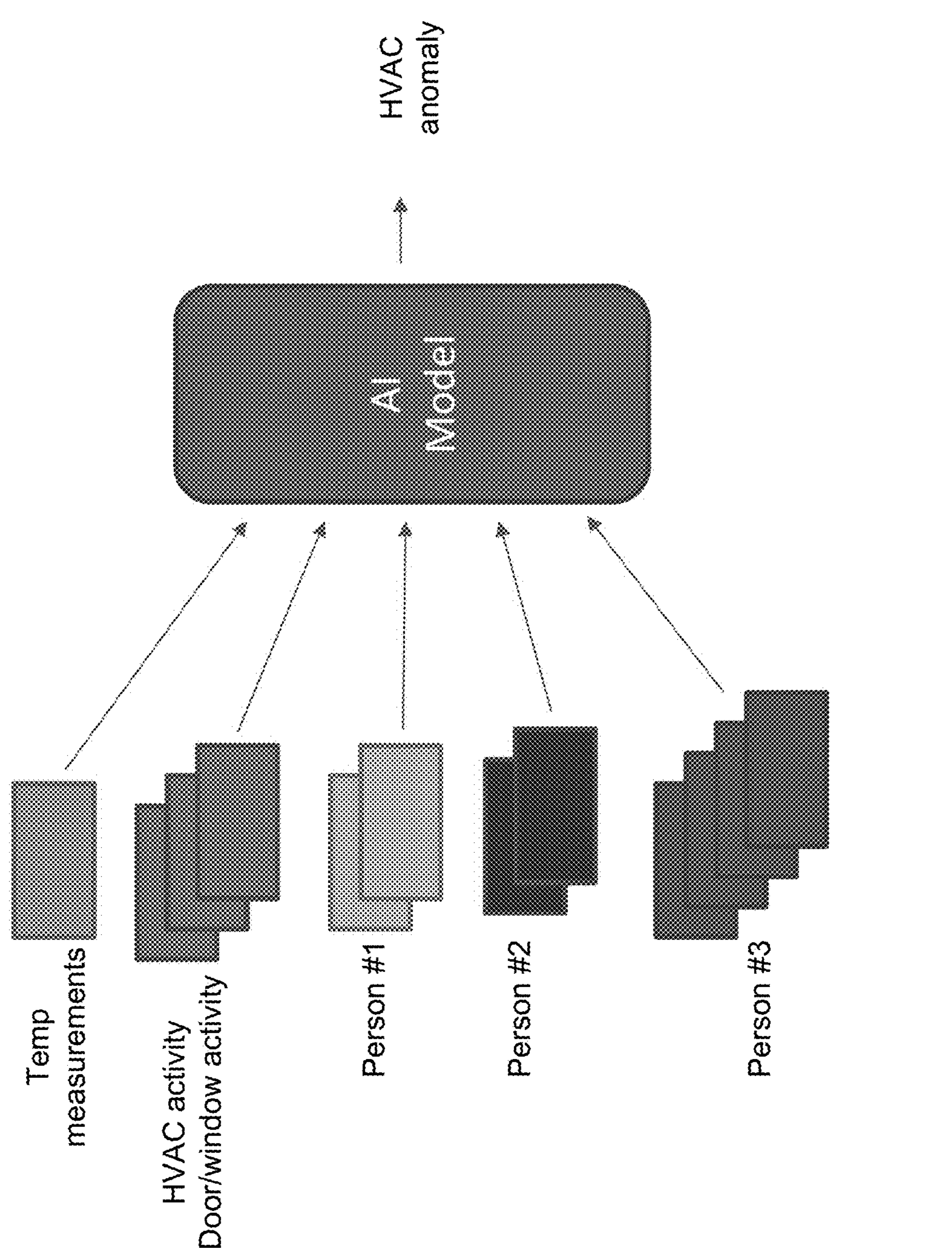

FIGS. 20A-20C show examples of building more complex understanding of Scenes. FIG. 20B is an example application of managing cleaning services for an office building, and FIG. 20C is an example application of detecting HVAC, lighting or occupancy anomalies for an office building. Both of these are based on the activities shown in FIG. 20A. FIG. 20A shows the paths of three different people as they travel through the monitored space. The green path (person #1) is someone who enters the building and goes straight down the hallway. The red path (person #2) is someone who takes the elevator to this floor and moves to the area to the left. The blue path (person #3) is someone who enters the building and takes an elevator to another floor. Each of these paths will generate sets of SceneMarks as described previously in FIG. 18.

FIG. 20B shows the SceneMarks generated by the activities of persons #1-#3. Since the application in FIG. 20B is managing cleaning services, the SceneMarks may be tailored appropriately. For example, it may be less important to re-identify people as they pass from one camera to the next. It may be more important to detect how the place was occupied—how many people stayed for how long and how they left the place behind. It may also be important to detect spills and other dirty areas to determine what type of cleaning is needed. FIG. 20B also includes two additional sets of SceneMarks. One is the SceneMarks generated by the cleaning crew as it cleans throughout the day. This might be based on which areas they visit, how long they spend in each area, and what special cleaning equipment they might be using. The SceneMarks may have attributes such as different types of cleaning (dusting, floor cleaning, etc.) and different levels of cleaning (spot cleaning, light cleaning, medium cleaning, heavy cleaning). The other set of SceneMarks are from sensors that directly assess the cleanliness of the building. This might include dust sensors, computer vision to identify spots, spills, messy areas, etc. Interpretation of a Scene can be learned by using accumulated Scenemarks and what type of action (cleaning) took place to train AI models.

An AI model is trained to receive these SceneMarks and evaluate the need for cleaning different areas of the building. For example, the AI model may produce a prioritization of which area should be cleaned first, or might produce a cleaning schedule, or might dispatch cleaning crews to areas that need immediate cleaning, or may identify areas for which regularly scheduled cleaning may be skipped.

FIG. 20C also shows the SceneMarks generated by the activities of persons #1-#3, which may also be tailored to the application, which for FIG. 20C is detecting HVAC anomalies. These SceneMarks may capture amount of clothing worn as an indication of temperature, density of people in closed spaces, and the presence and operation of personal heaters and coolers, for example. FIG. 20C also includes two additional sets of SceneMarks. One is SceneMarks for events relating to changes in the HVAC system and building itself that might affect HVAC operation. Examples include changing setpoints for the HVAC system, turning on and off various heating and air conditioning systems, and the opening and closing of windows, doors, and shades and blinds. The other set of data is local temperature measurements, such as from thermostats in different rooms.

The AI model is trained to receive these SceneMarks and determine anomalies, such as might indicate the need for HVAC maintenance or investigation. For example, if the actual measured temperature and the predicted temperature do not match, something might be wrong. Perhaps a thermostat or some other HVAC component is broken, or a door is jarred open.

Figure 21:
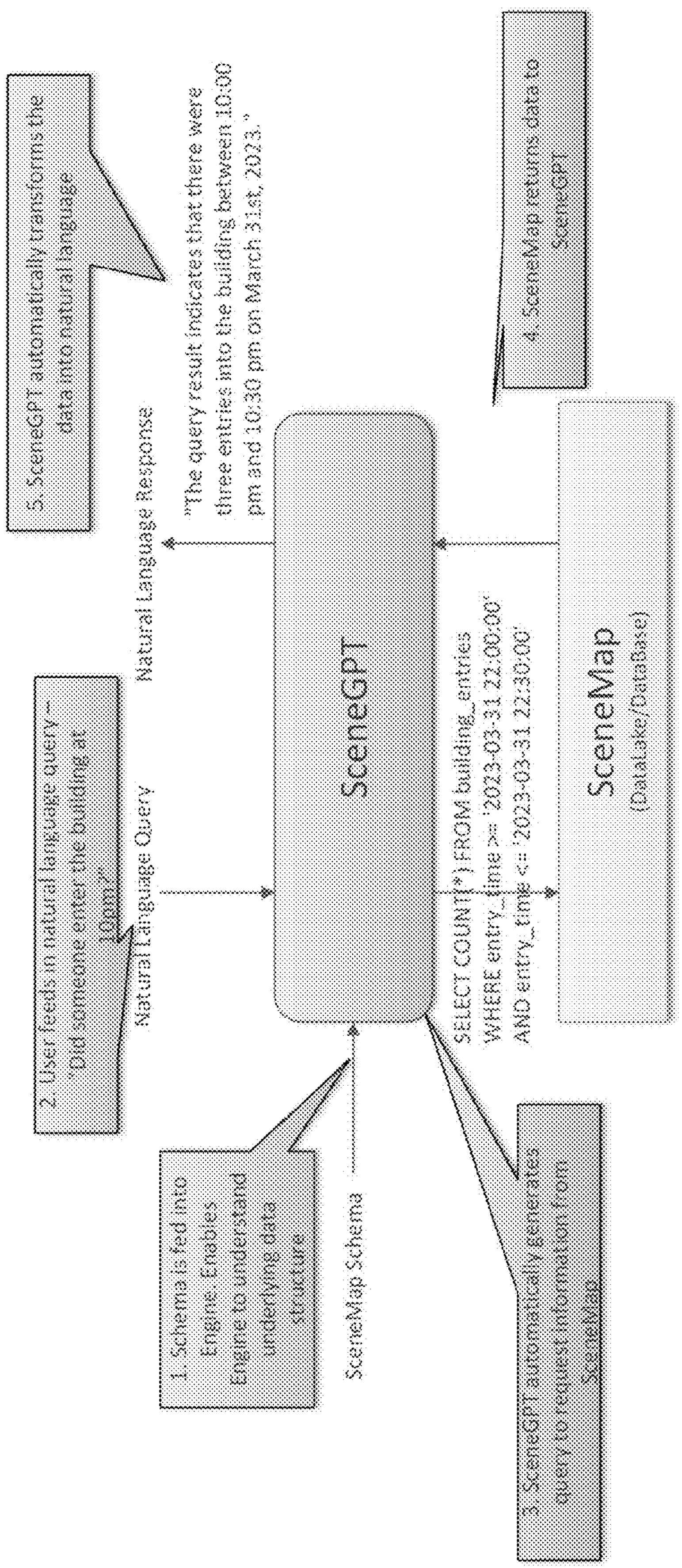
FIG. 21 is a diagram illustrating the use of generative AI.

FIG. 21 is a diagram showing another use of generative AI. In this figure, the generative pre-trained transformer (GPT) is labeled as SceneGPT, and SceneMap is a database that contains SceneMarks and SceneData captured and produced by the different nodes. The schema for the SceneMap is fed to the SceneGPT engine. This allows the engine to understand the underlying data structure used in the SceneMap. A user makes a natural language query to the SceneGPT engine. For example, the user may ask, "Did someone enter the building at 10:00 PM?" The SceneGPT engine generates a query to request the relevant data from the SceneMap database. Since the generative AI engine knows the schema for the database, it can generate the query using the correct syntax. The SceneMap database returns the requested data. The SceneGPT engine reviews the data and produces a natural language answer based on the data. For example, it might respond, "The query result indicates that there were three entries into the building between 10:00 PM and 10:30 PM on Mar. 31, 2023."

Figure 22:
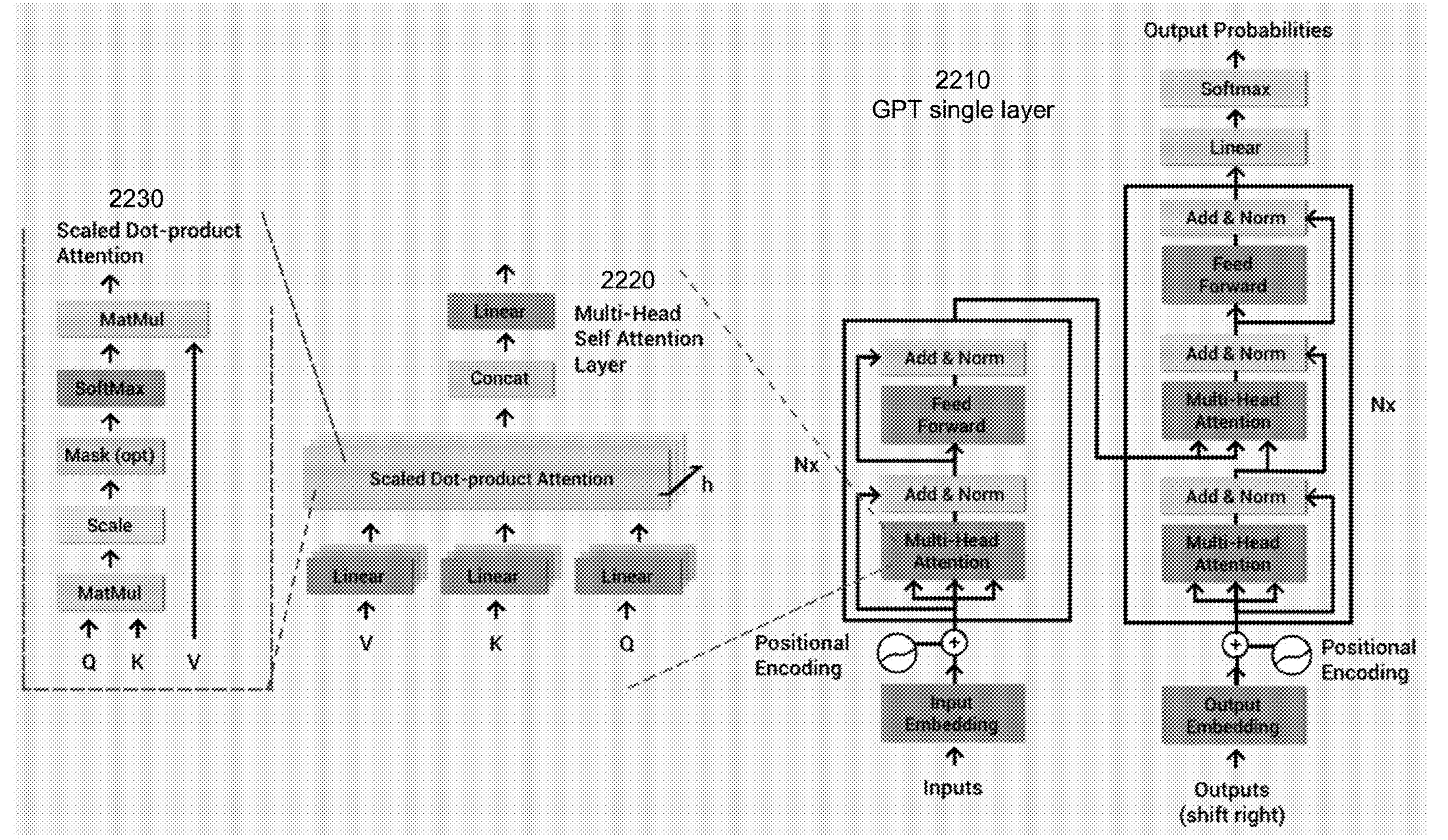
FIG. 22 is a diagram of one layer of a generative AI.

FIG. 22 is a block diagram of one layer of a SceneGPT engine. The full engine includes multiple layers. The righthand diagram of FIG. 22 shows one layer 2210. The center diagram of FIG. 22 shows detail of the multi-head self attention layer 2220, which is the blue Multi-Head Attention boxes in the righthand diagram. The lefthand diagram shows detail of the Scaled Dot-product Attention 2230, which is the yellow boxes in the center diagram.

In the righthand diagram, the layer 2210 receives inputs to that layer and outputs from previous layers. Embedding is a coding of the inputs, typically as features or vectors. Positional encoding is an encoding that captures the position of text or other inputs. The Multi-Head Attention functions are shown in the center diagram. Add & Norm are addition and normalization. Feed Forward is a feedforward network. Linear is a linear weighting. Softmax is a nonlinear function.

In the center diagram 2220, Linear is a linear weighting. Scaled Dot-production Attention is shown in the left diagram. Concat is concatenation. In the left diagram 2230, MatMul is a matrix multiplication. Scale is a scaling operation. Mask is an optional masking operation. SoftMax is the softmax operator.

In addition to answering queries, as shown in FIG. 21, generative AI can also be used for other tasks. For example, sequences of SceneMarks from multiple sources (cameras, IoTs) may be used as training data to train the AI to generate predicted SceneMarks based on previous sequences of SceneMarks. The SceneMarks that are predicted may be for specific sources of SceneMarks.

For example, in the application of FIG. 20C, SceneMarks may be collected from cameras and temperature sensors, but the prediction may be made only on the temperature SceneMarks. The predicted SceneMarks may be compared against actual sequences of SceneMarks, including temperature. The comparison may be used to identify anomalies and generate notifications. These can be used for predictive maintenance or to take specific actions.

As another example, generative AI may be used to improve/amend SceneMarks for increasing the accuracy of identifying an object. The accumulation of SceneMark attributes through multiple nodes enhances the accuracy of SceneMarks. Generative AI may use accumulated SceneMarks with anchored data (SceneMode, what event detected with attributes, how the event was attended for, etc.) to better curate the scenes/events. This may help with the interpretation of scenes or the expression of events and activities in scenes. It may also help with the prediction of future events or sequences.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a computer-readable storage device for execution by a programmable processor; and method steps can be performed by a programmable processor executing a program of instructions to perform functions by operating on input data and generating output. Embodiments can be implemented advantageously in one or more computer programs that are executable on a programmable computer system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits), FPGAs and other forms of hardware.

Section X: Description of Data Objects

This Section X describes example implementations of the following data objects:

Capabilities
SceneMode
SceneMark
SceneData

These data objects may be used to facilitate image understanding. Image understanding are higher level functions used to understand the content of images. One example is the detection of the presence or absence of a specific object: the detection of faces, of humans, of animals or certain types of animals, of vehicles, of weapons, of man-made structures or certain type of structures, or of texts or logos or bar codes. A higher level example is the identification (i.e., recognition) of specific objects: the identification of a terrorist in a crowd, the identification of individuals by name, the identification of logos by company, the identification of an individual against a passport or driver's license or other credential. An even higher level example of image understanding are further characterizations based on the detection or identification of specific objects. For example, a face may be detected and then analyzed to understand the emotion expressed. Other examples of image understanding include the detection and identification of specific actions or activities, and of specific locations or environments. More complex forms of image understanding may be based on machine learning, deep learning and/or artificial intelligence techniques that require significant computing resources. The results of image understanding may be captured in metadata, referred to as image understanding metadata or contextual metadata. They may be packaged as SceneMarks described below.

Capabilities Object

The Capabilities object defines Processing, Transducers and Ports that the Node is capable of providing. The Capabilities data structure describes the available processing, capture (input) and output of images, audio, sources of data and outputs of data that are supported by a Node. These may include the following.

1. Transducer: A Transducer is either a sensor or an actuator which can convert data into a physical disturbance (for example a speaker). The following are examples of Transducers:

Image sensor (image, depth, or temperature camera) typically outputs a two-dimensional array that represents a frame.

Data sensor (humidity sensor, temperature sensor, etc.) typically outputs a text or data structure.

Audio microphone typically produces a continuous sequence of audio samples.

Speaker takes as an input a sequence of audio samples and outputs audio.

2. SceneModes supported: These are defined modes for analyzing images. See also the SceneMode object below.

3. Audio processing: This may be defined by the Node. It includes the function of speech to text.

4. CustomAnalysis: This allows the user to define custom analysis. As one example, it may be an algorithm that can process an audio, image or video input and generate a vector of scores whose meaning is defined by the algorithm.

5. Input: This may be SceneData or SceneMarks and may be in a processed or unprocessed form. The following may be sources for the process:

Output of a sensor internal or external to the device.
Output of a Node on a different device.
Output of a different Node within the same device.

6. Output: An output may be SceneData or SceneMarks and may also be in a processed or unprocessed form.

SceneMode Object

The SceneMode determines the data to be generated. It defines which type of data is to be prioritized by the capture of frames and the processing of the captured frames. It also defines the SceneMarks that are generated and the trigger conditions for generating the SceneMarks.

For example the Face SceneMode will prioritize the capture of faces within a sequence of frames. When a face is detected, the camera system will capture frames with the faces present where the face is correctly focused, illuminated and, where necessary, sufficiently zoomed to enable facial recognition to be executed with increased chance of success. When more than one face is detected, the camera may capture as many faces as possible correctly. The camera may use multiple frames with different settings optimized for the faces in view. For example, for faces close to the camera, the camera is focused close. For faces further away, digital zoom and longer focus is used.

The following SceneModes may be defined:

Face
Human
Animal
Text/Logo/Barcode
Vehicle
Object Label. This is a generalized labeling of images captured by the camera.
Custom. This is user defined.

The SceneMode may generate data fields in the SceneMark associated with other SceneModes. The purpose of the SceneMode is guide the capture of images to suit the mode and define a workflow for generating the data as defined by the SceneMode. At the application level, the application need not have insight into the specific configuration of the devices and how the devices are capturing images. The application uses the SceneMode to indicate which types of data the application is interested in and are of highest priority to the application.

Trigger Condition

A SceneMode typically will have one or more "Triggers." A Trigger is a condition upon which a SceneMark is generated and the SceneData defined for the SceneMode is captured and processed. The application can determine when a SceneMark should be generated.

In one approach, Triggers are based on a multi-level model of image understanding. The Analysis Levels are the following:

1. Motion Detected: The Process is capable of detecting motion within the field of view.
2. Item Detected or Item Disappeared: The Process is capable of detecting the item associated with the SceneMode (Item Detected) or detecting when the item is no longer present (Item Disappeared). For example in the case of SceneMode=Face, Item Detected means that a Face has been detected. In the case of SceneMode=Animal, Item Disappeared means a previously detected animal is no longer present.
3. Item Recognized: The Process is capable of identifying the detected item. For example in the case of the SceneMode=Label, "Recognized" means a detected item can be labelled. In the case of SceneMode=Face, "Recognized" means that the identity of the face can be determined. In one version, the SceneMode configuration supports recognition of objects based on reference images for the object.
4. Item Characterized: The Process is capable of determining a higher-level characteristic for the item. For example in Scene Mode=Face, "Characterized" means that some feature of the detected face has had an attribute associated with it. For example, a mood or emotion has been attributed to the detected face.

The SceneMode defines the Analysis Level required to trigger the generation of a SceneMark. For example, for SceneMode=Face, the Trigger Condition may be Face Detected, or Face Recognized, or Face Characterized for Emotion. Similar options are available for the other SceneModes listed above.

SceneMark Object

A SceneMark is a compact representation of a recognized event or Scene of interest based on image understanding of the time- and/or location-correlated aggregated events. SceneMarks may be used to extract and present information pertinent to consumers of the sensor data. SceneMarks may also be used to facilitate the intelligent and efficient archival/retrieval of detailed information, including the raw sensor data. In this role, SceneMarks operate as an index into a much larger volume of sensor data.

SceneMark objects include the following:

SceneMark identifier

Timestamp

Image understanding metadata (attributes)

Reference to corresponding SceneData

When the analysis engines encounter Trigger Conditions, a SceneMark is produced. It provides a reference to the SceneData and metadata (and attributes) for the Trigger Condition and contextualization of the underlying scene. Attributes may include physical aspects of the event (e.g., thumbnail image, relevant location, timestamp, etc.); inference result computed by the edge Node at the time of capturing the sensor data; post inference results (e.g., performed in the cloud) to further amend the SceneMark with additional analytics, including those obtained by adjacent sensors. SceneMarks may be grouped according to their attributes. For example, language models similar to GPT-4 may analyze SceneMarks to produce interesting curation results. Some examples of SceneMark attributes include the following:

Information about the device being used (manufacturer, model, processor, OS version, device name, etc.)

Thumbnail (still) image representing the Scene/event

Inference (analytics) setup used per given SceneMode—textual information on how the event detection was set up (e.g. SceneMode, ROI), what analytics models are employed and the result of analytics used.

Motion vectors indicating which direction the object detected was moving forward. This information can be used in the following attributes: Temporal and Spatial information.

Temporal information (timestamps and sequence information of SceneMarks with the same object detected by multiple cameras at different times)

Spatial information, derived from proximity map built using accumulated SceneMarks to show the relevant camera position Additional post analytics performed, including identifying other objects like color of clothes or wearing/carrying objects on a person and results. For example, collected thumbnail images and texts may be sent to GPT-4 (or other AI) for validation of the SceneMark, and the AI may also add more information about the scene based on texts.

Upon generation of SceneMark, whether and where the notification was sent and what response was recorded when by whom. Also, any post analysis of whether the scene was interpreted correctly or not.

Anchored data by end users to link the captured event to certain public data (weather or traffic) or data gathered by other services The completeness of the SceneMark is determined by the analysis capabilities of the Node. If the Node can only perform motion detection when higher level analysis is ultimately desired, a partial SceneMark with limited attributes may be generated. The partial SceneMark may then be completed by subsequent processing Nodes which add more attributes to the SceneMark. The SceneMark may contain versioning information that indicates how the SceneMark and its associated SceneData have been processed. This enables the workflow processing the SceneMark to keep track of the current stage of processing for the SceneMark. This is useful when processing large numbers of SceneMarks asynchronously as it reduces the requirements to check databases to track the processing of the SceneMark.

SceneData Object

SceneData is captured or provided by a group of one or more sensor devices and/or sensor modules, which includes different types of sensor data related to the Scene. SceneData is not limited to the raw captured data, but may also include some further processing. Examples include:

RGB image data

IR image data

RGB IR image data

Depth map

Stereo image data

Audio

Temperature

Humidity

Carbon Monoxide

Passive Infrared

The SceneMode defines the type and amount of SceneData that is generated when the Trigger that is associated with the SceneMode is triggered. For example the SceneMode configuration may indicate that 10 seconds of video before the Trigger and 30 seconds after the Trigger is generated as SceneData. This is set in the SceneData configuration field of the SceneMode data object. Multiple SceneMarks may reference a single video file of SceneData if Triggers happen more rapidly than the period defined for SceneData. For example where multiple Triggers occur within 30 seconds and the SceneData is defined for each Trigger is 30 seconds. Where multiple Triggers occur within those 30 seconds, the SceneMarks generated for each Trigger reference the same video file that makes up the SceneData for the Trigger.

What is claimed is:

1. A method for enabling application-configured awareness of spaces, the method comprising:

receiving, via an application programming interface (API), requests from applications for different monitorings of spaces; and configuring a plurality of non-human technological entities to implement workflows for the requested monitorings of spaces, the entities including cameras that view the monitored spaces, wherein the workflows include:

the cameras capturing images of the monitored spaces;

artificial intelligence and/or machine learning (AI/ML) entities detecting events from the captured images;

generating SceneMarks with attributes that are descriptive of the detected events;

transmitting the SceneMarks between the AI/ML entities;

at least one AI/ML entity performing analysis of SceneMarks received via the transmission between the AI/ML entities; and adding information to the attributes of at least one of the received SceneMarks based on said analysis, and/or detecting an event based on said analysis and generating a new SceneMark for said detected event; and the workflows contextualize the captured images from the SceneMarks to provide awareness of situations in the monitored spaces.

2. The method of claim 1 wherein the at least one AI/ML entity performs analysis of received SceneMarks to detect an anomaly in the situation in the monitored space.

3. The method of claim 2 wherein the at least one AI/ML entity detects the anomaly based on a sequence of received SceneMarks.

4. The method of claim 2 wherein the anomaly is one of: an unexpected occupancy of the space, an unusual movement of a person through the space, an unusual interaction between people in the space, an unexpected object in the space, or an unexpected condition for the space.

5. The method of claim 2 wherein the at least one AI/ML entity detects the anomaly based on comparing received SceneMarks with SceneMarks produced by a normal situation in the monitored space.

6. The method of claim 2 wherein the at least one AI/ML entity detects the anomaly based on comparing received SceneMarks with SceneMarks predicted for a normal situation in the monitored space.

7. The method of claim 1 wherein the at least one AI/ML entity determines that a person or object identified in two different SceneMarks are the same person or object.

8. The method of claim 7 wherein the at least one AI/ML entity determines that the person or object in the two different SceneMarks are the same person or object, based on attributes of the two different SceneMarks.

9. The method of claim 7 wherein the at least one AI/ML entity determines that the person or object in the two different SceneMarks are the same person or object, based on timestamps of the two different SceneMarks and a known proximity of cameras capturing the images that generated the two different SceneMarks.

10. The method of claim 1 wherein the workflow further includes:

automatically triggering an action based on a sequence of SceneMarks that are indicative of a predefined situation in the monitored space.

11. The method of claim 1 wherein the workflow further includes:

classifying received SceneMarks into different predefined categories; and automatically triggering different actions based on the category.

12. The method of claim 1 wherein the workflow further includes:

generating a text description of the situation in the monitored space, based on received SceneMarks.

13. The method of claim 12 wherein a generative pre-trained transformer entity generates the text description.

14. The method of claim 12 wherein the workflow further includes:

returning the text description of the situation to the requesting application.

15. The method of claim 12 wherein generating the text description comprises:

generating labels based on the received SceneMarks; and matching the generated labels against predefined labels that describe different situations.

16. The method of claim 1 wherein the workflow further includes:

accessing SceneMarks stored in a SceneMark database, wherein the workflows contextualize the captured images from SceneMarks including the stored SceneMarks.

17. The method of claim 16 wherein a generative pre-trained transformer entity formulates a query to access the SceneMarks stored in the SceneMark database.

18. The method of claim 16 wherein a generative pre-trained transformer entity formulates a natural language response based on SceneMarks returned from the SceneMark database in response to a query.

19. The method of claim 1 wherein the SceneMarks include links to the captured images, and the SceneMarks are transmitted between entities but the captured images are not transmitted between entities.

20. A system comprising:

a plurality of applications that make requests for different monitorings of spaces;

a plurality of non-human technological entities, the entities including cameras that view the monitored spaces and further including artificial intelligence and/or machine learning (AI/ML) entities;

a service that receives the requests and configures the entities to implement workflows for the requested monitorings of spaces, wherein the workflows include:

the cameras capturing images of the monitored spaces;

the AI/ML entities detecting events from the captured images;

generating SceneMarks with attributes that are descriptive of the detected events;

transmitting the SceneMarks between the AI/ML entities;

at least one AI/ML entity performing analysis of SceneMarks received via the transmission between the AI/ML entities; and adding information to the attributes of at least one of the received SceneMarks based on said analysis, and/or detecting an event based on said analysis and generating a new SceneMark for said detected event; and the workflows contextualize the captured images from the SceneMarks to provide awareness of situations in the monitored spaces.

* * * * *